(12) United States Patent
Rust

(10) Patent No.: US 12,082,560 B2
(45) Date of Patent: Sep. 10, 2024

(54) AVIARY SYSTEM AND SYSTEM FOR CIRCULATING LITTER IN AN AVIARY

(71) Applicant: Rose Acre Farms, Inc., Seymour, IN (US)

(72) Inventor: Marcus D. Rust, Remington, IN (US)

(73) Assignee: Rose Acre Farms, Inc., Seymour, IN (US)

( * ) Notice: Subject to any disclaimer, the term of this patent is extended or adjusted under 35 U.S.C. 154(b) by 504 days.

(21) Appl. No.: 17/327,099

(22) Filed: May 21, 2021

(65) Prior Publication Data

US 2021/0274755 A1 Sep. 9, 2021

Related U.S. Application Data

(60) Division of application No. 15/625,806, filed on Jun. 30, 2017, now Pat. No. 11,044,892, which is a
(Continued)

(51) Int. Cl.
*A01K 31/04* (2006.01)
*A01K 1/015* (2006.01)
(Continued)

(52) U.S. Cl.
CPC .............. *A01K 31/04* (2013.01); *A01K 1/015* (2013.01); *A01K 31/00* (2013.01); *A01K 31/18* (2013.01);
(Continued)

(58) Field of Classification Search
CPC ...... A01K 1/01; A01K 1/0128; A01K 1/0135; A01K 1/0146; A01K 31/00; A01K 31/005; A01K 31/18; A01K 31/22; A01K 31/04
See application file for complete search history.

(56) References Cited

U.S. PATENT DOCUMENTS

| | | | |
|---|---|---|---|
| 838,851 | A | 12/1906 | Dropeskey |
| 1,500,081 | A | 7/1924 | Knight |

(Continued)

FOREIGN PATENT DOCUMENTS

| | | |
|---|---|---|
| AU | 201425949 B2 | 11/2013 |
| BE | 787130 A | 1/1974 |

(Continued)

OTHER PUBLICATIONS

Big Dutchman, NATURA60 & NATURA70 The Modern aviaries for barn and free range egg productions, product brochure, Mar. 2010.

(Continued)

*Primary Examiner* — Monica L Perry
*Assistant Examiner* — Michael A. Fabula
(74) *Attorney, Agent, or Firm* — Ice Miller LLP

(57) ABSTRACT

An aviary that includes a system for providing litter to birds and for circulating the litter throughout the aviary. A litter distribution chain extends through at least some of the scratching platforms. The litter distribution chain receives litter from a storage container and then transfers the litter through the aviary for use by the birds on the scratching platforms. At least a portion of the litter from one scratching platform is directed to move to a scratching platform on a lower level where the litter may be used by birds occupying this lower level. This circulation pattern repeats on the current level, with the recycled litter being deposited on at least one scratching platform near the next lower aviary tower level. Once the litter reaches the lowest aviary tower level, it remains there until it is removed from the aviary by a belt or other means.

39 Claims, 36 Drawing Sheets

Related U.S. Application Data continuation-in-part of application No. 14/530,800, filed on Nov. 2, 2014, now Pat. No. 11,041,655, and a continuation-in-part of application No. 14/530,801, filed on Nov. 2, 2014, now Pat. No. 10,779,513, and a continuation-in-part of application No. 14/530,807, filed on Nov. 2, 2014, now Pat. No. 10,375,935, and a continuation-in-part of application No. 14/530,808, filed on Nov. 2, 2014, now Pat. No. 9,723,818, said application No. 14/530,800 is a continuation-in-part of application No. 14/217,548, filed on Mar. 18, 2014, now Pat. No. 9,538,731, and a continuation-in-part of application No. 14/181,379, filed on Feb. 14, 2014, now Pat. No. 9,307,747, and a continuation-in-part of application No. 14/181,463, filed on Feb. 14, 2014, now Pat. No. 10,104,872, and a continuation-in-part of application No. 14/071,160, filed on Nov. 4, 2013, now Pat. No. 10,130,078, said application No. 14/530,801 is a continuation-in-part of application No. 14/217,548, filed on Mar. 18, 2014, now Pat. No. 9,538,731, and a continuation-in-part of application No. 14/181,379, filed on Feb. 14, 2014, now Pat. No. 9,307,747, and a continuation-in-part of application No. 14/181,463, filed on Feb. 14, 2014, now Pat. No. 10,104,872, and a continuation-in-part of application No. 14/071,160, filed on Nov. 4, 2013, now Pat. No. 10,130,078, said application No. 14/530,807 is a continuation-in-part of application No. 14/217,548, filed on Mar. 18, 2014, now Pat. No. 9,538,731, and a continuation-in-part of application No. 14/181,379, filed on Feb. 14, 2014, now Pat. No. 9,307,747, and a continuation-in-part of application No. 14/181,463, filed on Feb. 14, 2014, now Pat. No. 10,104,872, and a continuation-in-part of application No. 14/071,160, filed on Nov. 4, 2013, now Pat. No. 10,130,078, said application No. 14/530,808 is a continuation-in-part of application No. 14/217,548, filed on Mar. 18, 2014, now Pat. No. 9,538,731, and a continuation-in-part of application No. 14/181,379, filed on Feb. 14, 2014, now Pat. No. 9,307,747, and a continuation-in-part of application No. 14/181,463, filed on Feb. 14, 2014, now Pat. No. 10,104,872, and a continuation-in-part of application No. 14/071,160, filed on Nov. 4, 2013, now Pat. No. 10,130,078.

(51) Int. Cl.
 *A01K 31/00* (2006.01)
 *A01K 31/18* (2006.01)
 *A01K 31/22* (2006.01)

(52) U.S. Cl.
 CPC ......... *A01K 31/22* (2013.01); *Y10T 29/49826* (2015.01)

(56) References Cited

U.S. PATENT DOCUMENTS

| | | | |
|---|---|---|---|
| 1,520,610 A | 12/1924 | Stephens | |
| 1,632,367 A | 6/1927 | Christiansen | |
| 1,674,193 A | 6/1928 | Coltrin | |
| 1,755,520 A | 4/1930 | Shoup | |
| 1,876,325 A | 9/1932 | Crawford | |
| 1,949,085 A | 2/1934 | Shallit | |
| 2,096,356 A | 10/1937 | Fox | |
| 2,174,326 A | 9/1939 | Leibenguth | |
| 2,176,814 A | 10/1939 | Hawkins | |
| 2,257,734 A | 10/1941 | Cornell | |
| 2,457,818 A | 1/1949 | Helman | |
| 2,565,521 A | 8/1951 | Ratermann | |
| 2,692,578 A | 10/1954 | Manning | |
| 2,695,006 A | 11/1954 | Tellefson | |
| 2,805,644 A * | 9/1957 | Lieberman | A01K 31/005 119/442 |
| 2,882,857 A * | 4/1959 | Ernst | A01K 31/17 119/51.5 |
| 2,956,539 A | 10/1960 | Boening | |
| 2,970,567 A * | 2/1961 | Rubin | A01K 31/04 119/458 |
| 3,002,494 A * | 10/1961 | Murray | A01K 31/165 119/337 |
| 3,046,940 A | 7/1962 | Kurtz | |
| 3,062,185 A | 11/1962 | Kurtz | |
| 3,119,375 A * | 1/1964 | Ernst | A01K 31/17 119/337 |
| 3,124,101 A * | 3/1964 | Wierenga, Sr. | A01K 31/17 119/458 |
| 3,124,102 A * | 3/1964 | Kurtz | A01K 31/16 198/823 |
| 3,124,237 A * | 3/1964 | Schommer | A01K 1/0128 198/728 |
| 3,134,358 A * | 5/1964 | Byrnes | A01K 31/04 119/458 |
| 3,139,065 A | 6/1964 | Willauer, Jr. | |
| 3,164,129 A | 1/1965 | Rigterink | |
| 3,208,430 A * | 9/1965 | Ernst | A01K 31/17 119/456 |
| 3,229,664 A * | 1/1966 | Cymara | A01K 1/0128 198/733 |
| 3,242,904 A * | 3/1966 | Rannou | A01K 31/007 119/347 |
| 3,274,973 A | 9/1966 | Woods et al. | |
| 3,312,194 A * | 4/1967 | Ernst | A01K 31/04 119/458 |
| 3,319,606 A * | 5/1967 | Florence | A01K 31/17 119/458 |
| 3,339,528 A * | 9/1967 | Summerour | A01K 31/165 119/337 |
| 3,339,711 A * | 9/1967 | Lacoste | A01K 1/0128 198/731 |
| 3,355,037 A | 11/1967 | Dodd | |
| 3,396,702 A | 8/1968 | Trussell | |
| 3,464,389 A | 9/1969 | Seiderman | |
| 3,485,214 A * | 12/1969 | Burkholder | A01K 31/165 119/337 |
| 3,552,359 A * | 1/1971 | Graves | A01K 31/17 119/346 |
| 3,581,709 A * | 6/1971 | Van Huis | A01K 31/17 119/531 |
| 3,618,734 A | 11/1971 | Khan | |
| 3,791,348 A | 2/1974 | Marnett | |
| 3,796,189 A | 3/1974 | Blondeel | |
| 3,867,903 A * | 2/1975 | Fleshman | A01K 31/17 119/455 |
| 3,892,201 A | 7/1975 | Crawford | |
| 3,900,006 A * | 8/1975 | Shockley, Jr. | A01K 31/005 119/458 |
| 3,976,032 A | 8/1976 | Ramser et al. | |
| 3,978,819 A | 9/1976 | Lovitt | |
| 4,008,690 A * | 2/1977 | Van Huis | A01K 31/005 119/845 |
| 4,011,837 A | 3/1977 | Ksioszk | |
| 4,020,793 A * | 5/1977 | Morrison | A01K 31/007 119/455 |
| 4,023,531 A | 5/1977 | Thompson | |
| 4,112,872 A * | 9/1978 | Van Huis | A01K 45/005 119/845 |
| 4,134,545 A | 1/1979 | Westbrook | |
| 4,141,320 A | 2/1979 | Hatfield | |
| 4,151,811 A | 5/1979 | Truhan | |
| 4,173,947 A * | 11/1979 | Whiteside, Jr. | A01K 1/0218 119/458 |
| 4,188,911 A | 2/1980 | Rafaely | |
| 4,213,422 A * | 7/1980 | Nagel | A01K 31/007 198/850 |

(56) References Cited

U.S. PATENT DOCUMENTS

| | | | |
|---|---|---|---|
| 4,228,729 A | 10/1980 | Messick | |
| 4,242,809 A | 1/1981 | Elder | |
| 4,249,461 A | 2/1981 | Christenson | |
| 4,250,837 A | 2/1981 | Cocklereece | |
| 4,315,481 A * | 2/1982 | Coile | A01K 31/16 |
| | | | 119/437 |
| 4,321,887 A | 3/1982 | Martin et al. | |
| 4,379,439 A | 4/1983 | Baur | |
| 4,416,219 A | 11/1983 | Dill | |
| 4,430,960 A * | 2/1984 | Nagel | A01K 31/007 |
| | | | 198/698 |
| 4,437,433 A * | 3/1984 | Nijhof | A01K 31/005 |
| | | | 119/455 |
| 4,462,334 A | 7/1984 | Kim | |
| 4,474,137 A | 10/1984 | Walters | |
| 4,480,588 A | 11/1984 | Holladay et al. | |
| 4,574,737 A | 3/1986 | Bugeja | |
| 4,653,430 A * | 3/1987 | Mass | A01K 31/16 |
| | | | 119/337 |
| 4,766,849 A * | 8/1988 | Kawabata | A01K 31/165 |
| | | | 119/337 |
| 4,841,909 A | 6/1989 | Siciliano | |
| 4,930,446 A | 6/1990 | Huisinga | |
| 4,936,257 A * | 6/1990 | Kuhlmann | F26B 17/02 |
| | | | 119/442 |
| 5,094,186 A * | 3/1992 | Andersen | A01K 31/16 |
| | | | 119/337 |
| 5,145,460 A | 9/1992 | Smith | |
| 5,174,242 A * | 12/1992 | Takeuchi | A01K 31/005 |
| | | | 119/439 |
| 5,279,254 A | 1/1994 | Dowty | |
| 5,474,025 A | 12/1995 | Lee | |
| 5,477,810 A | 12/1995 | Wilkison, III | |
| 5,492,082 A | 2/1996 | Krevinghaus | |
| 5,570,657 A * | 11/1996 | Kuhlmann | A01K 31/007 |
| | | | 119/458 |
| 5,596,949 A * | 1/1997 | Fanguy | A01K 31/04 |
| | | | 119/458 |
| 5,662,068 A | 9/1997 | Childs | |
| 5,666,905 A | 9/1997 | Mackin et al. | |
| 5,713,302 A | 2/1998 | Walter | |
| 5,749,321 A | 5/1998 | Ikuse | |
| 5,827,118 A | 10/1998 | Johnson | |
| 5,897,285 A | 4/1999 | Wanderscheid | |
| 6,217,437 B1 | 4/2001 | Murray | |
| 6,234,114 B1 * | 5/2001 | Dyer | A01K 31/16 |
| | | | 119/334 |
| 6,286,456 B1 | 9/2001 | Michaelis | |
| 6,321,687 B1 | 11/2001 | Lemmon | |
| 6,394,031 B1 * | 5/2002 | Moller | A01K 31/16 |
| | | | 119/335 |
| 6,412,439 B1 | 7/2002 | Otto-Lubker et al. | |
| 6,598,562 B1 | 7/2003 | Dutkiewicz et al. | |
| 6,637,374 B2 | 10/2003 | Hawks | |
| 6,688,835 B1 | 2/2004 | Buher | |
| 6,810,833 B2 | 11/2004 | Bonner | |
| 6,968,807 B2 | 11/2005 | Kuhlmann | |
| 7,036,457 B2 | 5/2006 | Uchiyama | |
| 7,320,294 B2 | 1/2008 | Irwin | |
| 7,350,364 B2 | 4/2008 | Meerpohl | |
| 7,467,602 B2 | 12/2008 | Yoshida | |
| 7,818,894 B2 | 10/2010 | Noyes et al. | |
| 7,827,938 B2 | 11/2010 | Kuehlmann | |
| 8,117,994 B1 | 2/2012 | Goodlow | |
| 8,132,535 B2 | 3/2012 | Correa | |
| 8,205,577 B2 | 6/2012 | Sia | |
| 8,312,846 B1 | 11/2012 | Murray | |
| 8,651,053 B2 | 2/2014 | Reid | |
| 8,776,727 B1 | 7/2014 | Nelligan | |
| 8,991,123 B2 | 3/2015 | Micka | |
| 9,347,451 B2 | 5/2016 | Priest | |
| 9,538,731 B2 * | 1/2017 | Rust | A01K 31/22 |
| 10,104,872 B2 * | 10/2018 | Dart | A01K 31/22 |
| 10,130,078 B2 | 11/2018 | Rust et al. | |
| 10,375,935 B2 * | 8/2019 | Rust et al. | |
| 11,044,892 B2 * | 6/2021 | Rust | A01K 31/22 |
| 2004/0050338 A1 * | 3/2004 | Ford | A01K 31/04 |
| | | | 119/437 |
| 2004/0144326 A1 | 7/2004 | Smith | |
| 2004/0144329 A1 | 7/2004 | Kuhlmann | |
| 2005/0115522 A1 | 6/2005 | Bishop | |
| 2008/0173250 A1 * | 7/2008 | Dowty | A01K 31/16 |
| | | | 119/329 |
| 2008/0302312 A1 | 12/2008 | Steffey | |
| 2009/0084323 A1 * | 4/2009 | Tsubai | A01K 31/002 |
| | | | 119/336 |
| 2009/0300860 A1 | 12/2009 | Campbell | |
| 2011/0061601 A1 | 3/2011 | Correa | |
| 2012/0055414 A1 | 3/2012 | Correa | |
| 2015/0122190 A1 * | 5/2015 | Rust | A01K 31/165 |
| | | | 119/329 |
| 2015/0122191 A1 * | 5/2015 | Rust | A01K 31/165 |
| | | | 119/334 |
| 2015/0122192 A1 * | 5/2015 | Rust | A01K 31/165 |
| | | | 119/334 |
| 2015/0122193 A1 * | 5/2015 | Rust | A01K 31/17 |
| | | | 29/445 |
| 2015/0122195 A1 * | 5/2015 | Rust | A01K 31/005 |
| | | | 119/455 |
| 2015/0126105 A1 * | 5/2015 | Rust | A01K 31/00 |
| | | | 119/448 |
| 2015/0223428 A1 * | 8/2015 | Beaumont | A01K 1/015 |
| | | | 29/434 |
| 2015/0230432 A1 | 8/2015 | Rust et al. | |
| 2015/0230433 A1 * | 8/2015 | Dart | A01K 31/22 |
| | | | 119/468 |
| 2016/0227726 A1 | 8/2016 | Priest | |
| 2017/0318790 A1 * | 11/2017 | Rayzel | A01K 31/165 |
| 2017/0339925 A1 * | 11/2017 | Bahler | A01K 31/06 |
| 2018/0007870 A1 * | 1/2018 | Finco | A01K 31/165 |

FOREIGN PATENT DOCUMENTS

| | | |
|---|---|---|
| CH | 662244 A5 | 9/1987 |
| DE | 1947908 A1 | 6/1971 |
| DE | 20317631 U1 | 4/2004 |
| EP | 0904690 A1 | 3/1999 |
| EP | 1477057 A1 | 11/2004 |
| EP | 3209121 B1 | 10/2014 |
| EP | 2878195 A2 | 6/2015 |
| GB | 289033 A | 7/1928 |
| GB | 591306 A | 8/1947 |
| GB | 631222 A | 10/1949 |
| GB | 653190 A | 5/1951 |
| GB | 735476 A | 8/1955 |
| JP | 8172965 | 7/1996 |
| JP | 8172966 | 7/1996 |
| NL | 2000735 C2 | 1/2009 |
| WO | WO-2016062701 A1 * | 4/2016 ............ A01K 31/00 |

OTHER PUBLICATIONS

Agricultural Mfg. & Textiles, Inc., FingerBelt Laced With Fingers, Internet article, May 16, 2006, Agricultural Mgf. & Textiles, Inc.

Big Dutchman, Egg Production Photos, Internet Article.

Big Dutchman, The Modern Aviary for Layers in Floor Management, Internet Article, Sep. 12, 2012-Aug. 13, 2013.

Big Dutchman, NATURA70: Flexible, efficient and profitable, Internet article, Sep. 12, 2012-Aug. 13, 2013.

Big Dutchman, Group Laying Nest for Optimum Egg Quality, Internet article, Sep. 12, 2012-Aug. 13, 2013.

Poultry Times.Net, CSES Research Examines Worker Health, Internet newspaper article, Oct. 4, 2013.

Potters Poultry International, Aviary, product brochure.

Vencomatic Group, Bolegg Terrace, product brochure.

"Het etagesysteem voor leghennen; Ontwikkeling en toetsing van een volieresysteem voor leghennen" (1980-1987), Dec. 1, 1987 (Dec. 1, 1987), XP055195185, Netherlands.

(56) References Cited

OTHER PUBLICATIONS

"Tiered Floor System for Laying Hens-development and testing of a henhouse system for laying hens" (1980-1987), Dec. 1, 1987 (Dec. 1, 1987) XP055195185, Netherlands, English Translation.
(EP14191765.8) European Patent Office, European Search Report, Jun. 23, 2015.
First Examination Report, Systems and Methods for an Aviary, IP No. 701660, New Zealand Intellectual Property Office, Oct. 14, 2016.
Karl-Ludwig Borchert, Braunschweig-Volkenrode, "Ein 2-Etagen-Lautstall fur Legehennen" (Jun. 1985), XP-002065271, p. 267-269, Lehrte, Deutschland.
Karl-Ludwig Borchert, Braunschweig-Volkenrode, "A 2-tier coop for laying hens" (Jun. 1985), XP-002065271, p. 267-269, Lehrte, Germany, English Translation.
Ing. A. Cappon, C. Ter Beek, W.F. Frederiks En Ir. J.A.M. Voermans, "Alternative huisvesting voor leghennen (technisch verslag)" (Jun. 1986), Rapport 83, IMAG, Instituut voor Mechanisatie, Arbeid en Gebouwen, Wageningen.
Ing. A. Cappon, C. Ter Beek, W.F. Frederiks and Ir. J.A.M. Voermans, "Alternative housing for laying hens (technical report)" (Jun. 1986), Report 83, IMAG, Institute for Mechanization, Labor, and Buildings, Wageningen, Netherlands, English Translation.
The Poultry Site, Massive Investment in Scottish Barn Egg Production, Feb. 20, 2014, Internet Article.
TH.G.C.M. Fiks—Van Niekerk, B.F.J. Reuvekamp, R.A. Van Emous, M.A.W. Ruis, "Praktijk Rapport Pluimvee 6, Systeem van de toekomst voor leghennen", Praktijkonderzoek Veehouderij, Wageningen UR, Mar. 2003, Lelystad.
TH.G.C.M. Fiks—Van Niekerk, B.F.J. Reuvekamp, R.A. Van Emous, M.A.W. Ruis, "Research Report Poultry 6, System of the Future for Laying Hens", Institute for Animal Husbandry, Wageningen UR, Mar. 2003, Lelystad, English Translation.
(EP141911765.8) European Patent Office, Written Opinion of the European Search Report, dated Jul. 1, 2015.
Big Dutchman, Group Laying Nest for Optimum Egg Equality, Internet article, Sep. 12, 2012-Aug. 13, 2013.
Big Dutchman, Natura 60, Select access multi tier aviary for barn an free range egg production, Internet Article.
Big Dutchman, Natura, The Modern System for Rearing of Healthy Pullets, Internet Article.
Big Dutchman, Natura Step, Organic Cage-Free Layer System, The Modern Aviary for Layers, Internet Article.
Big Dutchman, Avech, Enrichable/Enriched Colony Housing Systems, Internet Article.
Big Dutchman, Natura Sunrise, Multi-tier cage-free floor system for those who require cage-free and organic certification, Internet Article.
Big Dutchman, Natura—Rearing The modern multi-level system for pullet rearing.
(EP17824682.3) European Patent Office, Written Opinion of the European Search Report, dated Mar. 3, 2020.

* cited by examiner

AVIARY SYSTEM AND SYSTEM FOR CIRCULATING LITTER IN AN AVIARY

CROSS-REFERENCE TO RELATED APPLICATIONS

The present application claims priority to and is a divisional application of U.S. patent application Ser. No. 15/625,806, filed Jun. 30, 2017, which is a continuation-in-part of application Ser. No. 14/530,800, filed on Nov. 2, 2014; said application Ser. No. 15/625,806 is a continuation-in-part of application Ser. No. 14/530,801, filed on Nov. 2, 2014, now U.S. Pat. No. 10,779,513; said application Ser. No. 15/625,806 is a continuation-in-part of application Ser. No. 14/530,807, filed on Nov. 2, 2014, now U.S. Pat. No. 10,375,935; said application Ser. No. 15/625,806 is a continuation-in-part of application Ser. No. 14/530,808, filed on Nov. 2, 2014, now U.S. Pat. No. 9,723,818; said application Ser. No. 14/530,800 is a continuation-in-part of application Ser. No. 14/217,548, filed on Mar. 18, 2014, now U.S. Pat. No. 9,538,731, which is a continuation-in-part of application Ser. No. 14/181,379, filed on Feb. 14, 2014, now U.S. Pat. No. 9,307,747, which is a continuation-in-part of application Ser. No. 14/181,463, filed on Feb. 14, 2014, now U.S. Pat. No. 10,104,872, which is a continuation-in-part of application Ser. No. 14/071,160, filed on Nov. 4, 2013, now U.S. Pat. No. 10,130,078, said application Ser. No. 14/530,801 is a continuation-in-part of application Ser. No. 14/217,548, filed on Mar. 18, 2014, now U.S. Pat. No. 9,538,731, which is a continuation-in-part of application Ser. No. 14/181,379, filed on Feb. 14, 2014, now U.S. Pat. No. 9,307,747, which is a continuation-in-part of application Ser. No. 14/181,463, filed on Feb. 14, 2014, now U.S. Pat. No. 10,104,872, which is a continuation-in-part of application Ser. No. 14/071,160, filed on Nov. 4, 2013, now U.S. Pat. No. 10,130,078; said application Ser. No. 14/530,807 is a continuation-in-part of application Ser. No. 14/217,548, filed on Mar. 18, 2014, now U.S. Pat. No. 9,538,731, which is a continuation-in-part of application Ser. No. 14/181,379, filed on Feb. 14, 2014, now U.S. Pat. No. 9,307,747, which is a continuation-in-part of application Ser. No. 14/181,463, filed on Feb. 14, 2014, now U.S. Pat. No. 10,104,872, which is a continuation-in-part of application Ser. No. 14/071,160, filed on Nov. 4, 2013, now U.S. Pat. No. 10,130,078, said application Ser. No. 14/530,808 is a continuation-in-part of application Ser. No. 14/217,548, filed on Mar. 18, 2014, now U.S. Pat. No. 9,538,731, which is a continuation-in-part of application Ser. No. 14/181,379, filed on Feb. 14, 2014, now U.S. Pat. No. 9,307,747, which is a continuation-in-part of application Ser. No. 14/181,463, filed on Feb. 14, 2014, now U.S. Pat. No. 10,104,872, which is a continuation-in-part of application Ser. No. 14/071,160, filed on Nov. 4, 2013, now U.S. Pat. No. 10,130,078.

TECHNICAL FIELD OF THE DISCLOSED EMBODIMENTS

The embodiments herein generally relate to aviaries and, more particularly, to an aviary system and method of circulating litter in an aviary.

BACKGROUND OF THE DISCLOSED EMBODIMENTS

When keeping laying hens, it is important to keep the aviary as clean as possible to maximize bird health and the production of eggs. Typically, litter used to absorb waste is added to an aviary for a period of time, and it is difficult and labor-intensive to add fresh litter during the period. The initial provision of litter to a commercial aviary and subsequent cleaning operations using the traditional litter system can require access to cramped spaces for workers and intensive hand labor using shovels and wheelbarrows. A need remains for a system and method for more efficiently providing and circulating fresh litter in an aviary at the times and in the amounts desired by the aviary management personnel.

Additionally, aerosol ammonia is one of the primary causes of nuisance odors associated with confined animal feeding operations. Since aerosol ammonia comprises a large portion of the odor associated with poultry litter, measures to control odor at poultry operations should incorporate strategies to reduce ammonia volatilization. In addition to ammonia's role as a component in nuisance odors high levels of gaseous ammonia adversely affects animal health and the safety of people working in these environments.

Aerosol ammonia levels in hen houses with shallow pits and monthly manure removal have been measured to be in the range of 46 parts per million (ppm). Similarly, the levels of aerosol ammonia in hen houses with deep pits (manure-drying pits where manure is removed annually) have been measured to be in the 46 ppm range. Gaseous ammonia levels are especially high in winter, when hen house ventilation is restricted to conserve heat. During cold weather, gaseous ammonia levels in hen houses often exceed the 46 ppm range.

Poultry, for example, chickens and turkeys, continuously exposed to 20 (ppm) ammonia vapors exhibit significant respiratory tract damage after only six weeks. Chicks exposed to 20 ppm ammonia for 72 hours are much more susceptible to Newcastle Disease than chicks reared in ammonia-free environments. A high level of ammonia in the environment of laying chicken hens is also known to reduce egg production. For a more thorough discussion of the effect of high levels of gaseous ammonia on animal health and production, the reader is directed to the following articles that are incorporated by reference herein in their entirety. See Avian Dis. 8:369-379, 1964; Deaton et al. Poultry Sci., 63:384-385, 1984; McQuitty et al. Canadian Agricultural Engineering 27:13-19; Strombaugh et al. J. Anim. Sci. 28:844, 1969. Similarly, high ammonia levels correlate with a reduction in the amount of animal feed converted to animal body mass and reduced weight gain in hogs.

In addition to ammonia's adverse effects on animal health, exposure to high levels of aerosol ammonia also adversely impacts human health. For example, exposure to aerosol ammonia concentrations in the range of 25 parts per million (ppm) produces discomfort in workers, and even brief exposures (<5 minutes) to ammonia can cause nasal irritation and dryness. In recognition of the ill effects of aerosol ammonia on human health, both the National Institute for Occupational Safety and Health (NIOSH) and the Occupational Safety and Health Administration (OSHA) identify ammonia as a health hazard. Currently NIOSH rules set the permissible exposure level (PEL) for ammonia over an 8-hour period at 25 ppm. OSHA rules set a PEL, over an 8-hour period, at 50 ppm. OSHA also recognizes that an aerosol ammonia concentration of 300 ppm ammonia is immediately dangerous to life or health (IDLH). 29 C.F.R. 1910.120 (2003) defines IDLH as "[a]n atmospheric concentration of any toxic, corrosive or asphyxiant substance that poses an immediate threat to life or would cause irreversible or delayed adverse health effects or would interfere with an individual's ability to escape from a dangerous atmosphere."

Additionally, in organic poultry production in many jurisdictions, current standards ban the use of synthetic chemicals, eliminating the ability to use many previously routine prophylactic medications. Research has shown that heavy loads of external and intestinal parasites can pose health implications for the hens such as impaired weight gain and growth, decreased egg production, increased mortality, and possibly anemia. Therefore, an effective and safe method is needed for the treatment of parasites in organic animal production.

One treatment to control external and internal parasites is to add diatomaceous earth to the aviary environment and to the diet of production poultry. Diatomaceous earth consists of fossilized diatoms and is made up of almost pure amorphous silicon dioxide. Diatomaceous earth has been recognized as an effective insecticide. It works mainly by absorbing the waxy outer cuticle of parasitic insects upon contact, causing death by desiccation. To a lesser extent, the abrasive property of diatomaceous earth also aids in the physical damage of the cuticle. Diatomaceous earth is commonly used as a protectant against invertebrate pests in grain storage. Diatomaceous earth has been shown to reduce poultry red mite (*Dermanyssus gallinae*) survival in vitro. It has been suggested that diatomaceous earth may additionally improve the health of laying hens by providing trace minerals that help the hens cope with parasite burdens. Diatomaceous earth with less than 7% composition of crystalline silica is recognized as a safe food additive in the United States of America and Canada.

The provision of diatomaceous earth within a commercial aviary can be very labor intensive. Furthermore, the diatomaceous earth is typically provided within the aviary for a period of time (for example, one year) and then completely removed and replaced. A need remains for a system and method for more efficiently providing and circulating diatomaceous earth in an aviary.

SUMMARY OF THE DISCLOSED EMBODIMENTS

In one embodiment, a method is disclosed for circulating litter within an aviary comprising a plurality of scratching platforms, at least one of the scratching platforms comprising a first litter chain operable to move relative to the at least one scratching platform, the method comprising the step of: a) directing a supply of litter to the first litter chain such that movement of the first litter chain transports at least some of the litter along the at least one scratching platform.

In another embodiment, an aviary is disclosed, comprising: a first aviary tower; a second aviary tower spaced from the first aviary tower; a first scratching platform having a first side adjacent the first aviary tower and a second side adjacent the second aviary tower; and a litter chain extending across the first scratching platform.

In another embodiment, an aviary is disclosed comprising: an aviary tower; a scratching platform having a first side adjacent the aviary tower; and a litter chain extending across the scratching platform.

Other embodiments are also disclosed.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein.

DETAILED DESCRIPTION

Figure 1:
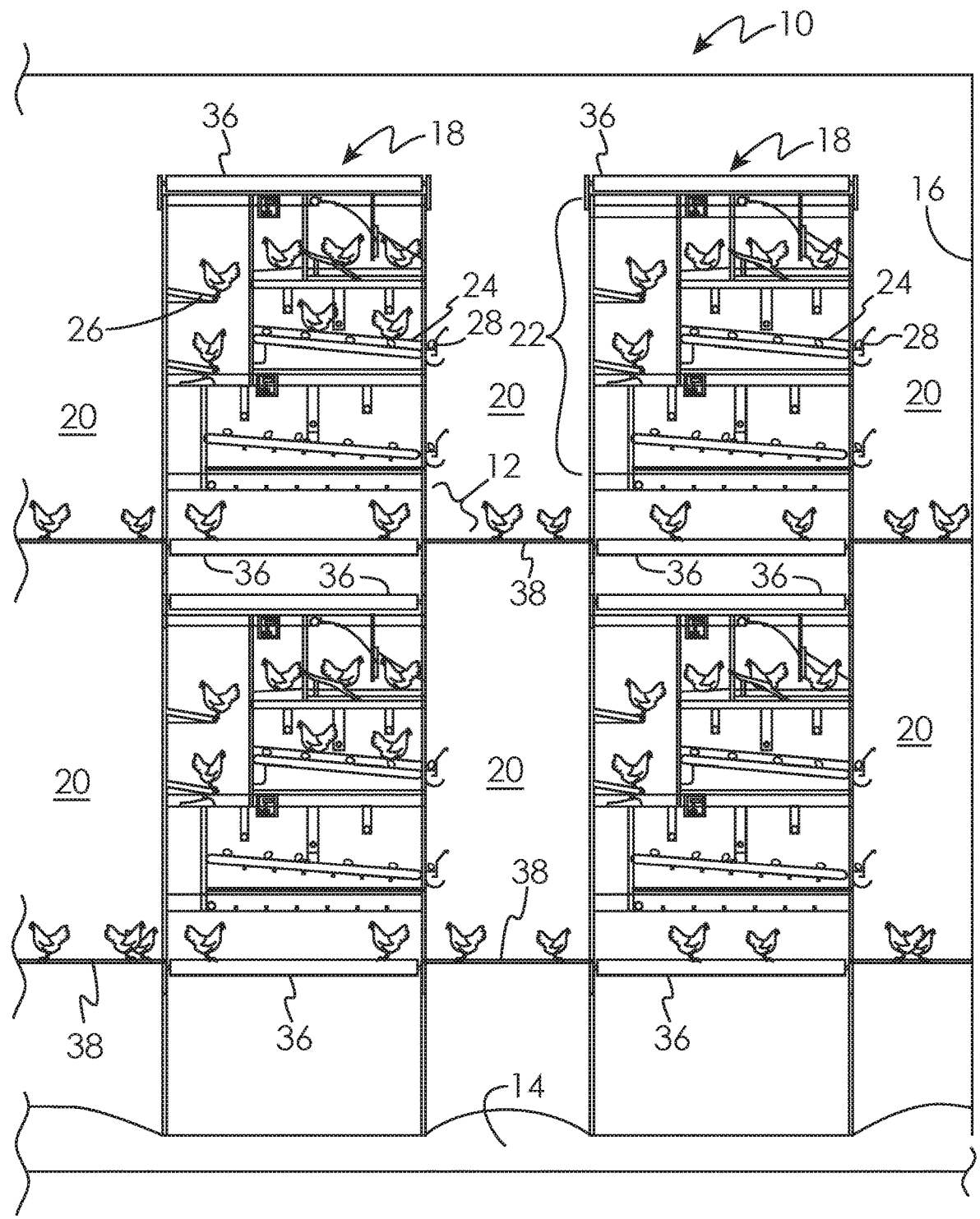
FIG. 1 is a front view of an aviary tower section formed in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present embodiments provide aviaries having open space that may include a scratching platform serving as a pecking area where hens can move freely, peck the floor with their beaks, and scratch the floor with their feet. By permitting space for the hens to move freely, the aviary towers of the present embodiments satisfy the requirements for the birds to be considered "cage free" birds. In other words, the hens are not continuously confined to a caged area. The present embodiments allow the removal of freshly laid eggs, which eggs may be sold under the label "cage free" because they were laid outside of a nest box environment. The present embodiments also provide a system and method for providing diatomaceous earth, other bedding material, or other litter (collectively referred to hereinbelow as "litter") to the hens and for circulating the litter throughout the aviary. The hens have access to the litter in the scratching platforms of the aviary, where they can peck and scratch in the litter, use it for dust baths, and ingest some of it.

Some embodiments include at least one belt extending through the aviary tower below the nesting area to remove deposits from at least part of the aviary tower. A deposit may include, but is not limited to, one or more items such as manure, an egg, litter, feathers, feed, or a dead bird. In one embodiment, the belt extends through the aviary tower along the length of the aviary tower. In one embodiment, the belt extends approximately 400 feet along the length of the aviary tower. In one embodiment, the belt includes one or more litter removers that serve to remove some of the litter from the belt and recycle it to the litter circulation system.

Some embodiments include a litter distribution chain extending through at least some of the scratching platforms. The litter distribution chain receives fresh litter from a storage container and then transfers the litter through at least a portion of the aviary for use by the birds disposed on the scratching platforms. At least a portion of the litter will eventually make its way to at least one of the at least one belts. At least a portion of the litter from at least one scratching platform will fall down to at least one lower scratching platform on a lower level by falling through perforations in a channel that contains the litter distribution chain. The one or more litter removers operate to remove at least some of the litter from the belt and direct it to the aviary tower level below the level of the belt, where the litter is deposited onto another litter distribution chain extending through at least one of the scratching platforms on the lower level, where the litter may be used by hens occupying this lower level. The above circulation pattern repeats on the current level, with the recycled litter being deposited on at least one scratching platform near the next lower aviary tower level. Once the litter reaches the lowest aviary tower level, it remains there until it is removed from the aviary by a belt or other means.

It should be noted that the various elements of each of the embodiments described below may be combined in any manner to form new embodiments of an aviary.

Figure 2:
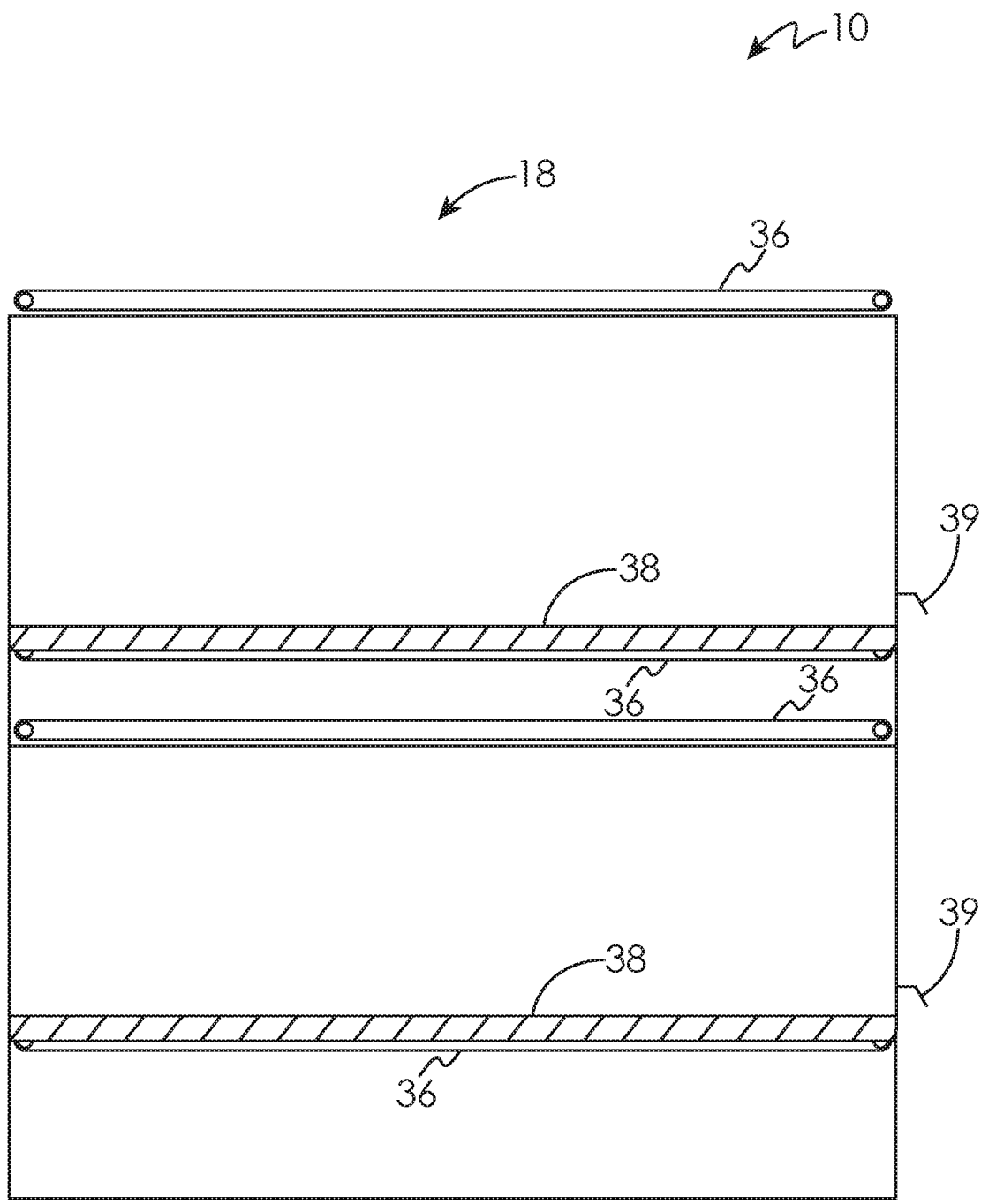
FIG. 2 is a side view of the aviary tower section shown in FIG. 1 without the interior components of the aviary towers.
Figure 3:
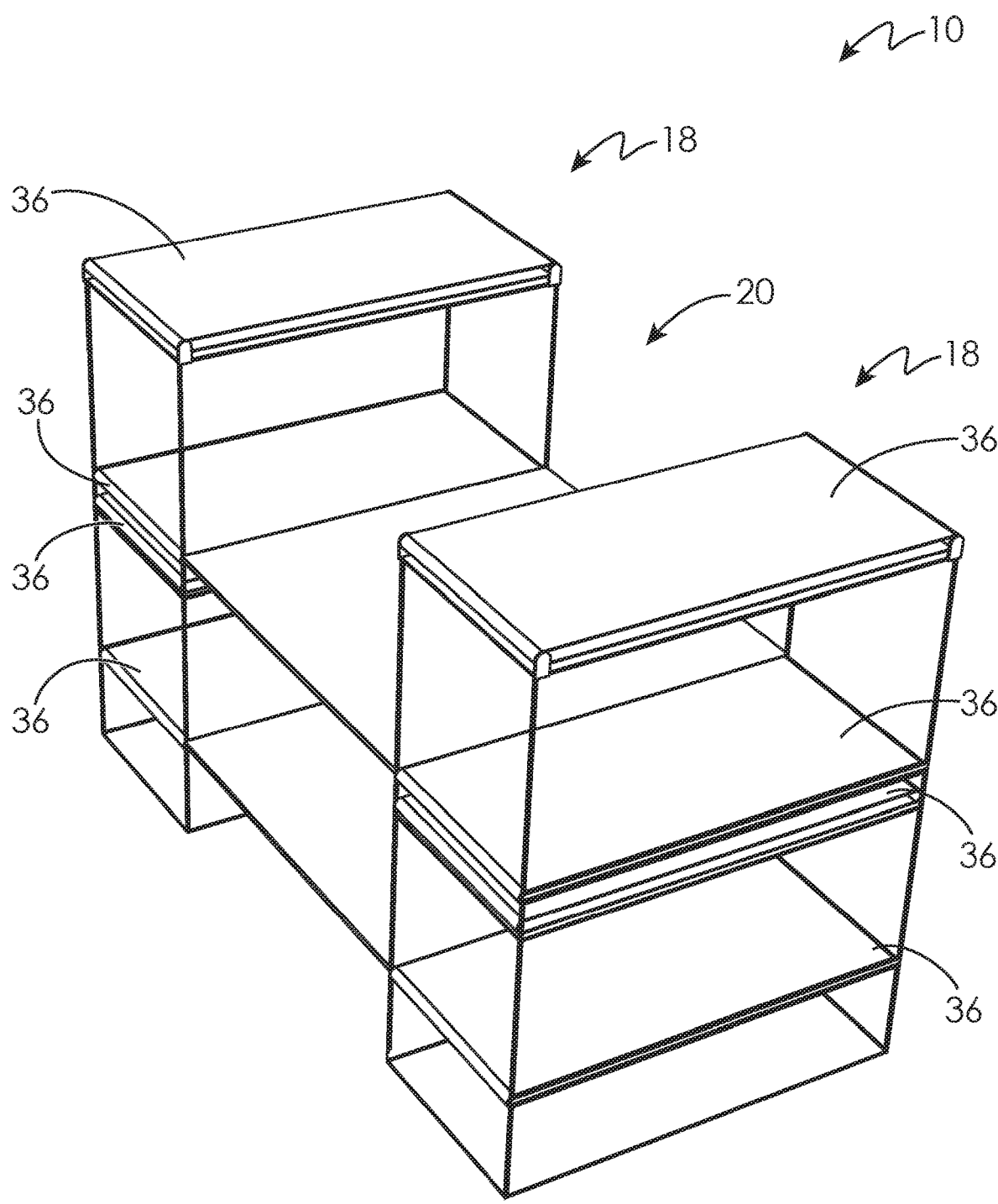
FIG. 3 is a top perspective view of the aviary tower section shown in FIG. 1 without the interior components of the aviary towers.

FIGS. 1-3 illustrate an aviary 10 configured with a manure removal system 12 according to one embodiment. The aviary 10 may include a concrete floor 14 enclosed by exterior walls 16. The exterior walls 16 enclose at least two aviary towers 18 where hens may be housed. Although the present embodiment illustrates only two aviary towers 18, it should be noted that the aviary 10 may be constructed with any number of aviary towers 18, including a single aviary tower 18. An open space 20 extends between the two aviary towers 18 to provide an inspection area. In an embodiment having more than two aviary towers 18, an open space 20 may extend between each adjacent aviary tower 18. In an embodiment having a single aviary tower 18, an open space 20 is present on at least one side of the aviary tower 18. In an embodiment, open space 20 is positioned between the aviary tower 18 and the respective exterior wall 16.

Each aviary tower 18 includes at least one nesting area 22. The nesting area 22, as illustrated, may include various sloped nesting platforms 24 where a hen may sit to lay eggs. The nesting platforms 24 may be offset from sloped platforms 26 that allow the hens to move freely up and down the aviary tower 18 to a desirable nesting area 22. As the hens lay their eggs, the eggs are collected in egg conveyors 28 that extend along the sides of the nesting platforms 24. The egg conveyors 28 carry the eggs from the nesting area 22 to a collection area.

In one embodiment, the belt 36 forms a floor of the aviary tower 18. Accordingly, the birds are allowed to move freely and walk on the belt 36. In addition to collecting eggs and manure, the belt 36 may also remove dead birds from at least part of an aviary tower 18. The illustrated embodiment includes a belt 36 positioned beneath each nesting area 22. In addition to the belts 36 positioned below the nesting area 22, a belt 36 is likewise positioned above each nesting area 22. The belts 36 above each nesting area 22 provide additional space for the hens to move freely. Deposits, which may include, but are not limited to, manure, eggs, litter, feathers, feed, or dead birds, within the aviary 10 are collected on the belts 36.

Figure 11:
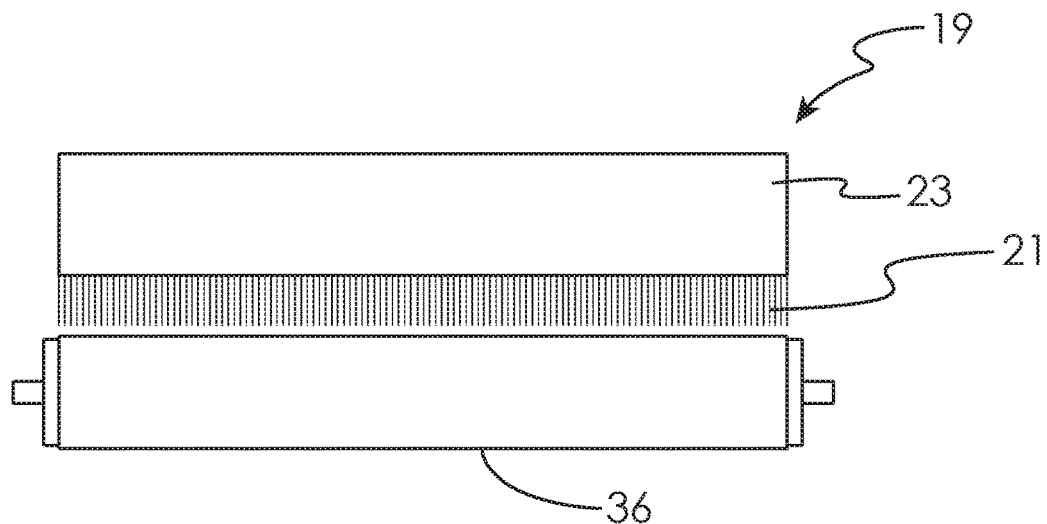
FIG. 11 is a front view of a gate formed in accordance with another embodiment.
Figure 12:
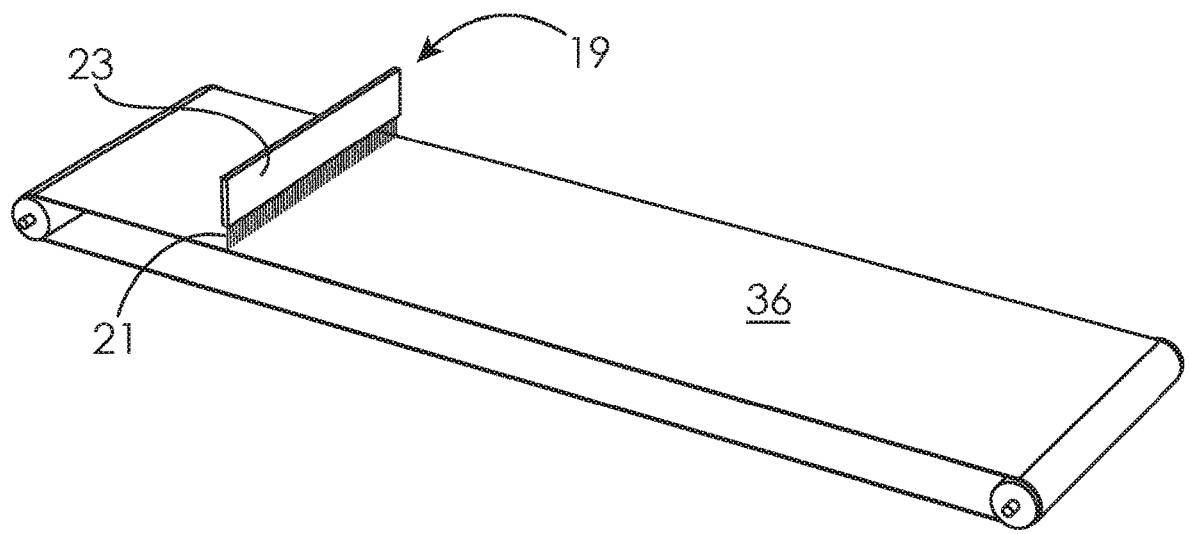
FIG. 12 is a side perspective view of the gate shown in FIG. 11.

In one embodiment, as illustrated in FIGS. 11 and 12, at least one gate 19 is positioned along each belt 36 to permit deposits on the belt 36 to pass thereunder and/or therethrough and to prevent birds from traveling beyond the gate. In the illustrated embodiment, the gate 19 includes plastic strips 21 extending downward from a solid partition 23. In the illustrated embodiment, the plastic strips 21 may be positioned approximately 1½ inches from the belt 36. If a deposit on the belt 36 in the illustrated embodiment is taller than the 1½ inch gap between the gate 19 and the belt 36, then the plastic strips 21 move when in contact with such a deposit to allow the deposit to pass therethrough.

In an embodiment, the gate 19 may be positioned so that its lower edge is in contact with the belt 36. In an embodiment, the gate 19 may include plastic strips. In one embodiment, the gate 19 including plastic strips may be positioned so that the lower edges of the plastic strips are in contact with the belt 36. In an embodiment, the gate 19 may include a hinged door that moves to permit deposits larger than a gap between the hinged door and the belt 36 to pass thereunder. In an embodiment, the gate 19 may comprise one or more hinged doors to permit deposits larger than a gap between the hinged doors and the belt 36 to pass thereunder. In an embodiment, the gate 19 may comprise one or more swinging doors to permit deposits larger than a gap between the swinging doors and the belt 36 to pass thereunder. In an embodiment, an electric fence may be positioned on the gate 19 to prevent live birds from entering the gate 19. Alternately, an electric fence may be spaced apart from the gate 19 to prevent birds from reaching and entering the gate 19. In embodiments including at least one gate 19, birds are prevented from leaving a part of the aviary 10, while deposits are permitted to travel away from that part of the aviary 10.

In the illustrated embodiment, a scratching platform 38 extends from the aviary tower 18. In some embodiments, the scratching platform is solid. In an embodiment having more than one aviary tower 18, a scratching platform 38 may extend between any adjacent aviary towers 18. Additionally, a scratching platform 38 may extend between the aviary tower 18 and the respective exterior wall 16. In an embodiment having more than two aviary towers 18, a scratching platform may extend from adjacent aviary towers 18 but not be continuous between adjacent aviary towers 18.

Figure 4:
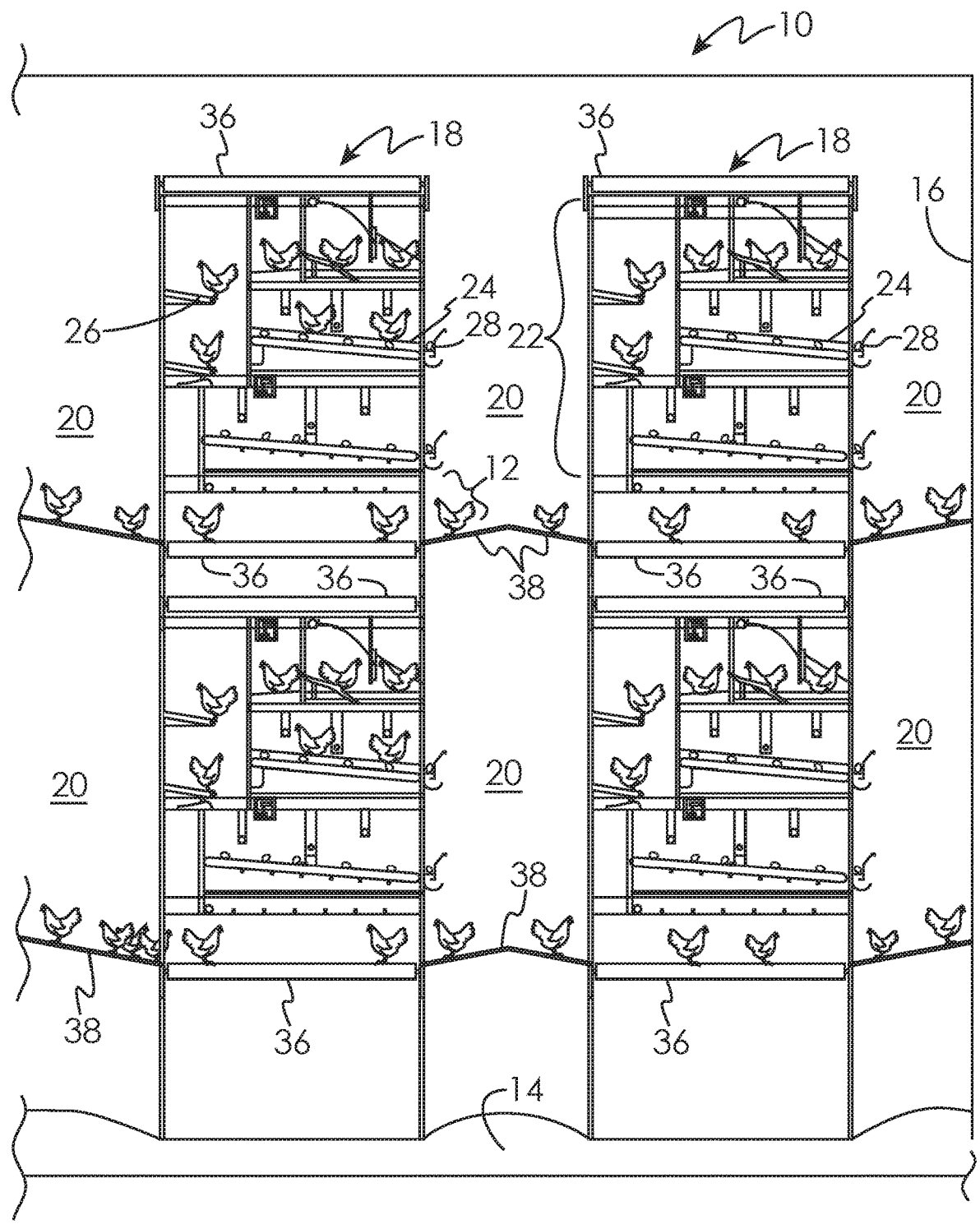
FIG. 4 is a front view of an aviary tower section formed in accordance with another embodiment.
Figure 5:
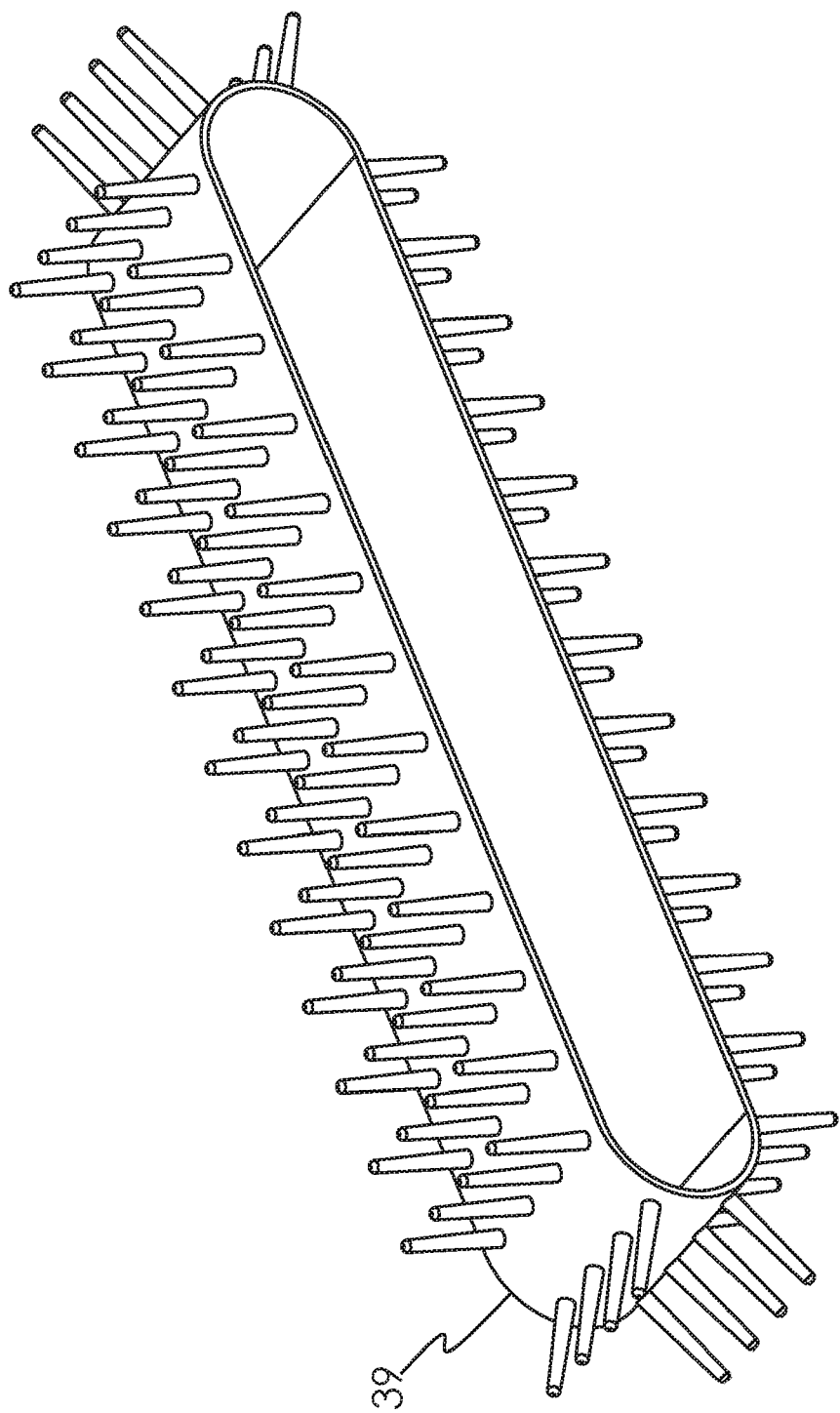
FIG. 5 is a side perspective view of a conventional egg finger belt.

The scratching platform 38 is oriented with respect to at least one belt 36. In one embodiment, the scratching platform 38 is planar with a belt 36 from which the scratching platform 38 extends. Alternatively, the scratching platform 38 is sloped to allow deposits to move back toward the belt 36, as shown in FIG. 4. The scratching platform 38 extends into the open space 20 of the aviary 10. The scratching platform 38 provides yet another pecking area for the hens to utilize while they are not nesting. In particular, the scratching platform 38 provides a scratching area for the birds within the aviary 10. When the birds scratch the scratching platform 38, they scratch much of the deposits made on the scratching platform 38 onto the respective belt 36. Accordingly, since it is common for birds to defecate in a scratching area, the scratching platform 38 becomes relatively self-cleaning as the hens scratch. The scratching platform 38 is configured so that the deposits are scratched back to the respective belt 36. Such configuration greatly reduces the amount of ammonia captured within the aviary 10 and also reduces the required frequency for cleaning of the aviary 10. Any eggs laid on the scratching platform 38 may be directed back toward the belt 36 by the scratching of the hens. These eggs are then collected on the belt 36 and removed from the belt 36. In one embodiment, the eggs are removed through the use of any conventional egg finger belt 39, shown in FIGS. 2 and 5, positioned at the end of the belt 36.

It should be noted that the aviary tower 18 illustrated includes two nesting areas 22 positioned in a stacked configuration. Each nesting area 22 may have its own belt 36 extending therebelow. Each belt 36 may be joined to a corresponding belt 36 of the adjacent aviary tower 18 by a scratching platform 38. As will be appreciated by one of skill in the art, the configuration of the nesting areas 22, belts 36, and scratching platform 38 can be unstacked to have just one level of nesting areas 22, belts 36, and a scratching platform 38 or can be repeated any number of times to create the desired number of levels in a stacked configuration within the aviary 10. As will also be appreciated by one of skill in the art, each level may contain multiple nesting areas 22 set adjacent each other to permit or prohibit, as desired, bird movement from one nesting area to another.

The present invention also provides a method of constructing an aviary 10 for deposit removal. The method includes positioning a belt 36 beneath a nesting area 22 to remove a deposit therefrom. In one embodiment, the belt 36 is configured to capture eggs laid outside of the nesting area 22. The method also includes extending a scratching platform 38 from the belt 36. In one embodiment, the scratching platform 38 is planar with the belt 36 from which the scratching platform 38 extends. In another embodiment, the scratching platform 38 is sloped toward the belt 36 to facilitate the movement of deposits, with or without the assistance of gravity, from the scratching platform 38 onto the belt 36. In one embodiment, the scratching platform 38 forms a scratching area for birds in the aviary 10. In one embodiment, the scratching area is configured for the birds to scratch manure on the scratching platform 38 onto the belt 36. In one embodiment, a belt 36 is also positioned along a top of the nesting area 22. In one embodiment, a belt 36 is also positioned along a floor 14 of the aviary 10.

In one embodiment, the method includes positioning at least two nesting areas 22 in a stacked configuration. The method also includes extending a belt 36 below each nesting area 22. The method also includes extending a scratching platform 38 from a belt 36 to a corresponding belt 36 of an adjacent nesting area 22.

In one embodiment, the method includes positioning at least two nesting areas 22 in a stacked configuration. The method also includes extending a belt 36 below each nesting area 22. The method also includes extending a scratching platform 38 from each belt 36, but not making the scratching platform 38 extending from a belt 36 of a first nesting area 22 continuous with a scratching platform 38 extending from a corresponding belt 36 of an adjacent nesting area 22.

Figure 6:
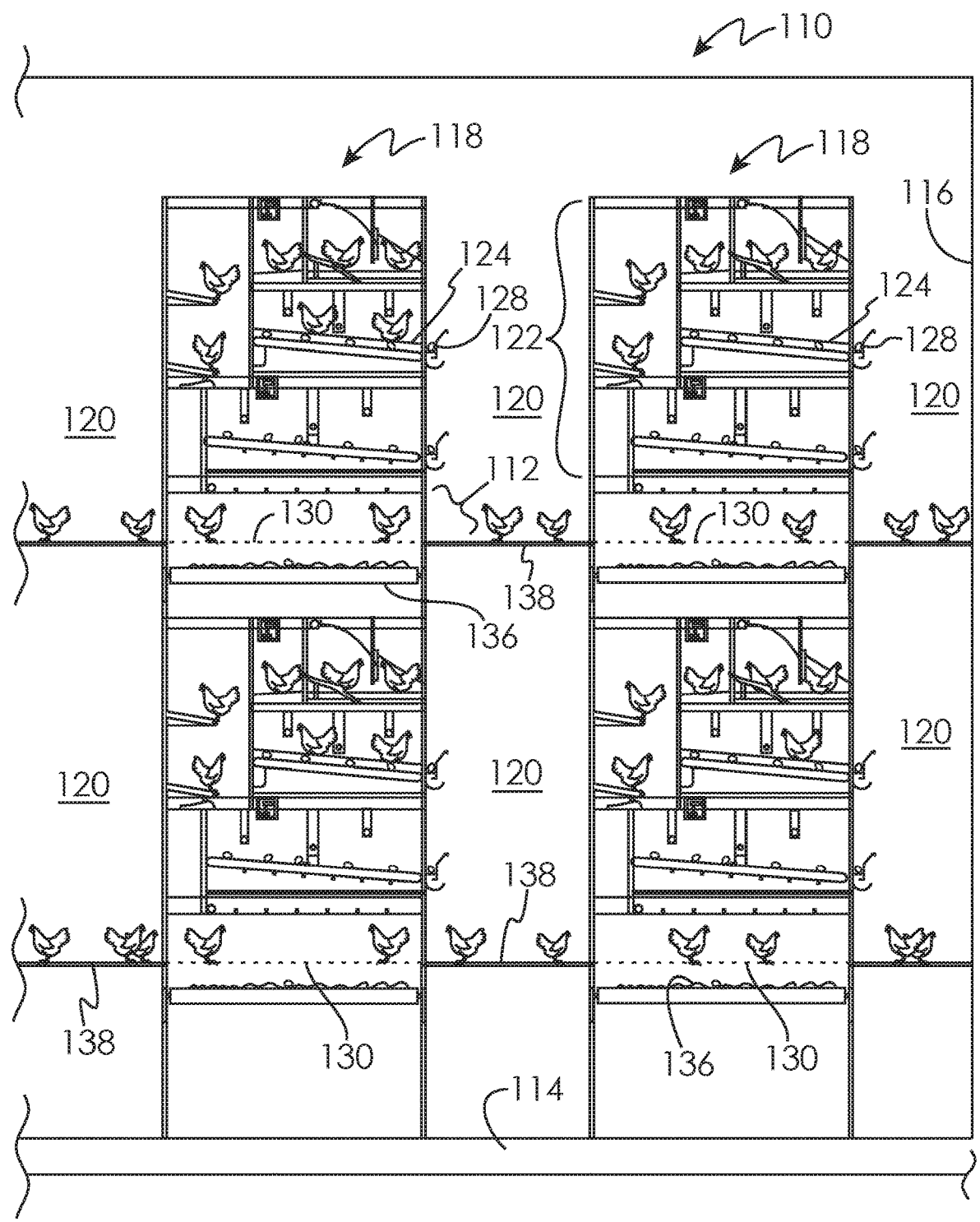
FIG. 6 is a front view of an aviary tower section formed in accordance with another embodiment.
Figure 7:
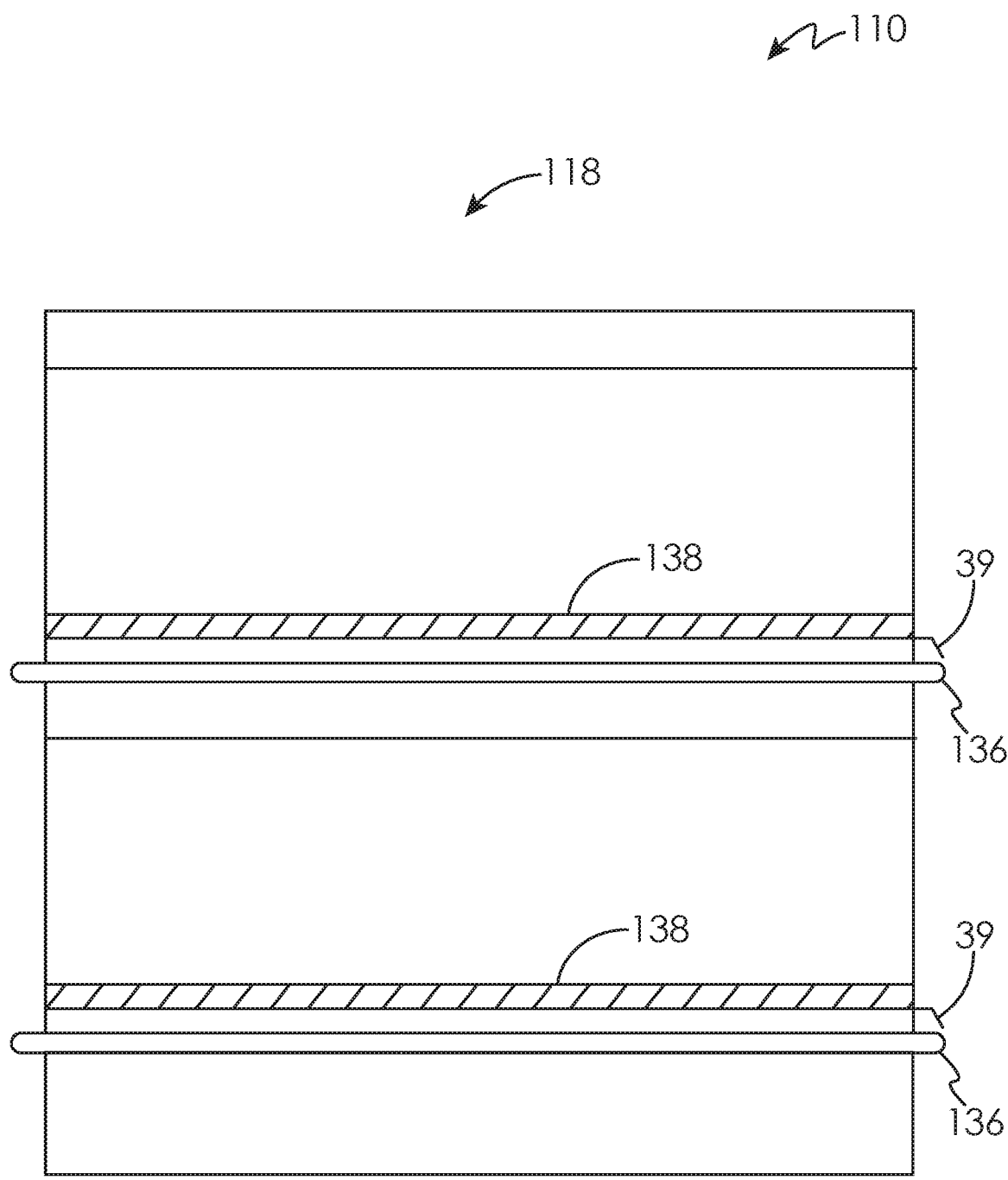
FIG. 7 is a side view of the aviary tower section shown in FIG. 6 without the interior components of the aviary towers.
Figure 8:
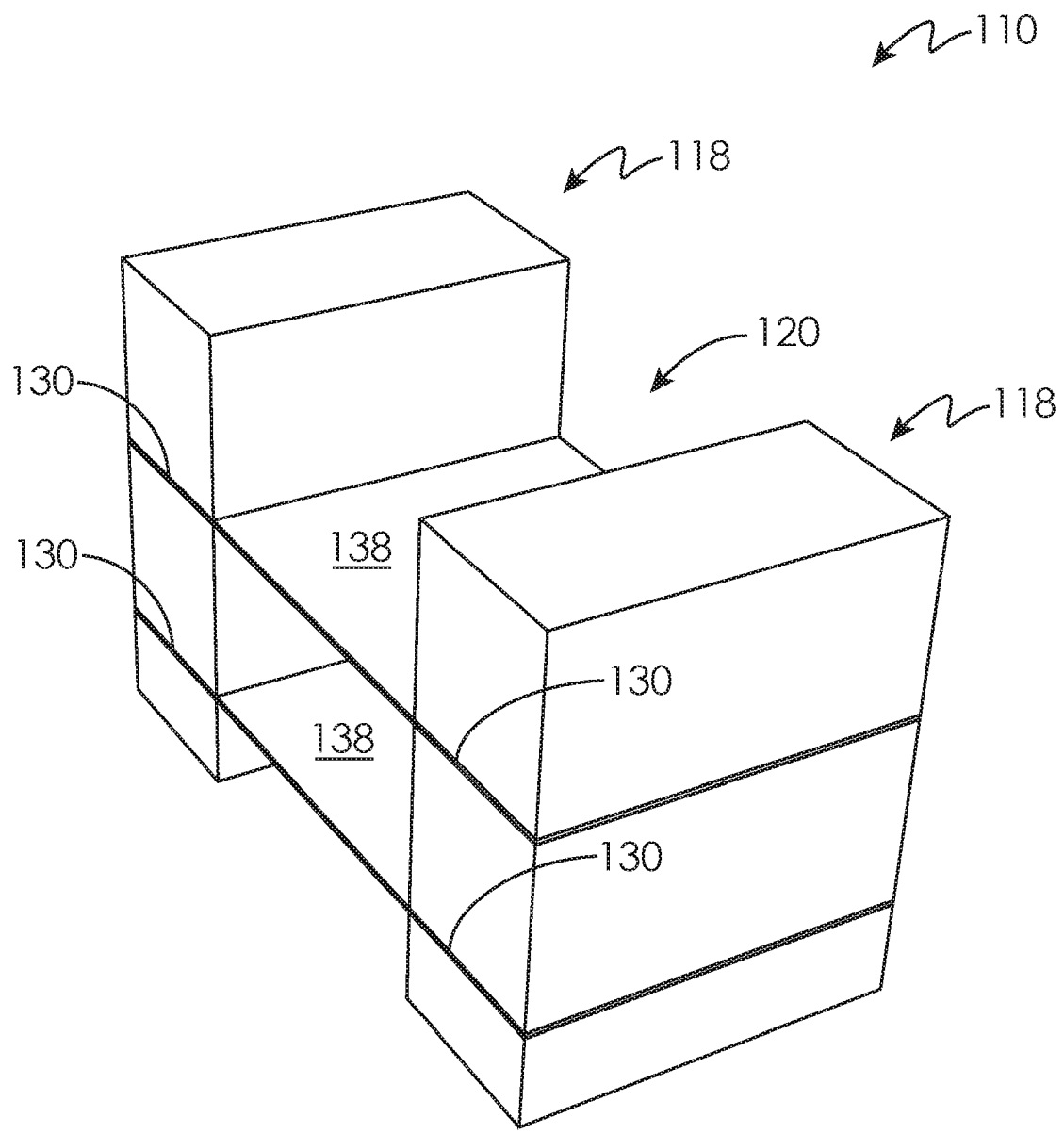
FIG. 8 is a top perspective view of the aviary tower section shown in FIG. 6 without the interior components of the aviary towers.

FIGS. 6-8 illustrate an aviary 110 configured with a manure removal system 112. The aviary 110 includes a concrete floor 114 enclosed by exterior walls 116. The exterior walls 116 enclose at least one aviary tower 118 where hens are housed to lay eggs. Although the illustrated embodiment shows only two aviary towers 118, it should be noted that the aviary 110 may be constructed with any number of aviary towers 118, including a single aviary tower 118. An open space 120 extends between the two aviary towers 118. In an embodiment having more than two aviary towers 118, an open space 120 extends between each adjacent aviary tower 118. In an embodiment having a single aviary tower 118, an open space 120 is present on at least one side of the aviary tower 118. In an embodiment, open space 120 is likewise positioned between aviary tower 118 and the respective exterior wall 116.

Each aviary tower 118 includes at least one nesting area 122. The nesting area 122, as illustrated, may include various nesting platforms 124 where the hen may sit to lay eggs. The nesting platforms 124 allow the hens to move freely up and down the aviary tower 118 to a desirable nesting area 122. As the hens lay their eggs, the eggs are collected in egg conveyors 128 that extend along the sides of the nesting platforms 124. The egg conveyors 128 carry the eggs from the nesting area 122 to an egg collection area (not shown).

Figure 9:
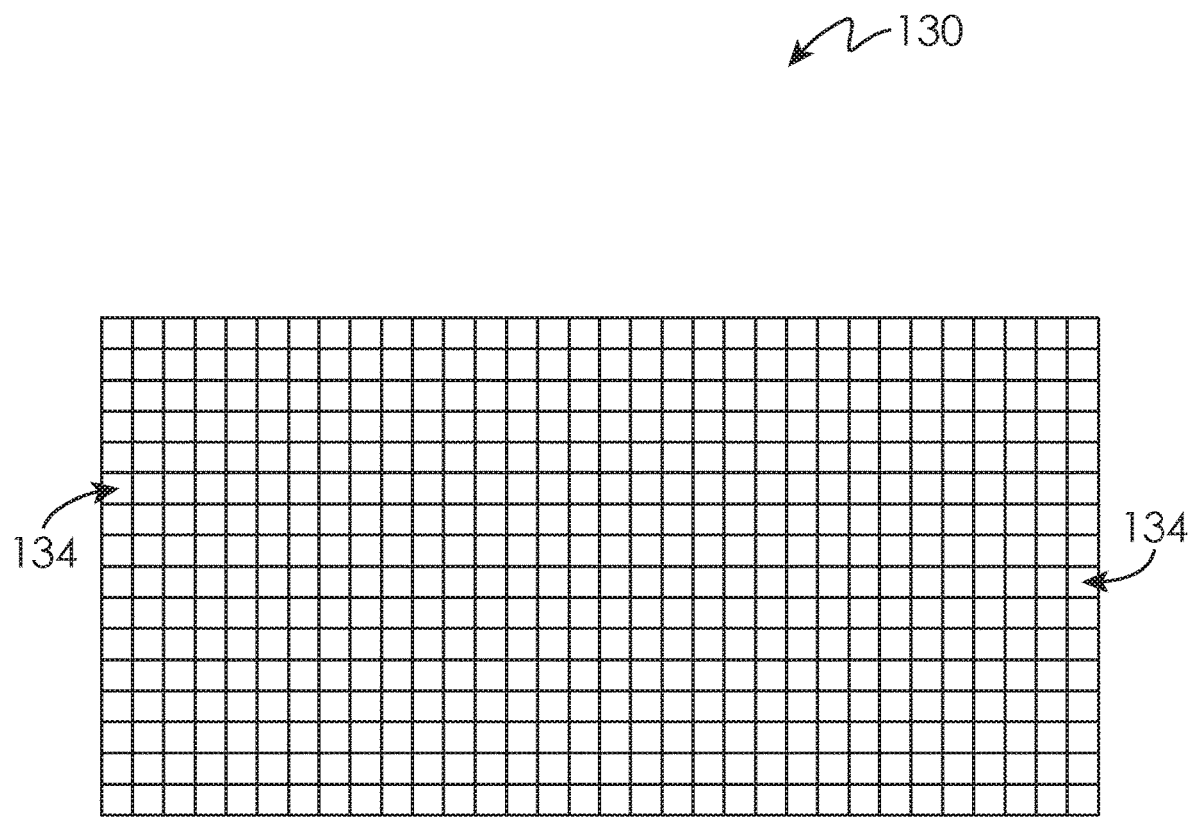
FIG. 9 is a top view of a mesh floor.

A mesh floor 130, as shown in FIG. 9, is positioned beneath each nesting area 122. In particular, the hens may leave the nesting area 122 and gather on the mesh floor 130. Like the open space 120, the mesh floor 130 provides an area for the hens to peck and scratch. The mesh floor 130 is formed from metal, plastic, or the like. The mesh floor 130 includes openings 134 therein that are sized to receive an egg therethrough, but are also spaced so as to support a hen. The openings 134 allow deposits such as, by way of example and not of limitation, manure, feed, litter, feathers, and eggs to pass therethrough.

A belt 136 extends below the mesh floor 130 to remove deposits that fall through openings 134 in the mesh floor 130. In one embodiment, the belt 136 extends substantially the length of the aviary tower 118 and carries manure from the aviary tower 118 to a collection area (not shown) positioned outside of the aviary tower 118. Moreover, if a hen lays an egg outside of the nesting area 122 on the mesh floor 130, the egg is likewise collected by the belt 136 and carried to an egg collection area (not shown).

Figure 10:
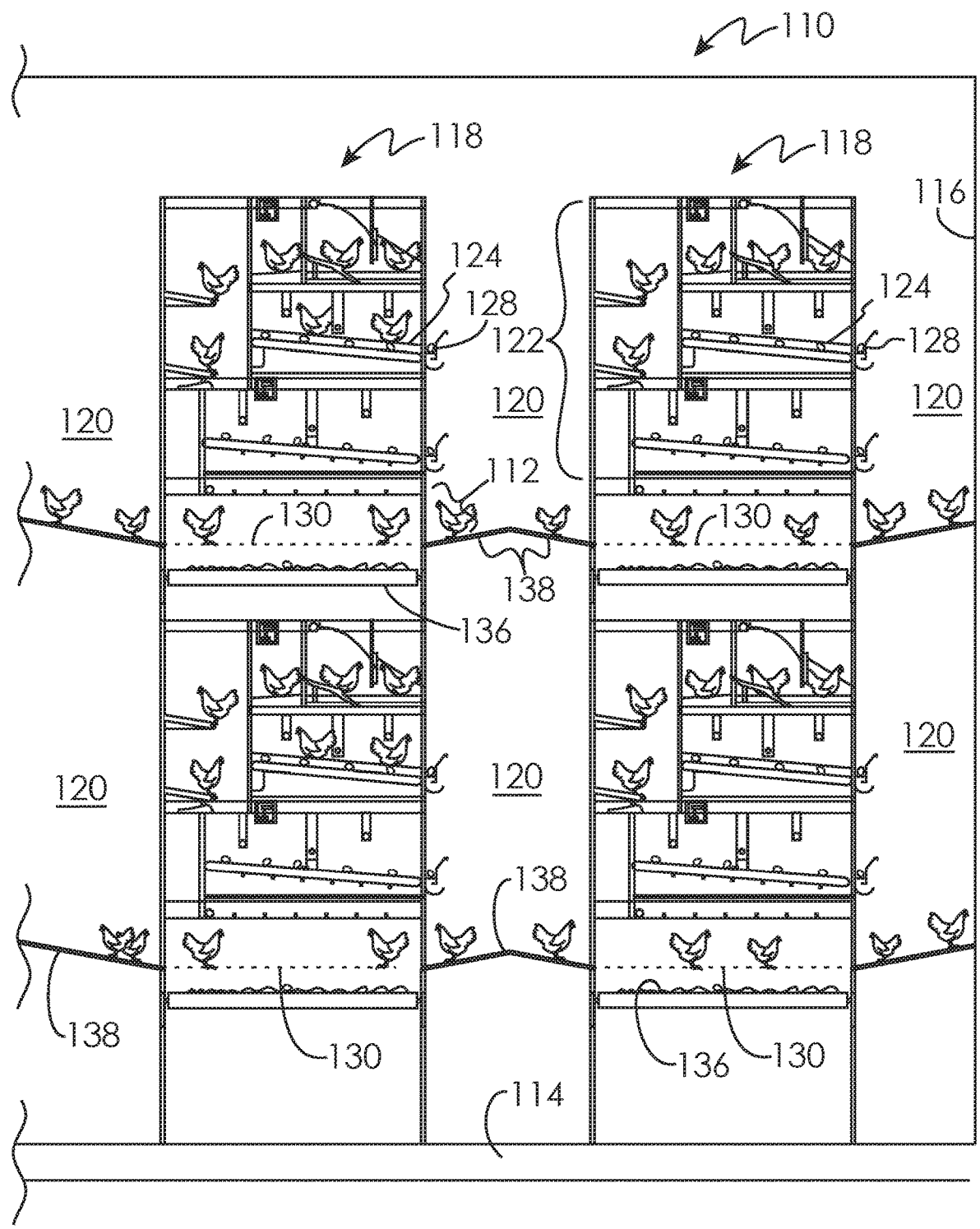
FIG. 10 is a front view of an aviary tower section formed in accordance with another embodiment.

In the illustrated embodiment, a scratching platform 138 extends between the mesh floors 130 of the aviary towers 118. In an embodiment having more than two aviary towers 118, a scratching platform 138 may extend between any adjacent aviary towers 118. In an embodiment having a single aviary tower 118, a scratching platform 138 may extend from the aviary tower 118. Additionally, a scratching platform 138 may extend between an aviary tower 118 and an adjacent exterior wall 116. In one embodiment, the scratching platform 138 is planar with the mesh floors 130 between which the scratching platform 138 extends. Alternatively, the scratching platform 138 may be sloped toward the mesh floor 130, as illustrated in FIG. 10. The scratching platform 138 extends into the open space 120 of the aviary 110.

The scratching platform 138 provides yet another pecking area for the hens to utilize while they are not nesting. In particular, the scratching platform 138 provides a scratching area for the hens to scratch and peck within the aviary 110. When the birds scratch, they may scratch deposits on the scratching platform 138 through the mesh floor 130 and onto the belt 136. Accordingly, since it is common for birds to defecate in their scratching area, the scratching platform 138 becomes self-cleaning as the hens scratch. The scratching platform 138 is configured so that the deposits are scratched back to the mesh floor 130. Such configuration greatly reduces the amount of ammonia captured within the aviary 110 while also reducing the requirement for frequent cleaning of the aviary 110. Any eggs laid on the scratching platform 138 may be directed back toward the mesh floor 30 by the scratching of the hens. These eggs are then collected on the belt 136 and removed from the belt 136. In one embodiment, the eggs are removed through the use of any conventional egg finger belt 39, shown in FIGS. 5 and 7, positioned at the end of the belt 136.

It should be noted that the aviary towers 118 illustrated each include at least two nesting areas 122 positioned in a stacked configuration. Each nesting area 122 has its own mesh floor 130 and belt 136 extending therebelow. Each mesh floor 130 is joined to a corresponding mesh floor 130 of the adjacent aviary tower 118 by a scratching platform 138. As will be appreciated by one of skill in the art, the configuration of the nesting areas 122, mesh floors 130, belts 136, and scratching platforms 138 can be repeated any number of times in a stacked configuration within the aviary 110. As well, a single belt 136 may underlie multiple nesting areas 122 in a single level in an aviary tower 118.

The present invention also provides a method of constructing an aviary 110 to facilitate deposit removal. The method includes positioning a mesh floor 130 beneath a nesting area 122. The method also includes positioning a belt 136 below the mesh floor 130 to remove deposits that fall through openings 134 in the mesh floor 130. In one embodiment, the belt 136 is configured to capture eggs laid outside of the nesting area 122. The method also includes extending a scratching platform 138 from the mesh floor 130 to a mesh floor 130 of an adjacent nesting area 122. In one embodiment, the scratching platform 138 is planar with the mesh floors 130 between which the scratching platform 138 extends. Alternatively, the scratching platform 138 can be sloped toward the mesh floor 130. In one embodiment, the scratching platform 138 forms a scratching area for birds in the aviary 110. In one embodiment, the scratching area is configured for the birds to scratch deposits on the scratching platform 138 from the scratching platform 138 to the mesh floor 130 and through the mesh floor 130 to the belt 136.

Figure 13:
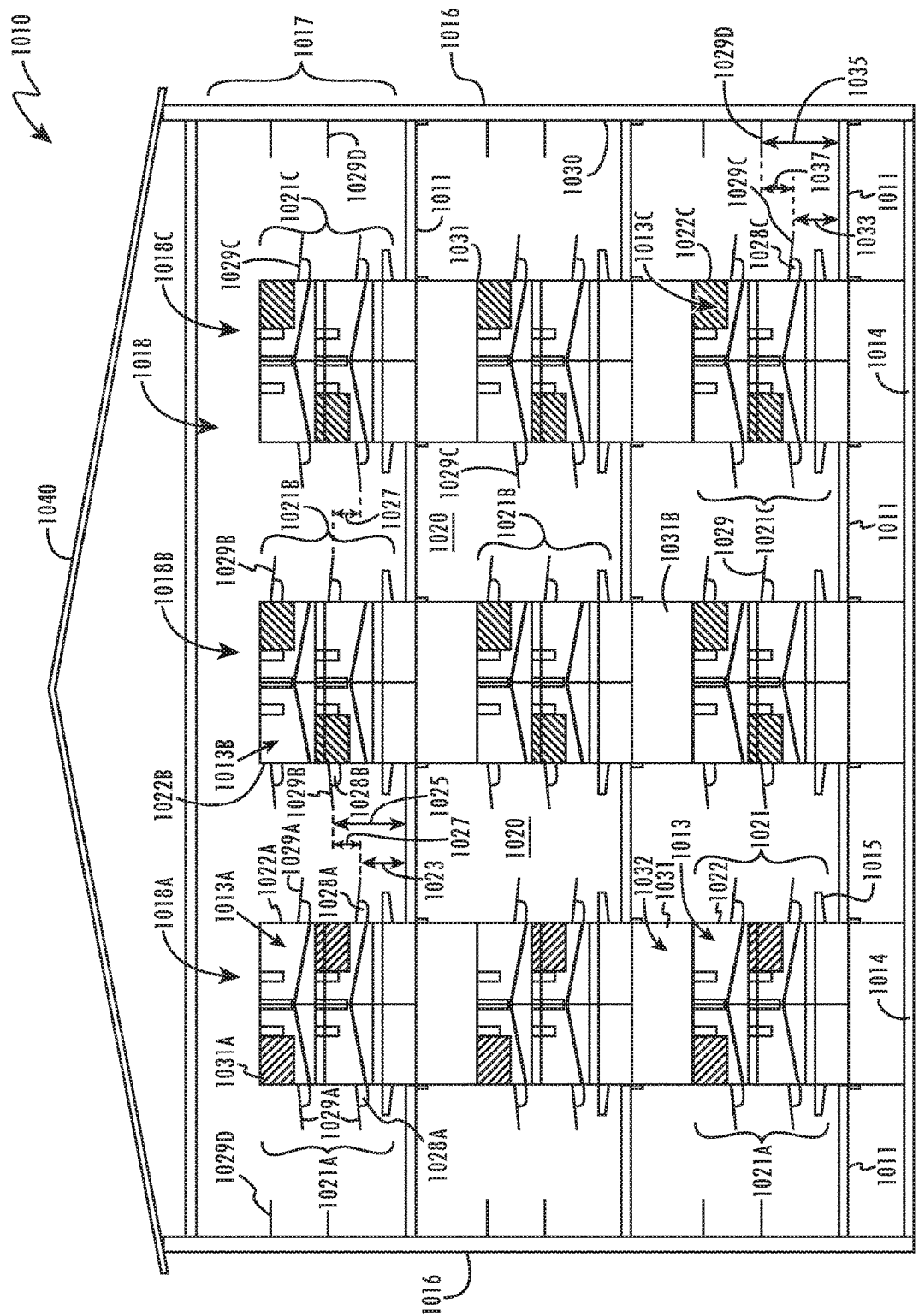
FIG. 13 is a front view of an aviary formed in accordance with another embodiment.

FIG. 13 illustrates an aviary 1010 having a floor 1014 and which is enclosed by exterior walls 1016 and a roof 1040. The exterior walls 1016 define an interior surface 1030. The exterior walls 1016 enclose at least one aviary tower 1018 where hens may be housed. Although the illustrated embodiment includes three aviary towers 1018, it should be noted that the aviary 1010 may be constructed with any number of aviary towers 1018, including a single aviary tower 1018. In an embodiment with multiple aviary towers 1018, an aisle 1020 extends between each aviary tower 1018 to provide an inspection area and space in which the birds housed in the aviary 1010 may move. In an embodiment having a single aviary tower 1018, an aisle 1020 is present on at least one side of the aviary tower 1018. In an embodiment, an aisle 1020 is positioned between an aviary tower 1018 and the respective exterior wall 1016. At least one scratching platform 1011 extends between each at least one aviary tower 1018. In an embodiment, at least one scratching platform 1011 is positioned between an aviary tower 1018 and the respective exterior wall 1016.

Each at least one aviary tower 1018 includes at least one aviary tower section 1021. Each at least one aviary tower section 1021 includes a first outside surface 1022 enclosing an inside area 1013. Each at least one aviary tower 1018 includes an outside surface 1031 enclosing an inside area 1032. At least one bump rail 1015 extends from the outside surface 1031 and into the aisle 1020 to allow equipment to be maneuvered through the aisle 1020 without damaging the at least one aviary tower 1018 or the at least one aviary tower section 1021. The bump rail 1015 may be used by the birds as a perch.

In an embodiment, the aviary 1010 includes at least two aviary towers 1018A and 1018B. In an embodiment, a first aviary tower 1018A includes a first aviary tower section 1021A, and a second aviary tower 1018B includes a second aviary tower section 1021B, which second aviary tower section 1021B is similar to the first aviary tower section 1021A. In the illustrated embodiment, a third aviary tower 1018C includes a third aviary tower section 1021C, which third aviary tower section 1021C is similar to the first aviary tower section 1021A and the second aviary tower section 1021B. In an embodiment, multiple first aviary tower sections 1021A are stacked on top of one another.

Figure 14:
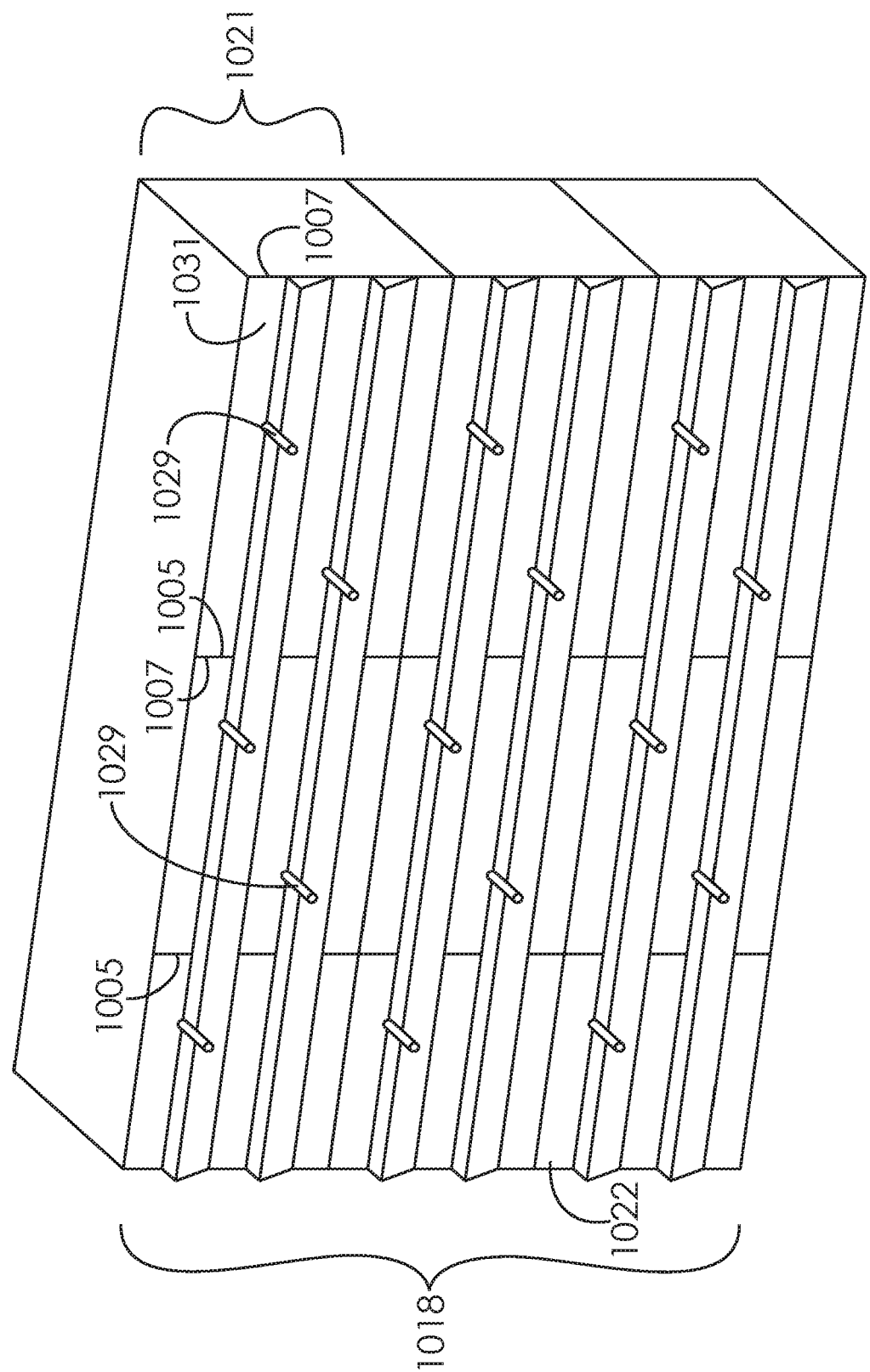
FIG. 14 illustrates a side view of an aviary tower formed in accordance with another embodiment.

In an embodiment, each aviary tower section 1021 has a first end 1005 and a second end 1007. In an embodiment, a level in at least one aviary tower 1018 is formed by placing at least two aviary tower sections 1021 in a row, with the first end 1005 of a first aviary tower section 1021 adjacent the second end 1007 of a second aviary tower section 1021, as shown in FIG. 14. In an embodiment, each first aviary tower section 1021A has a first outside surface 1022A enclosing an inside area 1013A. In an embodiment, multiple second aviary tower sections 1021B are stacked on top of one another. In an embodiment, each second aviary tower section 1021B includes an outside surface 1022B enclosing an inside area 1013B. In an embodiment, multiple third aviary tower sections 1021C are stacked on top of one another. In an embodiment, each third aviary tower section 1021C includes an outside surface 1022C enclosing an inside area 1013C. The second aviary tower section 1021B is positioned adjacent the first aviary tower section 1021A and an aisle 1020 is formed therebetween. The second aviary tower section 1021B is also positioned adjacent the third aviary tower section 1021C and an aisle 1020 is formed therebetween.

In an embodiment, a scratching platform 1011 extends between at least one aviary tower section 1021 and the interior surface 1030 of an adjacent exterior wall 1016. In an embodiment, a scratching platform 1011 extends between the first aviary tower section 1021A and the second aviary tower section 1021B. In an embodiment, a scratching platform 1011 extends between the second aviary tower section 1021B and the third aviary tower section 1021C. In an embodiment, a scratching platform 1011 extends from the outside surface 1031 of the aviary tower 1018.

In an embodiment, the scratching platform 1011 is configured so that a worker can walk across the scratching platform 1011 between the aviary towers 1018A and 1018B. In an embodiment, a scratching platform 1011 is configured so that a worker can walk between aviary tower 1018A and the respective exterior wall 1016. In an embodiment, the scratching platform 1011 is configured so that a worker can walk across the scratching platform 1011 between the aviary towers 1018C and 1018B. In an embodiment, a scratching platform 1011 is configured so that a worker can walk between aviary tower 1018C and the respective exterior wall 1016. The scratching platform 1011 serves as a scratching area where hens can move freely, peck the floor with their beaks, and scratch the scratching platform 1011 with their feet. In one embodiment, the scratching platform 1011 is sloped (not shown) toward the respective aviary tower section 1021 to allow deposits to move back toward the aviary tower section 1021. In an embodiment including a belt positioned under each aviary tower section 1021, the scratching platform 1011 is sloped toward the respective belt to allow deposits to move back toward the belt.

The first outside surface 1022 of the at least one aviary tower section 1021 includes a first perch 1029 extending into the aisle 1020. In an embodiment, each perch 1029 may extend a portion of the length of the at least one aviary tower 1018. In an embodiment, each perch 1029 may extend substantially the entire length of the at least one aviary tower 1018. In an embodiment, the interior surface 1030 of the exterior wall 1016 includes a second perch 1029D extending into the aisle 1020. In an embodiment, each perch 1029D may extend a portion of the length of the interior surface 1030 of the exterior wall 1016 of the aviary 1010. In an embodiment, each perch 1029D may extend substantially the entire length of the interior surface 1030 of the exterior wall 1016.

In some embodiments, the perch 1029, 1029D is solid. In one embodiment, the perch 1029, 1029D may be square. In one embodiment, the perch 1029, 1029D may be round. In one embodiment, a square perch 1029, 1029D may have a width of ¾ inches to 2 inches. In one embodiment, a round perch 1029, 1029D may have a diameter of ¾ inches to 2 inches. The width or diameter of the perch 1029, 1029D is configured to allow a hen to stand on the perch 1029, 1029D.

Referring to an embodiment, a first perch 1029A extends from the first outside surface 1022A and is positioned above a first egg conveyor 1028A that extends from the first outside surface 1022A and that extends substantially the length of the first aviary tower 1018A. When hens lay their eggs, the eggs may be collected in the first egg conveyor 1028A. The first egg conveyor 1028A carries the eggs from the aviary tower section 1021A to a collection area. The first perch 1029A extends into the aisle 1020 at a first vertical distance 1023 from the scratching platform 1011. A second perch 1029B extends from the second outside surface 1022B and is positioned above a second egg conveyor 1028B that extends from the second outside surface 1022B and that extends substantially the length of the second aviary tower 1018B. The second egg conveyor 1028B carries the eggs from the aviary tower section 1021B to a collection area. The second perch 1029B extends into the aisle 1020 at a second vertical distance 1025 from the scratching platform 1011. The first vertical distance 1023 is not equal to the second vertical distance 1025.

In an embodiment, each of the perches 1029A, 1029B may extend a portion of the length of the respective aviary tower 1018A, 1018B. In an embodiment, each of the perches 1029A, 1029B may extend the entire length of the respective aviary tower 1018A, 1018B. In some embodiments, the perches 1029A, 1029B are solid. In one embodiment, the perches 1029A, 1029B may be square. In one embodiment, the perches 1029A, 1029B may be round. In one embodiment, the perches 1029A, 1029B may be square or round. The width or diameter of the perches 1029A, 1029B is configured to allow a hen to stand on the perches 1029A, 1029B.

In an embodiment, the first vertical distance 1023 and the second vertical distance 1025 define a third vertical distance 1027. The third vertical distance 1027 is configured to permit a bird to hop from the first perch 1029A to the second perch 1029B or vice versa.

It will be understood by one of ordinary skill in the art of aviary design that the offset tower section and perch design may be replicated for as many aviary tower combinations as are desired in an aviary 1010. In each case of an adjacent set of aviary towers 1018, the perches 1029 of each aviary tower 1018 should be offset from the perches 1029 of the adjacent aviary tower 1018 by the third vertical distance 1027 to enable a bird to hop from perch 1029 to perch 1029 through aisle 1020 in a ladder-like manner.

In an embodiment, the first aviary tower section 1021A may include multiple first egg conveyors 1028A, and the second aviary tower section 1021B may include multiple second egg conveyors 1028B, wherein the first egg conveyors 1028A and the second egg conveyors 1028B are staggered vertically relative to each other along the first and second outside surfaces 1031A, 1031B of the aviary towers 1018A, 1018B. In an embodiment, the first aviary tower section 1021A may include multiple first perches 1029A, and the second aviary tower section 1021B may include multiple second perches 1029B, wherein the first perches 1029A and the second perches 1029B are staggered vertically relative to each other along the first and second outside surfaces 1022A, 1022B of the aviary tower sections 1021A, 1021B.

In the illustrated embodiments, the scratching platforms 1011 form similarly configured levels 1017 in the aviary 1010, wherein each level 1017 may be accessed by a worker. A hen may walk, peck, scratch, socialize, sleep, and lay eggs, as the bird desires, in the inside area 1013 and the inside area 1032. These same hen activities can be carried out on the at least one scratching platform 1011. The at least one aviary tower section 1021 may house a specific group of birds or it may be open to birds from other aviary tower sections 1021. In an embodiment, the aviary tower 1018 may be configured to allow the birds to move freely up and down the aviary tower 1018. In an embodiment, the aviary tower 1018 may be configured to keep birds in the aviary 1010 segregated by vertical level 1017. In an embodiment, the aviary tower 1018 may be configured to keep birds segregated horizontally within a level 1017 of the aviary tower 1018. When the hens lay their eggs, the eggs may be collected in egg conveyors 1028 that extend substantially the length of the aviary tower 1018. The egg conveyor 1028 carries the eggs from the aviary tower section 1021 to a collection area.

Each perch 1029 and each bump rail 1015 provide yet other areas for the hens to utilize when they are not confined to the at least one aviary tower section 1021. In particular, hens may sit, hop, walk, scratch, socialize, sleep, and lay eggs from or on any perch 1029 and/or any bump rail 1015.

When a first perch 1029A and a second perch 1029B are included in an embodiment, the first vertical distance 1023 and the second vertical distance 1025 define a third vertical distance 1027, which third vertical distance is configured to facilitate the behavior of birds to hop from one surface to another and thereby create a ladder effect between the outside surfaces 1022A, 1022B of the aviary tower sections 1021A, 1021B and, concomitantly, the outside surfaces 1031A, 1031B of the aviary towers 1018A, 1018B.

In one embodiment, an angle formed between the first perch 1029A and the second perch 1029B is no greater than 45°, which facilitates the behavior of birds to hop or fly from one surface to another. In one embodiment, a plurality of first and second perches 1029A, 1029B are spaced apart about the outside surfaces 1031A, 1031B of the respective aviary towers 1018A, 1018B. In an embodiment, each perch 1029A, 1029B extends into the aisle 1020 to provide usable vertical space that creates additional habitable cubic inches for the birds, thereby enabling the aviary 1010 to be considered cage free.

In an embodiment, the first aviary tower section 1021A may include multiple first perches 1029A, corresponding to the number of first egg conveyors 1028A, and the second aviary tower section 1021B may include multiple second perches 1029B, corresponding to the number of second egg conveyors 1028B, wherein the first perches 1029A and the second perches 1029B are staggered in relation to each other along the first and second outside surfaces 1031A, 1031B of the aviary towers 1018A, 1018B. In one embodiment, the first perches 1029A and the second perches 1029B are staggered vertically on the first and second outside surfaces 1031A, 1031B of the aviary towers 1018A, 1018B. In one embodiment, the first perches 1029A and the second perches 1029B are staggered horizontally along the first and second outside surfaces 1031A, 1031B of the aviary towers 1018A, 1018B.

In the illustrated embodiment, an aviary tower 1018C is positioned adjacent the exterior wall 1016 and includes an aviary tower section 1021C adjacent the scratching platform 1011. An egg conveyor 1028C extends from an outside surface 1022C of the aviary tower section 1021C and into the aisle 1020. A perch 1029C extends from the outside surface 1022C of the aviary tower section 1021C and is positioned above the egg conveyor 1028C. A perch 1029D extends from the interior surface 1030 of the exterior wall 1016 and into the aisle 1020.

In an embodiment, a perch 1029C is elevated at a first vertical distance 1033 from the scratching platform 1011, and a perch 1029D is positioned at a second vertical distance 1035 from the scratching platform 1011. In an embodiment, the first vertical distance 1033 and the second vertical distance 1035 define a third vertical distance 1037, which third vertical distance 1037 is configured to facilitate the behavior of birds to hop from one surface to another and thereby create a ladder effect between the aviary tower section 1021C and the exterior wall 1016. In one embodiment, an angle formed between the perch 1029C and the perch 1029D is no greater than 45°, which configuration facilitates the behavior of birds to hop from one surface to another.

In one embodiment, a plurality of perches 1029C is spaced apart about the outside surface 1031C of the aviary tower 1018C. In one embodiment, a plurality of perches 1029D is spaced apart about the interior surface 1030 of the exterior wall 1016. Each perch 1029C, 1029D extends into the aisle 1020 to provide usable vertical space that creates additional habitable cubic inches for the birds, thereby enabling the aviary 1010 to be considered cage free.

As illustrated in FIG. 14, each of the perches 1029 may be offset horizontally with respect to one another. The perches 1029 are offset in a spaced apart arrangement to accommodate the behavior of birds to hop from one surface to another and thereby create a ladder effect on the outside surface 1022 of the aviary tower section 1021 and, concomitantly, the outside surface 1031 of the aviary tower 1018. In an embodiment (not shown), the perches 1029 are sloped downward from the aviary tower 1018. In an embodiment, the perches 1029 extend from the outside surface 1022 parallel to the scratching platform 1011. In an embodiment (not shown), the perches 1029 may extend upward from the outside surface 1022 relative to the aviary tower 1018.

Figure 15:
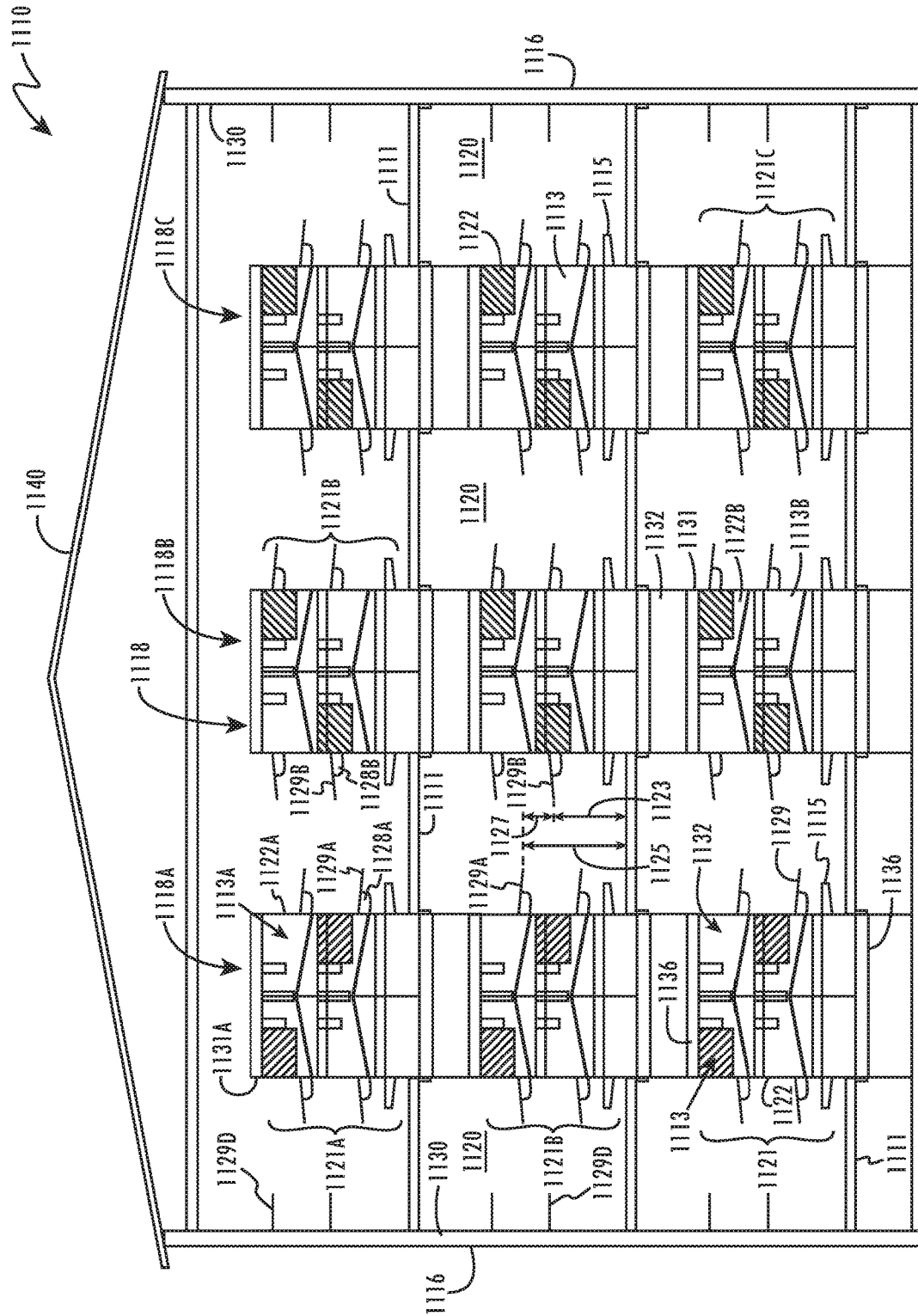
FIG. 15 is a front view of an aviary formed in accordance with another embodiment.

FIG. 15 illustrates an aviary 1110 having a floor 1114, exterior walls 1116, and a roof 1140. The exterior walls 1116 define an interior surface 1130. The exterior walls 1116 enclose at least one aviary tower 1118 where hens may be housed. In an embodiment with multiple aviary towers 1118, an aisle 1120 extends between each aviary tower 1118 to provide an inspection area and space in which the birds housed in the aviary 1110 may move. In an embodiment having a single aviary tower 1118, an aisle 1120 is present on at least one side of the aviary tower 1118. In an embodiment, an aisle 1120 is positioned between an end tower 1118 and the respective exterior wall 1116. At least one scratching platform 1111 extends between each at least one aviary tower 1118. In an embodiment, at least one scratching platform 1111 is positioned between an end aviary tower 1118 and the respective exterior wall 1116.

Each at least one aviary tower 1118 includes at least one aviary tower section 1121. Each at least one aviary tower section 1121 includes a first outside surface 1122 enclosing an inside area 1113. Each at least one aviary tower 1118 includes an outside surface 1131 enclosing an inside area 1132. At least one bump rail 1115 extends from the outside surface 1131 and into the aisle 1120 to allow equipment to be maneuvered through the aisle 1120 without damaging the at least one aviary tower 1118 or the at least one aviary tower section 1121. The bump rail 1115 may be used by the birds as a perch.

Figure 16:
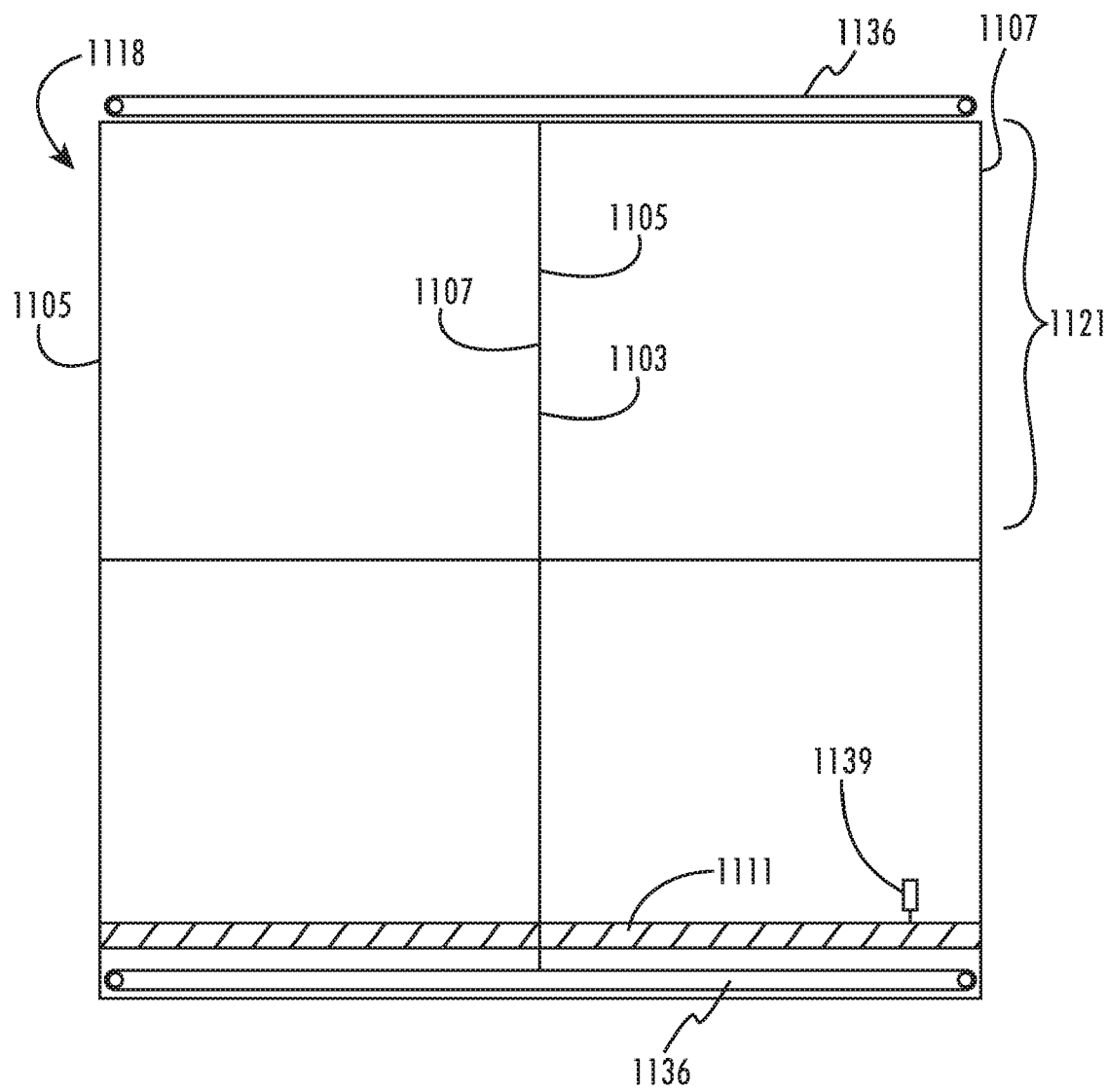
FIG. 16 is a side view of a tower section in an aviary tower shown in FIG. 15.

FIGS. 15 and 16 illustrate at least one aviary tower 1118. In an embodiment, the aviary 1110 includes at least two aviary towers 1118A, 1118B. In an embodiment, a first aviary tower 1118A includes a first aviary tower section 1121A, and a second aviary tower 1118B includes a second aviary tower section 1121B, which second aviary tower section 1121B is similar to the first aviary tower section 1121A. In the illustrated embodiment, a third aviary tower 1118C includes a third aviary tower section 1121C, which third aviary tower section 1121C is similar to the first aviary tower section 1121A and the second aviary tower section 1121B. In an embodiment, multiple first aviary tower sections 1121A are stacked on top of one another.

In an embodiment, aviary tower section 1121 has a first end 1105 and a second end 1107. In an embodiment, a level in at least one aviary tower 1118 is formed by placing at least two aviary tower sections 1121 in a row, with the first end 1105 of a first aviary tower section 1121 adjacent the second end 1107 of a second aviary tower section 1121.

In an embodiment, a divider 1103 may be positioned between the adjacent aviary tower sections 1121. For example, the divider 1103 may be positioned at the juncture of the first end 1105 of the first aviary tower section 1121 and the second end 1107 of the second aviary tower section 1121. In that embodiment, the divider 1103 prevents birds from roaming between the first aviary tower section 1121 and the second aviary tower section 1121. In another embodiment (not shown), a gap may be positioned between the first end 1105 of the first aviary tower section 1121 and the second end 1107 of the second aviary tower section 1121. In that embodiment, the gap may be sized to prevent birds from traversing the gap and roaming between the first aviary tower section 1121 and the second aviary tower section 1121.

In an embodiment, each first aviary tower section 1121A has a first outside surface 1122A enclosing an inside area 1113A. In an embodiment, multiple second aviary tower sections 1121B are stacked on top of one another. In an embodiment, each second aviary tower section 1121B includes a second outside surface 1122B enclosing an inside area 1113B. In an embodiment, multiple third aviary tower sections 1121C are stacked on top of one another. In an embodiment, each third aviary tower section 1121C includes a third outside surface 1122C enclosing an inside area 1113C. The second aviary tower section 1121B is positioned adjacent the first aviary tower section 1121A and an aisle 1120 is formed therebetween. The second aviary tower section 1121B is also positioned adjacent the third aviary tower section 1121C and an aisle 1120 is formed therebetween.

In an embodiment, a scratching platform 1111 extends between at least one aviary tower section 1121 and the interior surface 1130 of an adjacent exterior wall 1116. In an embodiment, a scratching platform 1111 extends between the first aviary tower section 1121A and the second aviary tower section 1121B. In an embodiment, a scratching platform 1111 extends between the second aviary tower section 1121B and the third aviary tower section 1121C. In an embodiment, a scratching platform 1111 extends from the outside surface 1131 of the aviary tower 1118.

In an embodiment, the scratching platform 1111 is configured so that a worker can walk across the scratching platform 1111 between the aviary towers 1118A and 1118B. In an embodiment, a scratching platform 1111 is configured so that a worker can walk between aviary tower 1118A and the respective exterior wall 1116. In an embodiment, the scratching platform 1111 is configured so that a worker can walk across the scratching platform 1111 between the aviary towers 1118C and 1118B. In an embodiment, a scratching platform 1111 is configured so that a worker can walk between aviary tower 1118C and the respective exterior wall 1116.

The scratching platform 1111 serves as a scratching area where hens can move freely, peck the floor with their beaks, and scratch the scratching platform 1111 with their feet. In one embodiment, the scratching platform 1111 is sloped (not shown) toward the respective aviary tower section 1121 to allow deposits to move back toward the aviary tower section 1121. In an embodiment including a belt 1136 positioned under each aviary tower section 1121, the scratching platform 1111 is sloped toward the respective belt 1136 to allow deposits to move back toward the belt 1136.

The first outside surface 1122 of the at least one aviary tower section 1121 includes a first perch 1129 extending into the aisle 1120. In an embodiment, each perch 1129 may extend a portion of the length of the at least one aviary tower 1118. In an embodiment, each perch 1129 may extend substantially the length of the at least one aviary tower 1118. In an embodiment, the interior surface 1130 of the exterior wall 1116 includes a second perch 1129D extending into the aisle 1120. In an embodiment, each perch 1129D may extend a portion of the length of the interior surface 1130 of the exterior wall 1116 of the aviary 1110. In an embodiment, each perch 1129D may extend substantially the length of the interior surface 1130 of the exterior wall 1116.

Referring to an embodiment, a first perch 1129A extends from the first outside surface 1122A of the first aviary tower section 1121A and is positioned above a first egg conveyor 1128A that extends from the first outside surface 1122A and that extends substantially the length of the first aviary tower 1118A. When the hens lay their eggs, the eggs may be collected in the first egg conveyor 1128A. The first egg conveyor 1128A carries the eggs from the aviary tower section 1121A to a collection area. The first perch 1129A extends into the aisle 1120 at a first vertical distance 1123 from the scratching platform 1111. A second perch 1129B extends from the second outside surface 1122B of the second aviary tower section 1121B and is positioned above a second egg conveyor 1128B that extends from the second outside surface 1122B and that extends substantially the length of the second aviary tower 1118B. The second egg conveyor 1128B carries the eggs from the aviary tower section 1121B to a collection area. The second perch 1129B extends into the aisle 1120 at a second vertical distance 1125 from the scratching platform 1111. The first vertical distance 1123 is not equal to the second vertical distance 1125.

In an embodiment, the first vertical distance 1123 and the second vertical distance 1125 define a third vertical distance 1127. The third vertical distance 1127 is configured to permit a bird to hop from the first perch 1129A to the second perch 1129B or vice versa.

It will be understood by one of ordinary skill in the art of aviary design that the offset tower section and perch design may be replicated for as many aviary tower combinations as are desired in an aviary 1110. In each case of an adjacent set of aviary towers 1118, the perches 1129 of each aviary tower 1118 should be offset from the perches 1129 of the adjacent aviary tower 1118 by the third vertical distance 1127 to enable a bird to hop from perch 1129 to perch 1129 through aisle 1120 in a ladder-like manner.

In an embodiment, the first aviary tower 1118A may include multiple first egg conveyors 1128A, and the second aviary tower 1118B may include multiple second egg conveyors 1128B, wherein the first egg conveyors 1128A and the second egg conveyors 1128B are staggered vertically relative to each other along the first and second outside surfaces 1131A, 1131B of the aviary towers 1118A, 1118B. In an embodiment, the first aviary tower 1118A may include multiple first perches 1129A, and the second aviary tower 1118B may include multiple second perches 1129B, wherein the first perches 1129A and the second perches 1129B are staggered vertically relative to each other along the first and second outside surfaces 1131A, 1131B of the aviary towers 1118A, 1118B.

When a first perch 1129A and a second perch 1129B are included in an embodiment, the first vertical distance 1123 and the second vertical distance 1125 define a third vertical distance 1127, which third vertical distance is configured to facilitate the behavior of birds to hop from one surface to another and thereby create a ladder effect between the outside surfaces 1122A, 1122B of the aviary tower sections 1121A, 1121B and, concomitantly, the outside surfaces 1131A, 1131B of the aviary towers 1118A, 1118B.

At least one belt 1136 extends through each aviary tower 1118 to remove a deposit from at least part of the aviary tower 1118. In one embodiment, the belt 1136 extends through each aviary tower 1118 substantially the length of the aviary tower 1118. In one embodiment, the belt 1136 extends approximately 400 feet along the length of each aviary tower 1118. In one embodiment, the belt 1136 carries deposits from the aviary tower 1118 to a collection area (not shown) positioned outside of the aviary tower 1118.

A scratching platform 1111 extends between the first aviary tower section 1121A and the second aviary tower section 1121B. The scratching platform 1111 is oriented with respect to and positioned adjacent to a respective belt 1136. In one embodiment, the scratching platform 1111 is planar with the respective adjacent belt 1136. In one embodiment, the scratching platform 1111 is sloped to allow deposits to move back toward the respective belt 1136. When the birds scratch the scratching platform 1111, they scratch much of the deposits made on the scratching platform 1111 onto the belt 1136. Accordingly, since it is common for birds to defecate in a scratching area, the scratching platform 1111 becomes relatively self-cleaning as the hens scratch. The scratching platform 1111 is configured so that the deposits are scratched back to the respective belt 1136. Such configuration reduces the required frequency for cleaning of the aviary 1110. Any eggs laid on the scratching platform 1111 may be directed back toward the belt 1136 by the scratching of the hens. These eggs are then collected from the belt 1136 and removed from the belt 1136.

In one embodiment, the belt 1136 forms a floor of the aviary tower section 1121. Accordingly, the birds are allowed to move freely and walk on the belt 1136.

Figure 17:
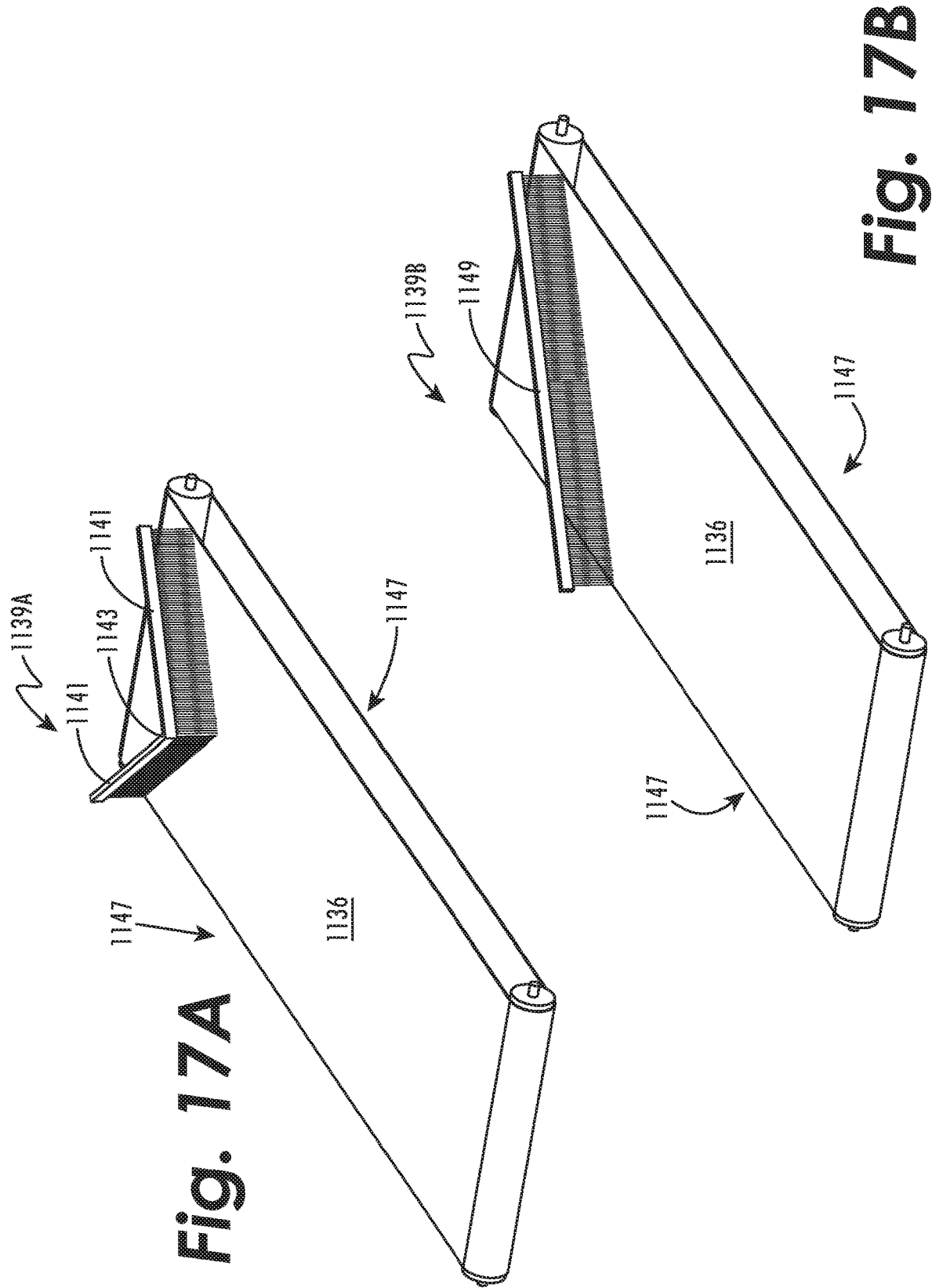
FIG. 17A is a perspective top view of an egg collector formed in accordance with an embodiment.
FIG. 17B is a perspective top view of an egg collector formed in accordance with another embodiment.

In one embodiment, eggs are removed from the belt 1136 through the use of an egg remover 1139 positioned at the end of the belt 1136. FIG. 17A shows one embodiment of an egg remover 1139A. In the illustrated embodiment, the egg remover 1139A includes two brushes 1141 that meet at a point 1143. From the point 1143, each brush 1141 extends toward a side 1147 of the belt 1136. In particular, each brush 1141 extends at an angle toward a side 1147 of the belt 1136 in the direction of movement of the belt 1136, wherein the brushes 1141 extend over the full width of the belt 1136. In an embodiment, the brushes 1141 are round. In that embodiment, the brushes 1141 rotate in a direction that moves material to at least one side 1147 of the belt 1136. In one embodiment, the brush 1141 may be an auger-shaped brush. In an embodiment, the brushes 1141 are flat and divert the eggs toward a side 1147 of the belt 1136. Additionally, in one embodiment, a finger belt (not shown) is utilized to move the eggs to a side 1147 of the belt 1136. In yet another embodiment, any egg conveying apparatus, including but not limited to a roller having a flange, can be utilized to move the eggs to a side 1147 or both sides 1147 of the belt 1136.

FIG. 17B shows another embodiment of an egg remover 1139B. The egg remover 1139B includes a single brush 1149 that extends the width of the belt 1136 at an angle from one side 1147 of the belt 1136 to the other side 1147 of the belt 1136. In an embodiment, the brush 1149 is round. In that embodiment, the brush 1149 rotates in a direction that moves material to the downstream end of the brush 1149 with respect to the direction of movement of the belt 1136. In an embodiment, the brush 1149 is flat and moves material to the downstream end of the brush 1149 with respect to the direction of movement of the belt 1136.

Each brush 1141, 1149 is formed from a material having a rigidity that enables the brush 1141, 1149 to move eggs toward at least one side 1147 of the belt 1136. However, the rigidity is such that the brush 1141, 1149 is incapable of moving deceased birds. Rather, deceased birds pass through and/or under the brush 1141, 1149 and are deposited at an end of the belt 1136. Additionally, the brush 1141, 1149 is positioned above the belt 1136 to enable deposits other than eggs to pass under the brush 1141, 1149.

Figure 18:
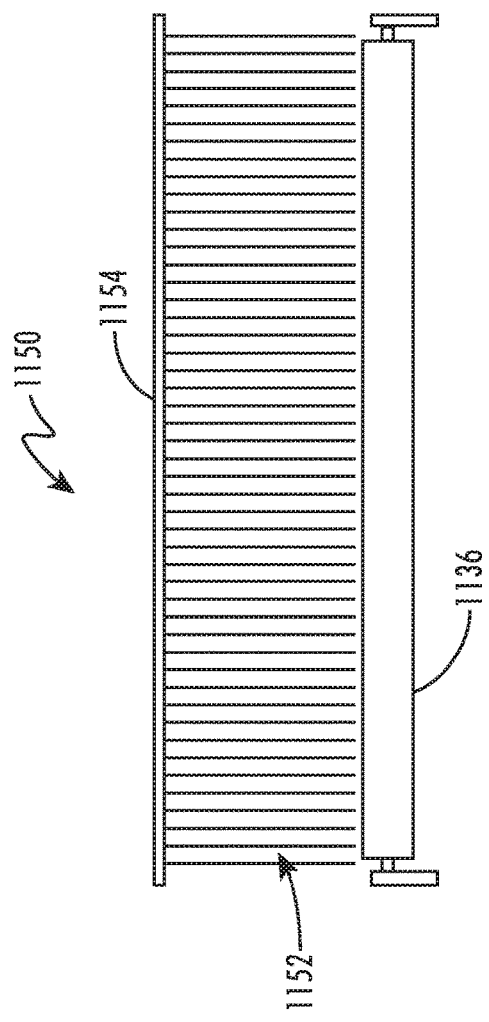
FIG. 18 is a front view of a gate formed in accordance with another embodiment.
Figure 19:
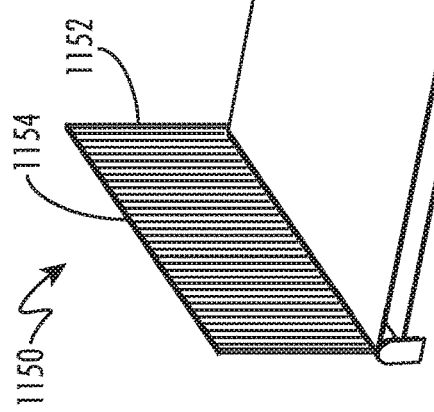
FIG. 19 is a side perspective view of the gate shown in FIG. 18.

In one embodiment, illustrated in FIGS. 18 and 19, at least one gate 1150 is positioned along at least one belt 1136 to permit deposits on the belt 1136 to pass thereunder and/or therethrough and to prevent birds from traveling beyond the gate 1150. In one embodiment, the gate 1150 includes openings 1152 operative to enable deposits to pass therethrough. In an embodiment, the gate 1150 includes overlapping plastic or cloth strips operative to enable deposits to pass therethrough and/or thereunder and to prevent birds from traveling beyond the gate 1150. Additionally, in one embodiment, the gate 1150 includes a hinge 1154 operative to rotate the gate 1150 and thereby enable larger deposits, such as eggs and dead animals, to move past the gate 1150. In an embodiment, an electric fence may be positioned on the gate 1150 to prevent live birds from entering the gate 1150. In an embodiment, an electric fence may be spaced apart from the gate 1150 to prevent birds from reaching and entering the gate 1150. In embodiments including at least one gate 1150, birds are prevented from leaving a part of the aviary 1110 while deposits are permitted to travel away from that part of the aviary 1110.

Figure 20:
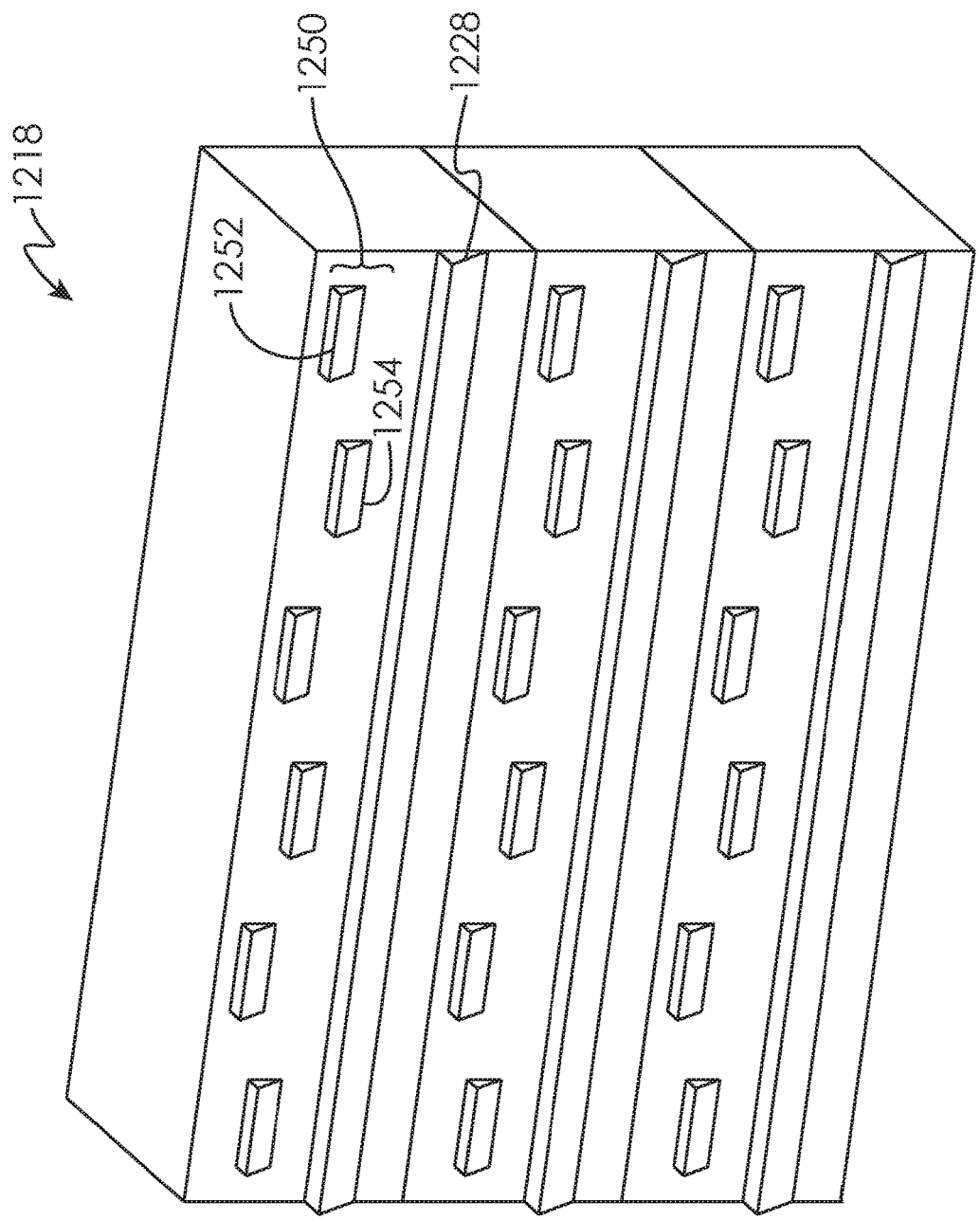
FIG. 20 illustrates a side perspective view of an aviary tower formed in accordance with another embodiment.

In one embodiment shown in FIG. 20, a plurality of perches 1250 is spaced apart about an outside of an aviary tower 1218. First perches 1252 and second perches 1254 may be offset horizontally with respect to one another. In an embodiment, the first perches 1252 and the second perches 1254 may be offset vertically with respect to one another. The perches 1250, if they are offset from each other, may be offset by a hopping distance for a bird. The perches 1250 may be positioned above and below the egg conveyors 1228. Each perch 1250 extends into an aisle formed between adjacent aviary towers 1218 or into an aisle formed between an aviary tower 1218 and an exterior wall 1216. The usable vertical space created by the perches 1250 provides additional habitable cubic inches for the birds.

In one embodiment, a method of constructing an aviary 1010 is provided. The method includes positioning a first aviary tower 1018A adjacent to a second aviary tower 1018B, wherein the first aviary tower 1018A includes a first aviary tower section 1021A, and the second aviary tower 1018B includes a second aviary tower section 1021B. In an embodiment, the method may include stacking multiple first aviary tower sections 1021A on top of one another. In an embodiment, each aviary tower section 1021 has a first end 1005 and a second end 1007.

In an embodiment, the method may include forming a level in at least one aviary tower 1018 by placing at least two aviary tower sections 1021 in a row, with the first end 1005 of a first aviary tower section 1021 adjacent the second end 1007 of a second aviary tower section 1021. In an embodiment, each first aviary tower section 1021A includes a first outside surface 1022A enclosing an inside area 1013A. In an embodiment, the method may include stacking multiple second aviary tower sections 1121B on top of one another. In an embodiment, each second aviary tower section 1021B includes a second outside surface 1022B enclosing an inside area 1013B. The method may include extending an aisle 1020 between the first aviary tower section 1021A and the second aviary tower section 1021B.

In an embodiment, the method may include extending a scratching platform 1011 from a first aviary tower section 1021A through the aisle 1020 to a second aviary tower section 1021B. The method may include extending a first perch 1029A from the first outside surface 1022A of the first aviary tower section 1021A and into the aisle 1020 at a first vertical distance 1023 from a scratching platform 1011. The method may include extending a second perch 1029B from the second outside surface 1022B of the second aviary tower section 1021B and into the aisle 1020 at a second vertical distance 1025 from the scratching platform 1011. In an embodiment, the first vertical distance 1023 and the second vertical distance 1025 define a third vertical distance 1027 in a spaced apart arrangement to accommodate the behavior of birds to hop from one surface to another and thereby create a ladder effect between the outside surfaces 1022A, 1022B of the aviary tower sections 1021A and 1021B.

Each of the first aviary tower 1018A and the second aviary tower 1018B may include at least one belt 1136 positioned within the inside area 1013A, 1013B. The method further includes positioning the first perch 1029A and the second perch 1029B adjacent the respective belt 1136. In one embodiment, the respective belt 1136 forms at least one floor of each aviary tower 1018A, 1018B. The at least one belt 1136 is configured to remove a deposit from at least part of the respective aviary tower 1018A, 1018B. An egg remover 1139 may be positioned at an end of each belt 1136 to remove eggs from the belt 1136. The egg remover 1139 may include at least one brush 1149 to direct material to at least one side 1147 of the belt 1136.

In an embodiment, the method may include positioning a gate 1150 in relation to each belt 1136 to prevent animals from leaving the respective aviary tower section 1021A, 1021B. The gate 1150 may include openings 1152 to enable debris to pass therethrough. Additionally, the gate 1150 may include a hinge 1154 to rotate the gate 1150 and thereby enable eggs and dead animals to move past the gate 1150.

Figure 21:
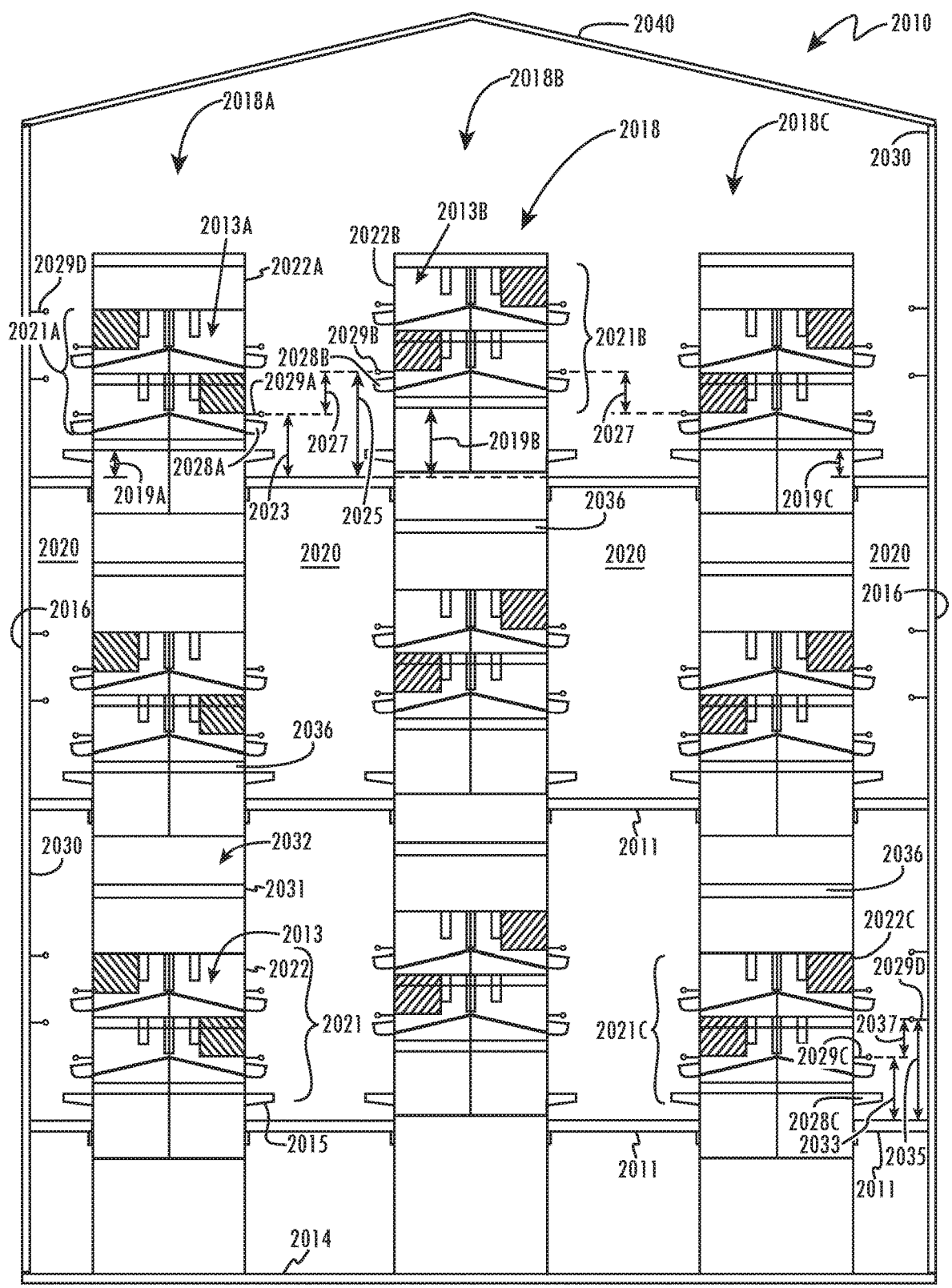
FIG. 21 is a front view of an aviary formed in accordance with another embodiment.

FIG. 21 illustrates an aviary 2010 having a floor 2014, which aviary 2010 is enclosed by exterior walls 2016 and a roof 2040. The exterior walls 2016 define an interior surface 2030. The exterior walls 2016 enclose at least one aviary tower 2018 where hens may be housed. Although the illustrated embodiment shows three aviary towers 2018, it should be noted that the aviary may be constructed with any number of aviary towers 2018, including a single aviary tower 2018. In an embodiment with multiple aviary towers 2018, an aisle 2020 extends between each aviary tower 2018 to provide an inspection area and space in which the birds housed in the aviary 2010 may move. In an embodiment, an aisle 2020 is positioned between an aviary tower 2018 and the respective exterior wall 2016. In an embodiment, at least one scratching platform 2011 extends between each at least one aviary tower 2018. In an embodiment, at least one scratching platform 2011 is positioned between an aviary tower 2018 and the respective exterior wall 2016.

Each at least one aviary tower 2018 includes at least one aviary tower section 2021. Each at least one aviary tower section 2021 includes a first outside surface 2022 enclosing an inside area 2013. Each at least one aviary tower 2018 includes an outside surface 2031 enclosing an inside area 2032. At least one bump rail 2015 extends from the outside surface 2031 and into the aisle 2020 to allow equipment to be maneuvered through the aisle 2020 without damaging the at least one aviary tower 2018 or the at least one aviary tower section 2021. The bump rail 2015 may be used by the birds as a perch.

In an embodiment, a first aviary tower 2018A includes a first aviary tower section 2021A, and a second aviary tower 2018B includes a second aviary tower section 2021B, which second aviary tower section 2021B is similar to the first aviary tower section 2021A. In the illustrated embodiment, a third aviary tower 2018C includes a third aviary tower section 2021C, which third aviary tower section 2021C is similar to the first aviary tower section 2021A and the second aviary tower section 2021B. In an embodiment, multiple first aviary tower sections 2021A are stacked on top of one another. In an embodiment, each first aviary tower section 2021A has a first outside surface 2022A enclosing an inside area 2013A. In an embodiment, multiple second aviary tower sections 2021B are stacked on top of one another. In an embodiment, each second aviary tower section 2021B includes a second outside surface 2022B enclosing an inside area 2013B. In an embodiment, multiple third aviary tower sections 2021C are stacked on top of one another. In an embodiment, each third aviary tower section 2021C includes a third outside surface 2022C enclosing an inside area 2013C. The second aviary tower section 2021B is positioned adjacent the first aviary tower section 2021A and an aisle 2020 is formed therebetween. The second aviary tower section 2021B is also positioned adjacent the third aviary tower section 2021C and an aisle 2020 is formed therebetween.

In an embodiment, the second aviary tower section 2021B is positioned at a height 2019B from the scratching platform 2011 that is greater than a height 2019A of the first aviary tower section 2021A from the scratching platform 2011. In an embodiment, the second aviary tower section 2021B is positioned at a height 2019B from the scratching platform 2011 that is greater than a height 2019C of the third aviary tower section 2021C from the scratching platform 2011. In an embodiment, the height 2019A is substantially equal to the height 2019C. In another embodiment, the height 2019A is not equal to the height 2019C.

In an embodiment, a scratching platform 2011 extends between at least one aviary tower section 2021 and the interior surface 2030 of an adjacent exterior wall 2016. In an embodiment, a scratching platform 2011 extends between the first aviary tower section 2021A and the second aviary tower section 2021B. In an embodiment, a scratching platform 2011 extends between the second aviary tower section 2021B and the third aviary tower section 2021C. In an embodiment, a scratching platform 2011 extends from the outside surface 2031 of the aviary tower 2018.

In an embodiment, the scratching platform 2011 is configured so that a worker can walk across the scratching platform 2011 between the aviary towers 2018A and 2018B. In an embodiment, a scratching platform 2011 is configured so that a worker can walk between aviary tower 2018A and the respective exterior wall 2016. In an embodiment, the scratching platform 2011 is configured so that a worker can walk across the scratching platform 2011 between the aviary towers 2018C and 2018B. In an embodiment, a scratching platform 2011 is configured so that a worker can walk between aviary tower 2018C and the respective exterior wall 2016.

The scratching platform 2011 serves as a scratching area where hens can move freely, peck the floor with their beaks, and scratch the scratching platform 2011 with their feet. In one embodiment, the scratching platform 2011 is sloped (not shown) toward the respective aviary tower section 2021 to allow deposits to move back toward the aviary tower section 2021. In an embodiment including a belt 2036 positioned under each aviary tower section 2021, the scratching platform 2011 is sloped toward the respective belt 2036 to allow deposits to move back toward the belt 2036.

The first outside surface 2022 of the at least one aviary tower section 2021 includes a first perch 2029 extending into the aisle 2020. In an embodiment, each perch 2029 may extend a portion of the length of the at least one aviary tower 2018. In an embodiment, each perch 2029 may extend substantially the length of the at least one aviary tower 2018. In an embodiment, the interior surface 2030 of the exterior wall 2016 includes a second perch 2029D extending into the aisle 2020. In an embodiment, each perch 2029D may extend a portion of the length of the interior surface 2030 of the exterior wall 2016 of the aviary 2010. In an embodiment, each perch 2029D may extend substantially the length of the interior surface 2030 of the exterior wall 2016.

Referring to an embodiment, a first perch 2029A extends from the first outside surface 2022A of the first aviary tower section 2021A and is positioned above a first egg conveyor 2028A that extends from the first outside surface 2022A and that extends substantially the length of the first aviary tower 2018A. When hens lay their eggs, the eggs may be collected in the first egg conveyor 2028A. The first egg conveyor 2028A carries the eggs from the aviary tower section 2021A to a collection area. The first perch 2029A extends into the aisle 2020 at a first vertical distance 2023 from the scratching platform 2011. A second perch 2029B extends from the second outside surface 2022B of the second aviary tower section 2021B and is positioned above a second egg conveyor 2028B that extends from the second outside surface 2022B and that extends substantially the length of the second aviary tower 2018B. The second egg conveyor 2028B carries the eggs from the aviary tower section 2021B to a collection area. The second perch 2029B extends into the aisle 2020 at a second vertical distance 2025 from the scratching platform 2011. The first vertical distance 2023 is not equal to the second vertical distance 2025.

In an embodiment, the first vertical distance 2023 and the second vertical distance 2025 define a third vertical distance 2027. The third vertical distance 2027 is configured to permit a bird to hop from the first perch 2029A to the second perch 2029B or vice versa.

It will be understood by one of ordinary skill in the art of aviary design that the offset tower section and perch design may be replicated for as many aviary tower combinations as are desired in an aviary 2010. In each case of an adjacent set of aviary towers 2018, the perches 2029 of each aviary tower 2018 should be offset from the perches 2029 of the adjacent aviary tower 2018 by the third vertical distance 2027 to enable a bird to hop from perch 2029 to perch 2029 through aisle 2020 in a ladder-like manner. In an embodiment, the first aviary tower 2018A may include multiple first egg conveyors 2028A, and the second aviary tower 2018B may include multiple second egg conveyors 2028B, wherein the first egg conveyors 2028A and the second egg conveyors 2028B are staggered vertically relative to each other along the first and second outside surfaces 2031A, 2031B of the aviary towers 2018A, 2018B. In an embodiment, the first aviary tower 2018A may include multiple first perches 2029A, and the second aviary tower 2018B may include multiple second perches 2029B, wherein the first perches 2029A and the second perches 2029B are staggered vertically relative to each other along the first and second outside surfaces 2031A, 2031B of the aviary towers 2018A, 2018B.

When a first perch 2029A and a second perch 2029B are included in an embodiment, the first vertical distance 2023 and the second vertical distance 2025 define a third vertical distance 2027, which third vertical distance is configured to facilitate the behavior of birds to hop from one surface to another and thereby create a ladder effect between the outside surfaces 2022A, 2022B of the aviary tower sections 2021A, 2021B and, concomitantly, the outside surfaces 2031A, 2031B of the aviary towers 2018A, 2018B.

In an illustrated embodiment, an aviary tower 2018C is positioned adjacent the exterior wall 2016 and includes an aviary tower section 2021C adjacent the scratching platform 2011. An egg conveyor 2028C extends from an outside surface 2022C of the aviary tower section 2021C and into the aisle 2020. A perch 2029C extends from the outside surface 2022C of the aviary tower section 2021C and is positioned above the egg conveyor 2028C. A perch 2029D extends from the interior surface 2030 of the exterior wall 2016 and into the aisle 2020.

In an embodiment, the perch 2029C is elevated at a first vertical distance 2033 from the scratching platform 2011, and the perch 2029D is positioned at a second vertical distance 2035 from the scratching platform 2011. In an embodiment, the first vertical distance 2033 and the second vertical distance 2035 define a third vertical distance 2037, which third vertical distance 2037 is configured to facilitate the behavior of birds to hop from one surface to another and thereby create a ladder effect between the aviary tower section 2021C and the exterior wall 2016.

In one embodiment, an angle formed between the perch 2029C and the perch 2029D is no greater than 45°, which configuration facilitates the behavior of birds to hop from one surface to another. In one embodiment, a plurality of perches 2029C is spaced apart about the outside surface 2031C of the aviary tower 2018C. In one embodiment, a plurality of perches 2029D is spaced apart about the interior surface 2030 of the exterior wall 2016. Each perch 2029C, 2029D extends into the aisle 2020 to provide usable vertical space that creates additional habitable cubic inches for the birds, thereby enabling the aviary 2010 to be considered cage free.

In an embodiment, the perches 2029A, 2029B, 2029C are offset as a result of the aviary tower sections 2021A, 2021B, 2021C being positioned at different heights from the scratching platform 2011 and, concomitantly, from the floor 2014. Accordingly, by offsetting the heights 2019A, 2019B, 2019C of the aviary tower sections 2021A, 2021B, 2021C the perches 2029A, 2029B, 2029C become offset.

Each of the perches 2029 are offset in a spaced apart arrangement to accommodate the behavior of birds to hop from one surface to another and thereby create a ladder effect on the outside surface 2022 of the aviary tower section 2021 and, concomitantly, the outside surface 2031 of the aviary tower 2018. In an embodiment, the perches 2029 are sloped downward from the aviary tower 2018. In an embodiment, the perches 2029 extend from the outside surface 2022 parallel to the scratching platform 2011. In an embodiment, the perches 2029 may extend upward from the outside surface 2022 relative to the aviary tower 2018.

Figure 22:
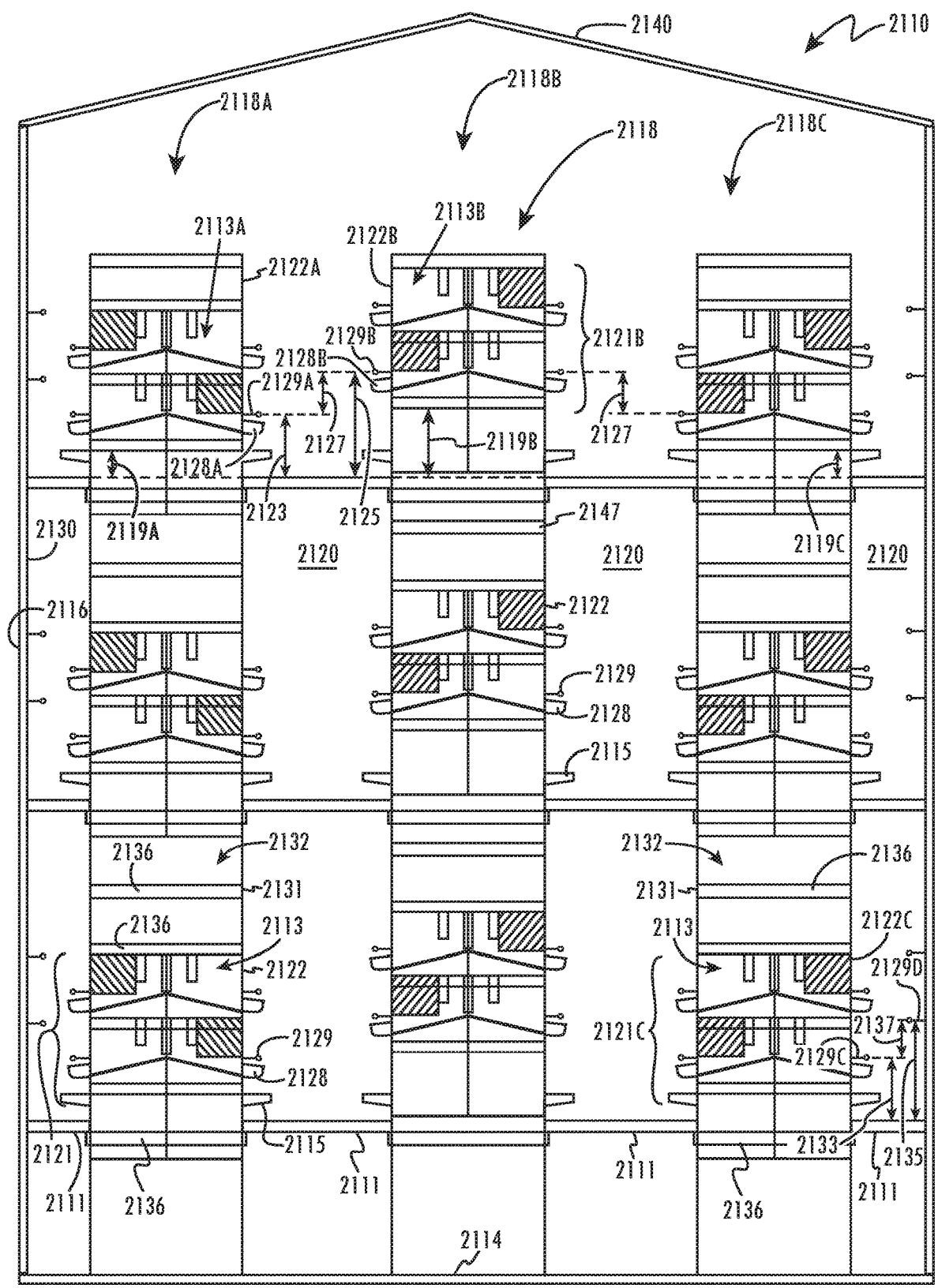
FIG. 22 is a front view of an aviary formed in accordance with another embodiment.

FIG. 22 illustrates an aviary 2110 having a floor 2114, which aviary 2110 is enclosed by exterior walls 2116 and a roof 2140. The exterior walls 2116 define an interior surface 2130. The exterior walls 2116 enclose at least one aviary tower 2118 where hens may be housed. In an embodiment having multiple aviary towers 2118, an aisle 2120 extends between each aviary tower 2118 to provide an inspection area and space in which the birds housed in the aviary 2110 may move. In an embodiment, an aisle 2120 is positioned between an end aviary tower 2118 and the respective exterior wall 2116. In an embodiment having multiple aviary towers 2118, at least one scratching platform 2111 extends between each at least one aviary tower 2118. In an embodiment, at least one scratching platform 2111 is positioned between an end aviary tower 2118 and the respective exterior wall 2116

Figure 23:
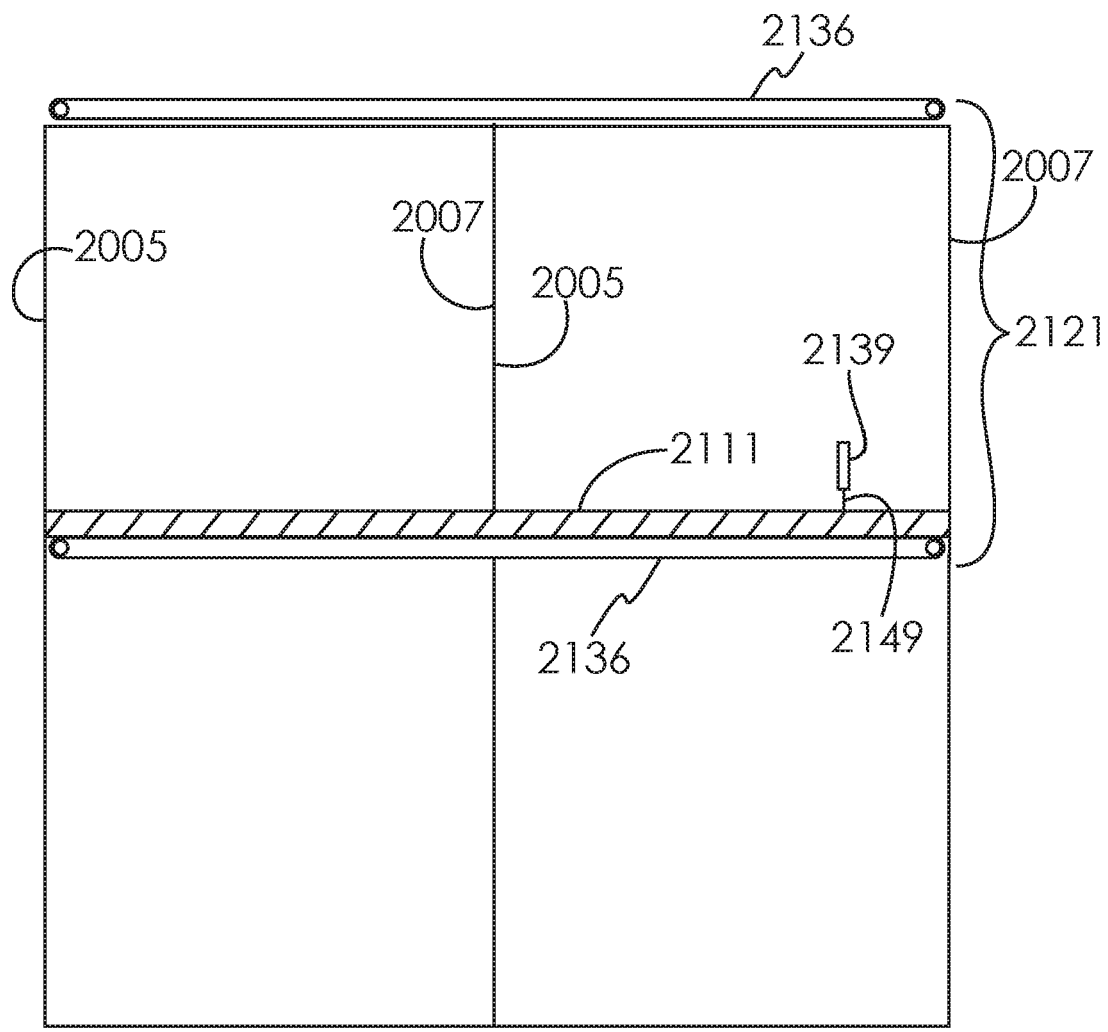
FIG. 23 is a side view of an aviary tower section in an aviary tower shown in FIG. 22.

FIGS. 22 and 23 illustrate at least one aviary tower 2118. Each at least one aviary tower 2118 includes at least one aviary tower section 2121. Each at least one aviary tower section 2121 includes a first outside surface 2122 enclosing an inside area 2113. Each at least one aviary tower 2118 includes an outside surface 2131 enclosing an inside area 2132. At least one bump rail 2115 extends from the outside surface 2131 and into the aisle 2120 to allow equipment to be maneuvered through the aisle 2120 without damaging the at least one aviary tower 2118 or the at least one aviary tower section 2121. The bump rail 2115 may be used by the birds as a perch.

In an embodiment, a first aviary tower 2118A includes a first aviary tower section 2121A, and a second aviary tower 2118B includes a second aviary tower section 2121B, which second aviary tower section 2121B is similar to the first aviary tower section 2121A. In the illustrated embodiment, a third aviary tower 2118C includes a third aviary tower section 2121C, which third aviary tower section 2121C is similar to the first aviary tower section 2121A and the second aviary tower section 2121B. In an embodiment, multiple first aviary tower sections 2121A are stacked on top of one another. In an embodiment, each first aviary tower section 2121A has a first outside surface 2122A enclosing an inside area 2113A. In an embodiment, multiple second aviary tower sections 2121B are stacked on top of one another. In an embodiment, each second aviary tower section 2121B includes a second outside surface 2122B enclosing an inside area 2113B. In an embodiment, multiple third aviary tower sections 2121C are stacked on top of one another. In an embodiment, each third aviary tower section 2121C includes a third outside surface 2122C enclosing an inside area 2113C. The second aviary tower section 2121B is positioned adjacent the first aviary tower section 2121A and an aisle 2120 is formed therebetween. The second aviary tower section 2121B is also positioned adjacent the third aviary tower section 2121C and an aisle 2120 is formed therebetween.

In an embodiment, the second aviary tower section 2121B is positioned at a height 2119B from the scratching platform 2111 that is greater than a height 2119A of the first aviary tower section 2121A from the scratching platform 2111. In an embodiment, the second aviary tower section 2121B is positioned at a height 2119B from the scratching platform 2111 that is greater than a height 2119C of the third aviary tower section 2121C from the scratching platform 2111. In an embodiment, the height 2119A is substantially equal to the height 2119C. In another embodiment, the height 2119A is not equal to the height 2119C.

In an embodiment, a scratching platform 2111 extends between at least one aviary tower section 2121 and the interior surface 2130 of an adjacent exterior wall 2116. In an embodiment, a scratching platform 2111 extends between the first aviary tower section 2121A and the second aviary tower section 2121B. In an embodiment, a scratching platform 2111 extends between the second aviary tower section 2121B and the third aviary tower section 2121C. In an embodiment, a scratching platform 2111 extends from the outside surface 2131 of the aviary tower 2118.

In an embodiment, the scratching platform 2111 is configured so that a worker can walk across the scratching platform 2111 between the aviary towers 2118A and 2118B. In an embodiment, a scratching platform 2111 is configured so that a worker can walk between aviary tower 2118A and the respective exterior wall 2116. In an embodiment, the scratching platform 2111 is configured so that a worker can walk across the scratching platform 2111 between the aviary towers 2118C and 2118B. In an embodiment, a scratching platform 2111 is configured so that a worker can walk between aviary tower 2118C and the respective exterior wall 2116.

The scratching platform 2111 serves as a scratching area where hens can move freely, peck the floor with their beaks, and scratch the scratching platform 2111 with their feet. In one embodiment, the scratching platform 2111 is sloped (not shown) toward the respective aviary tower section 2121 to allow deposits to move back toward the aviary tower section 2121. In an embodiment including a belt 2136 positioned under each aviary tower section 2121, the scratching platform 2111 is sloped toward the respective belt 2136 to allow deposits to move back toward the belt 2136.

The first outside surface 2122 of the at least one aviary tower section 2121 includes a first perch 2129 extending into the aisle 2120. In an embodiment, each perch 2129 may extend a portion of the length of the at least one aviary tower 2118. In an embodiment, each perch 2129 may extend substantially the length of the at least one aviary tower 2118. In an embodiment, the interior surface 2130 of the exterior wall 2116 includes a second perch 2129D extending into the aisle 2120. In an embodiment, each perch 2129D may extend a portion of the length of the interior surface 2130 of the exterior wall 2116 of the aviary 2110. In an embodiment, each perch 2129D may extend substantially the length of the interior surface 2130 of the exterior wall 2116.

Referring to an embodiment, a first perch 2129A extends from the first outside surface 2122A of the first aviary tower section 2121A and is positioned above a first egg conveyor 2128A that extends from the first outside surface 2122A and that extends substantially the length of the first aviary tower 2118A. When the hens lay their eggs, the eggs may be collected in the first egg conveyor 2128A. The first egg conveyor 2128A carries the eggs from the aviary tower section 2121A to a collection area. The first perch 2129A extends into the aisle 2120 at a first vertical distance 2123 from the scratching platform 2111. A second perch 2129B extends from the second outside surface 2122B of the second aviary tower section 2121B and is positioned above a second egg conveyor 2128B that extends from the second outside surface 2122B and that extends substantially the length of the second aviary tower 2118B. The second egg conveyor 2128B carries the eggs from the aviary tower section 2121B to a collection area. The second perch 2129B extends into the aisle 2120 at a second vertical distance 2125 from the scratching platform 2111. The first vertical distance 2123 is not equal to the second vertical distance 2125.

In an embodiment, the first vertical distance 2123 and the second vertical distance 2125 define a third vertical distance 2127. The third vertical distance 2127 is configured to permit a bird to hop from the first perch 2129A to the second perch 2129B or vice versa. In such an embodiment, the perches 2129A, 2129B are offset as a result of the aviary tower sections 2121A, 2121B being positioned at different heights. Accordingly, by offsetting the heights 2119A, 2119B of the similar aviary tower sections 2121A, 2121B the perches 2129A, 2129B become offset.

It will be understood by one of ordinary skill in the art of aviary design that the offset tower section and perch design may be replicated for as many aviary tower combinations as are desired in an aviary 2110. In each case of an adjacent set of aviary towers 2118, the perches 2129 of each aviary tower 2118 should be offset from the perches 2129 of the adjacent aviary tower 2118 by the third vertical distance 2127 to enable a bird to hop from perch 2129 to perch 2129 through aisle 2120 in a ladder-like manner. It will also be understood by one of ordinary skill that manufacturing, assembly, and installation time may be saved when building aviary 2110 when aviary tower section units 2121 are similar to each other. Similar aviary tower section units 2121 permit the construction of aviary towers 2118 with perches 2129 that are offset in height from perches 2129 on aviary towers 2118 that are separated by an aisle 2120 by simply installing the aviary tower section unit 2121 in one aviary tower 2118 at a height different from the height of installation for an aviary tower section unit 2121 in an adjacent aviary tower 2118.

In an embodiment, the first aviary tower 2118A may include multiple first egg conveyors 2128A, and the second aviary tower 2118B may include multiple second egg conveyors 2128B, wherein the first egg conveyors 2128A and the second egg conveyors 2128B are staggered vertically relative to each other along the first and second outside surfaces 2131A, 2131B of the aviary towers 2118A, 2118B. In an embodiment, the first aviary tower 2118A may include multiple first perches 2129A, and the second aviary tower 2118B may include multiple second perches 2129B, wherein the first perches 2129A and the second perches 2129B are staggered vertically relative to each other along the first and second outside surfaces 2131A, 2131B of the aviary towers 2118A, 2118B.

When a first perch 2129A and a second perch 2129B are included in an embodiment, the first vertical distance 2123 and the second vertical distance 2125 define a third vertical distance 2127, which third vertical distance is configured to facilitate the behavior of birds to hop from one surface to another and thereby create a ladder effect between the outside surfaces 2122A, 2122B of the aviary tower sections 2121A, 2121B and, concomitantly, the outside surfaces 2131A, 2131B of the aviary towers 2118A, 2118B.

At least one belt 2136 extends through each aviary tower 2118 to remove a deposit from at least part of the aviary tower 2118. In one embodiment, the belt 2136 extends through each tower section 2118 substantially the length of the aviary tower 2118. In one embodiment, the belt 2136 extends approximately 400 feet along the length of each aviary tower 2118. In one embodiment, the belt 2136 carries deposits from the aviary tower 2118 to a collection area (not shown) positioned outside of the aviary tower 2118.

A scratching platform 2111 extends between the first aviary tower section 2121A and the second aviary tower section 2121B. The scratching platform 2111 is oriented with respect to and positioned adjacent to a respective belt 2136. In one embodiment, the scratching platform 2111 is planar with the respective belt 2136. In an embodiment, the scratching platform 2111 is sloped to allow deposits to move back toward the respective belt 2136. When the birds scratch the scratching platform 2111, they scratch much of the deposits made on the scratching platform 2111 onto the belt 2136. Accordingly, since it is common for birds to defecate in a scratching area, the scratching platform 2111 becomes relatively self-cleaning as the hens scratch. The scratching platform 2111 is configured so that the deposits are scratched back to the respective belt 2136. Such configuration reduces the required frequency for cleaning of the aviary 2110. Any eggs laid on the scratching platform 2111 may be directed back toward the belt 2136 by the scratching of the hens. These eggs are then collected from the belt 2136 and removed from the belt 2136.

In one embodiment, the belt 2136 forms a floor of the aviary tower section 2121. Accordingly, the birds are allowed to move freely and walk on the belt 2136.

In one embodiment, a method of constructing an aviary 2010 is provided. The method includes positioning a first aviary tower 2018A adjacent to a second aviary tower 2018B, wherein the first aviary tower 2018A includes a first aviary tower section 2021A, and the second aviary tower 2018B includes a second aviary tower section 2021B. In an embodiment, the method may include stacking multiple first aviary tower sections 2021A on top of one another. In an embodiment, each aviary tower section 2021 has a first end 2005 and a second end 2007. In an embodiment, the method may include forming a level in at least one aviary tower 2018 by placing at least two aviary tower sections 2021 in a row, with the first end 2005 of a first aviary tower section 2021 adjacent the second end 2007 of a second aviary tower section 2021. In an embodiment, each first aviary tower section 2021A includes a first outside surface 2022A enclosing an inside area 2013A. In an embodiment, the method may include stacking multiple second aviary tower sections 2121B on top of one another. In an embodiment, each second aviary tower section 2021B includes a second outside surface 2022B enclosing an inside area 2013B. The method may include extending an aisle 2020 between the first aviary tower section 2021A and the second aviary tower section 2021B. In an embodiment, the method may include positioning the second aviary tower section 2021B at a height 2019B from the scratching platform 2011 that is greater than a height 2019A of the first aviary tower section 2021A from the scratching platform 2011.

In an embodiment, the method may include extending a scratching platform 2011 from a first aviary tower section 2021A through the aisle 2020 to a second aviary tower section 2021B. The method may include extending a first perch 2029A from the first outside surface 2022A of the first aviary tower section 2021A and into the aisle 2020 at a first vertical distance 2023 from a scratching platform 2011. The method may include extending a second perch 2029B from the second outside surface 2022B of the second aviary tower section 2021B and into the aisle 2020 at a second vertical distance 2025 from the scratching platform 2011. In an embodiment, the first vertical distance 2023 and the second vertical distance 2025 define a third vertical distance 2027 in a spaced apart arrangement to accommodate the behavior of birds to hop from one surface to another and thereby create a ladder effect between the outside surfaces 2022A, 2022B of the aviary tower sections 2021A and 2021B.

Each of the first aviary tower 2018A and the second aviary tower 2018B may include at least one belt 2136 positioned within the inside area 2013A, 2013B. The method further includes positioning the first perch 2029A and the second perch 2029B adjacent the respective belt 2136. In one embodiment, the respective belt 2136 forms at least one floor of each aviary tower 2018A, 2018B. The at least one belt 2136 is configured to remove a deposit from at least part of the respective aviary tower 2018A, 2018B. An egg remover 2139 may be positioned at an end of each belt 2136 to remove eggs from the belt 2136. The egg remover 2139 may include at least one brush 2149 to direct material to at least one side 2147 of the belt 2136.

Figure 24:
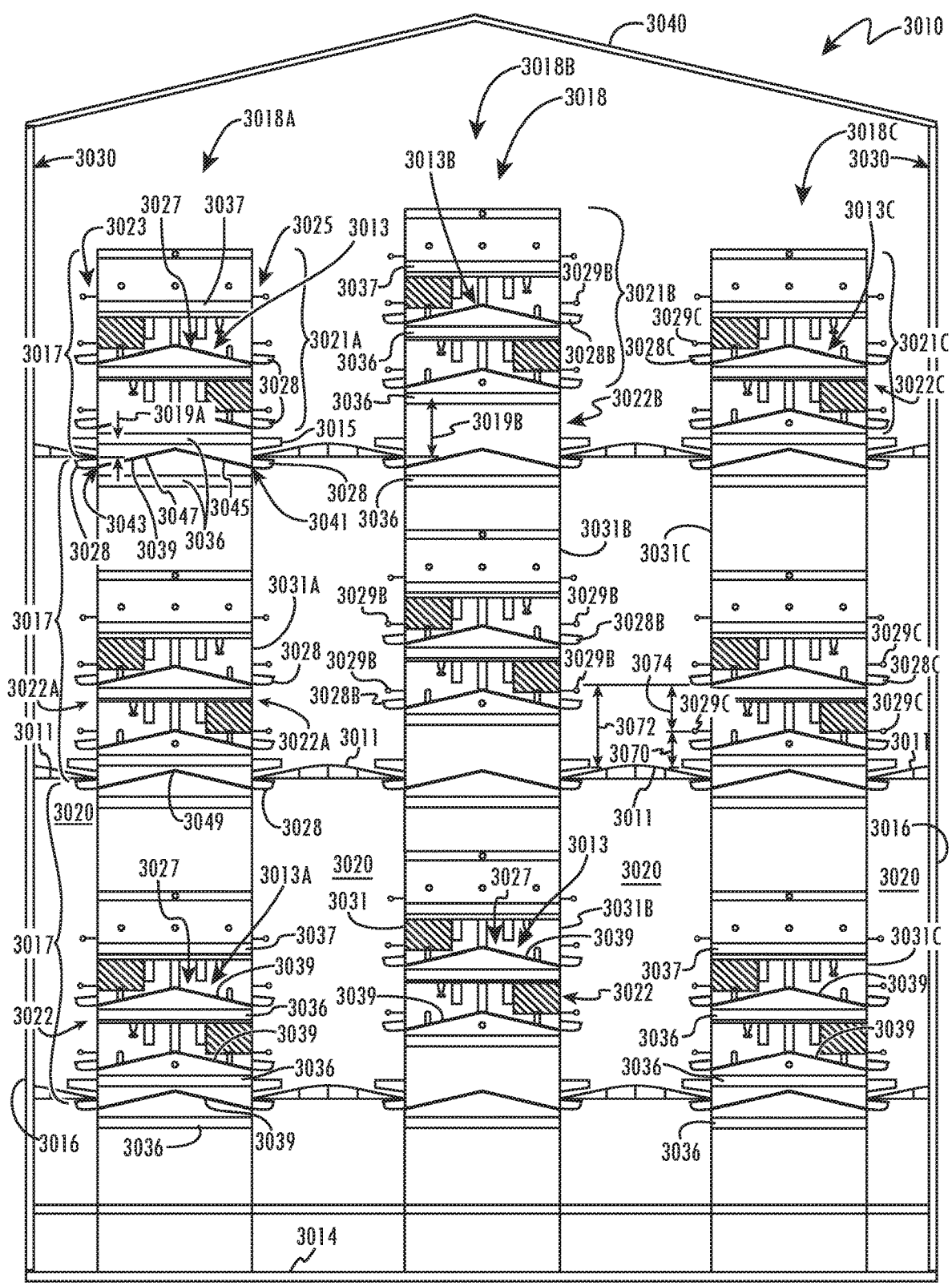
FIG. 24 is a front view of an aviary formed in accordance with another embodiment.

FIG. 24 illustrates an aviary 3010 having a floor 3014, which aviary 3010 is enclosed by exterior walls 3016 and a roof 3040. The exterior walls 3016 define an interior surface 3030. The exterior walls 3016 enclose at least one aviary tower 3018 where hens may be disposed. Each at least one aviary tower 3018 includes an outside surface 3031 enclosing an inside area 3013. In an embodiment having multiple aviary towers, an aisle 3020 extends between each aviary tower 3018 to provide an inspection area and additional space in which the birds housed in the aviary 3010 may move. In an embodiment, an aisle 3020 is positioned between an aviary tower 3018 and the respective exterior wall 3016. In an embodiment having multiple aviary towers, at least one scratching platform 3011 extends between each at least one aviary tower 3018. In an embodiment, a scratching platform 3011 extends between the interior surface 3030 of each exterior wall 3016 and the adjacent aviary tower 3018.

Figure 25:
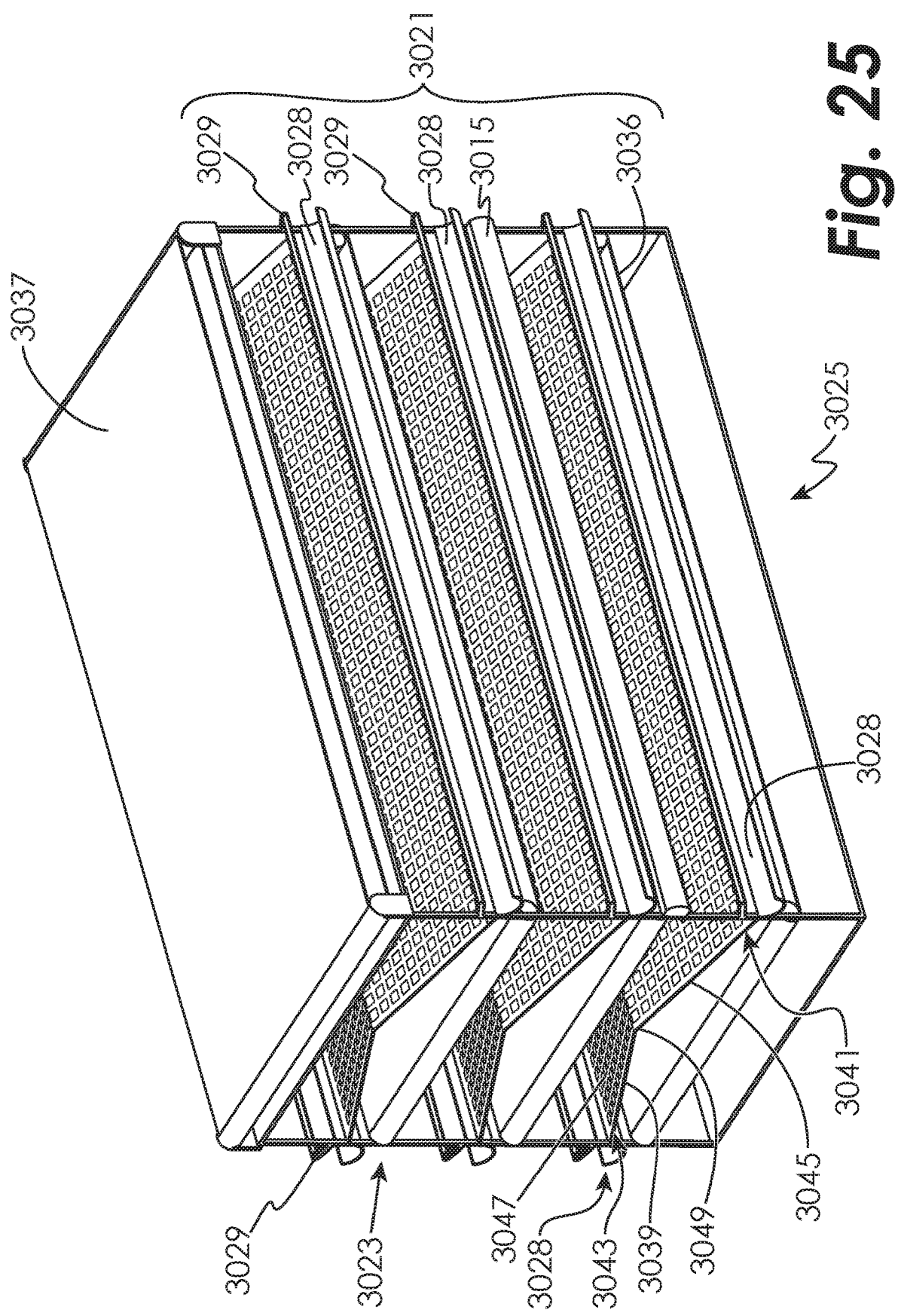
FIG. 25 is a side perspective view of an aviary tower section shown in FIG. 24.
Figure 26:
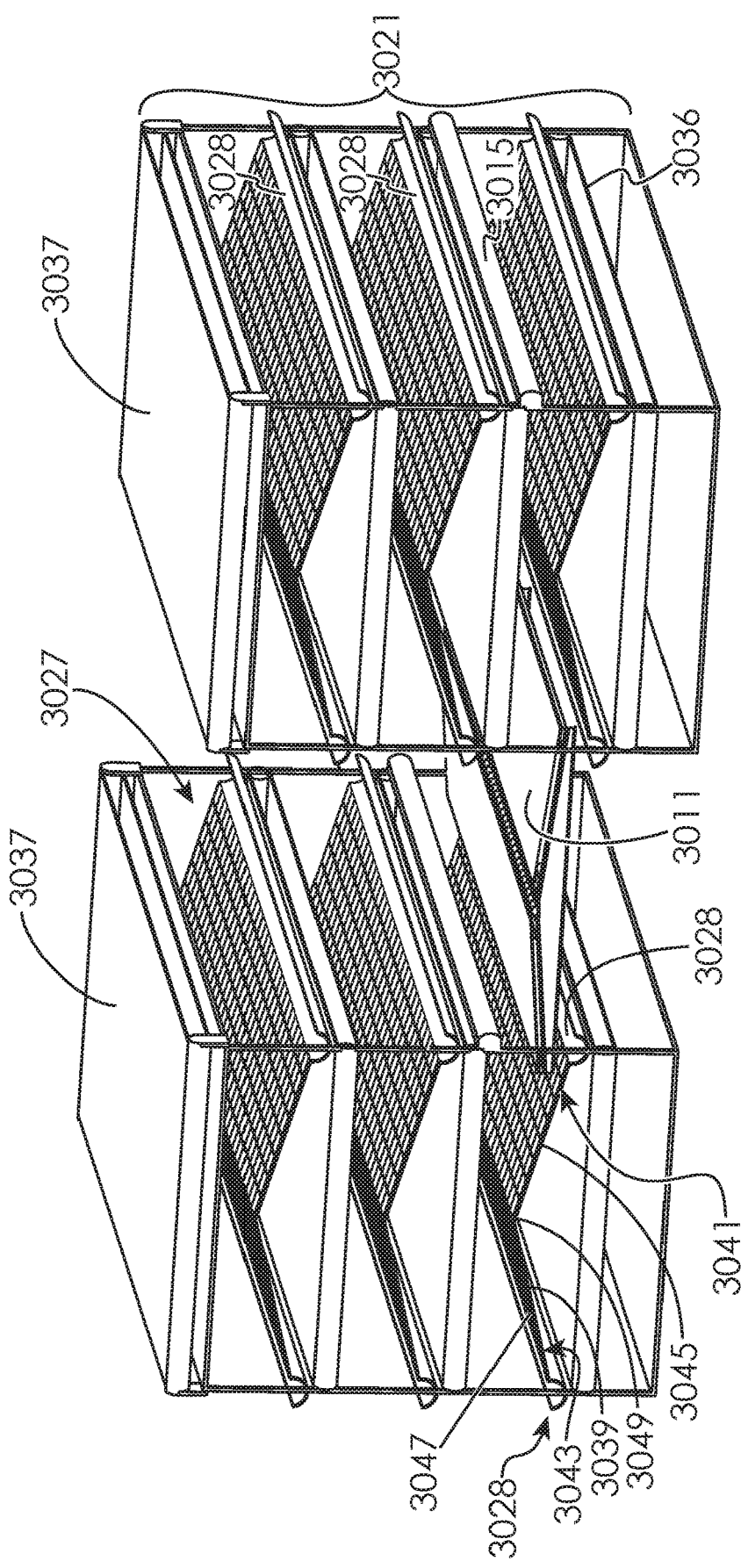
FIG. 26 is a side perspective view of a first aviary tower section, a second aviary tower section, and a scratching platform shown in FIG. 24.

FIGS. 25 and 26 illustrate at least one aviary tower section 3021 in an embodiment. Each at least one aviary tower 3018 includes at least one aviary tower section 3021. Each at least one aviary tower section 3021 includes a first side 3025 and a second side 3023 enclosing an inside area 3013. At least one bump rail 3015 extends from each of the first side 3025 and the second side 3023 and into the respective aisle 3020 to allow equipment to be maneuvered through the aisle 3020 without damaging the at least one aviary tower 3018 or the at least one aviary tower section 3021. The bump rail 3015 may be used by the birds as a perch.

Each aviary tower section 3021 includes at least one laying area 3027. The laying area 3027 provides space where a hen may sit to lay eggs. As the hens lay their eggs, the eggs are collected in egg conveyors 3028 that extend along the sides 3025 and 3023 of the aviary tower section 3021. The egg conveyors 3028 carry the eggs from the laying area 3027 to a collection area (not shown).

At least one belt 3036 extends through the aviary tower 3018 to remove a deposit from at least part of the aviary tower 3018. In an embodiment, a plurality of belts 3036 extends through the aviary tower 3018 to remove deposits from at least part of the aviary tower 3018. The plurality of belts 3036 are positioned at various vertical locations within each aviary tower 3018. At least one belt 3036 of the plurality of belts 3036 is positioned below the laying area 3027 of each aviary tower section 3021. Additional belts 3036 of the plurality of belts 3036 extend through the laying area 3027 of each aviary tower section 3021. In one embodiment, at least one belt 3036 extends through the aviary tower 3018 substantially the length of the aviary tower 3018. In one embodiment, the belt 3036 extends approximately 400 feet along the length of the aviary tower 3018.

In one embodiment, the belt 3036 carries manure from the aviary tower 3018 to a collection area (not shown) positioned outside of the aviary tower 3018. In one embodiment, the belt 3036 carries litter deposited onto it from the scratching platform 3011 as described in greater detail hereinbelow. The litter may be carried from the aviary tower 3018 to a collection area (not shown) positioned outside of the aviary tower 3018, and in some embodiments some or all of the litter may be captured and reintroduced to the litter supply system of one or more scratching platforms 3011 as described in greater detail hereinbelow.

Figure 27:
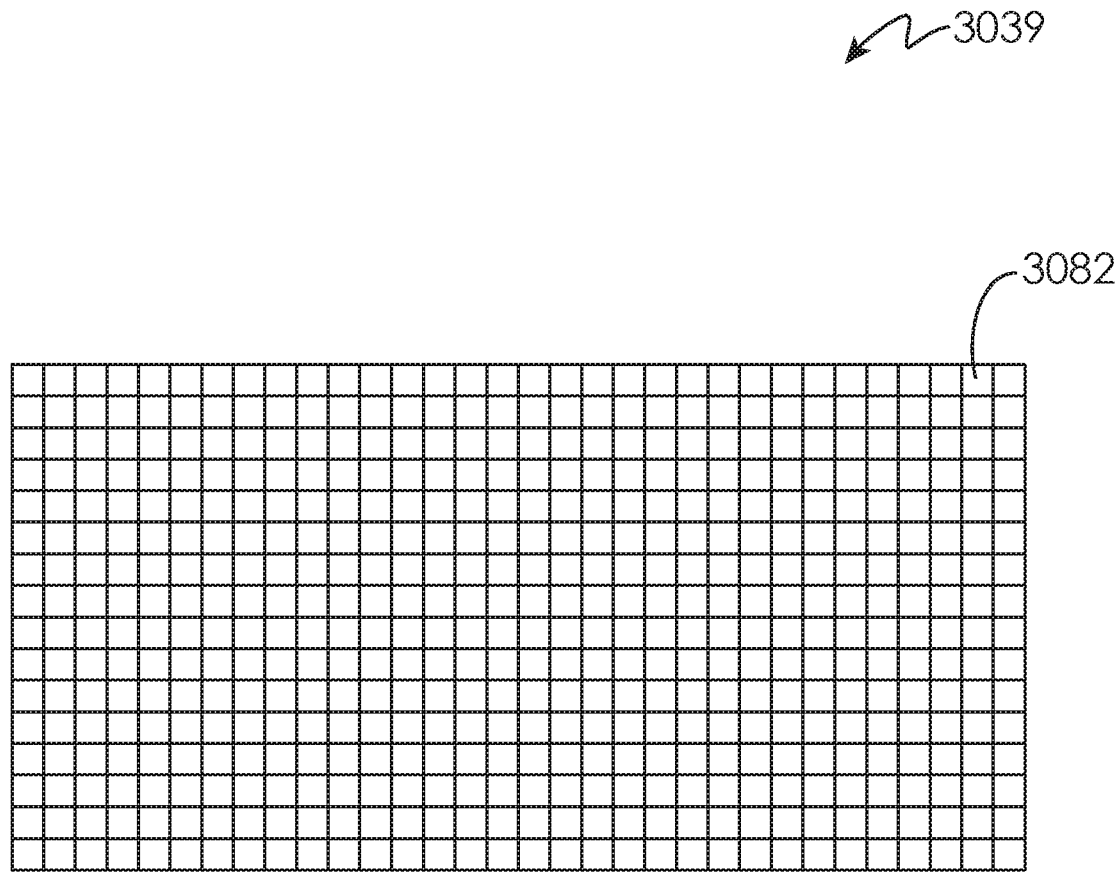
FIG. 27 is a top view of a mesh floor.

In one embodiment, a grate 3039 is positioned over the belt 3036. A portion of the grate 3039 is illustrated in FIG. 27. As illustrated in FIGS. 25-27, the grate 3039 includes openings 3082 therethrough that allow deposits, but not eggs, to pass through the grate 3039 to the belt 3036. The grate 3039 has a first end 3041 and a second end 3043. The first end 3041 extends to the first side 3025 of the aviary tower section 3021. The second end 3043 extends to the second side 3023 of the aviary tower section 3021. In an embodiment (not shown), the grate 3039 is flat. In an embodiment, the grate 3039 is shaped so that it is sloped toward each end 3041 and 3043. Each end 3041, 3043 of the grate 3039 is positioned adjacent an egg conveyor 3028. The egg conveyors 3028 are adapted to carry eggs from the aviary tower section 3021 to a collection area (not shown). In one embodiment, a grate 3039 is positioned over each belt 3036.

In an embodiment, a first portion 3045 of the grate 3039 is angled downward toward an egg conveyor 3028 positioned adjacent the first end 3041 of the grate 3039. In this embodiment, a second portion 3047 of the grate 3039 is angled downward toward an egg conveyor 3028 positioned adjacent the second end 3043 of the grate 3039. In one embodiment, the first portion 3045 and second portion 3047 of the grate 3039 each extend from a centerline 3049 of the grate 3039. In one embodiment, the first portion 3045 and the second portion 3047 are angled from the centerline 3049 at approximately a 7° to 8° angle. Eggs laid on the second portion 3047 of grate 3039 roll to the respective egg conveyor 3028 adjacent the second end 3043 of the grate 3039, which is in the direction of arrow A (shown in FIG. 28). The egg conveyor 3028 carries the eggs to the collection area. Eggs laid on the first portion 3045 of the grate 3039 roll to the respective egg conveyor 3028 adjacent the first end 3041 of the grate 3039. In an embodiment in which the grate 3039 is flat, the hens scratch the eggs to an egg conveyor 3028.

Figure 29:
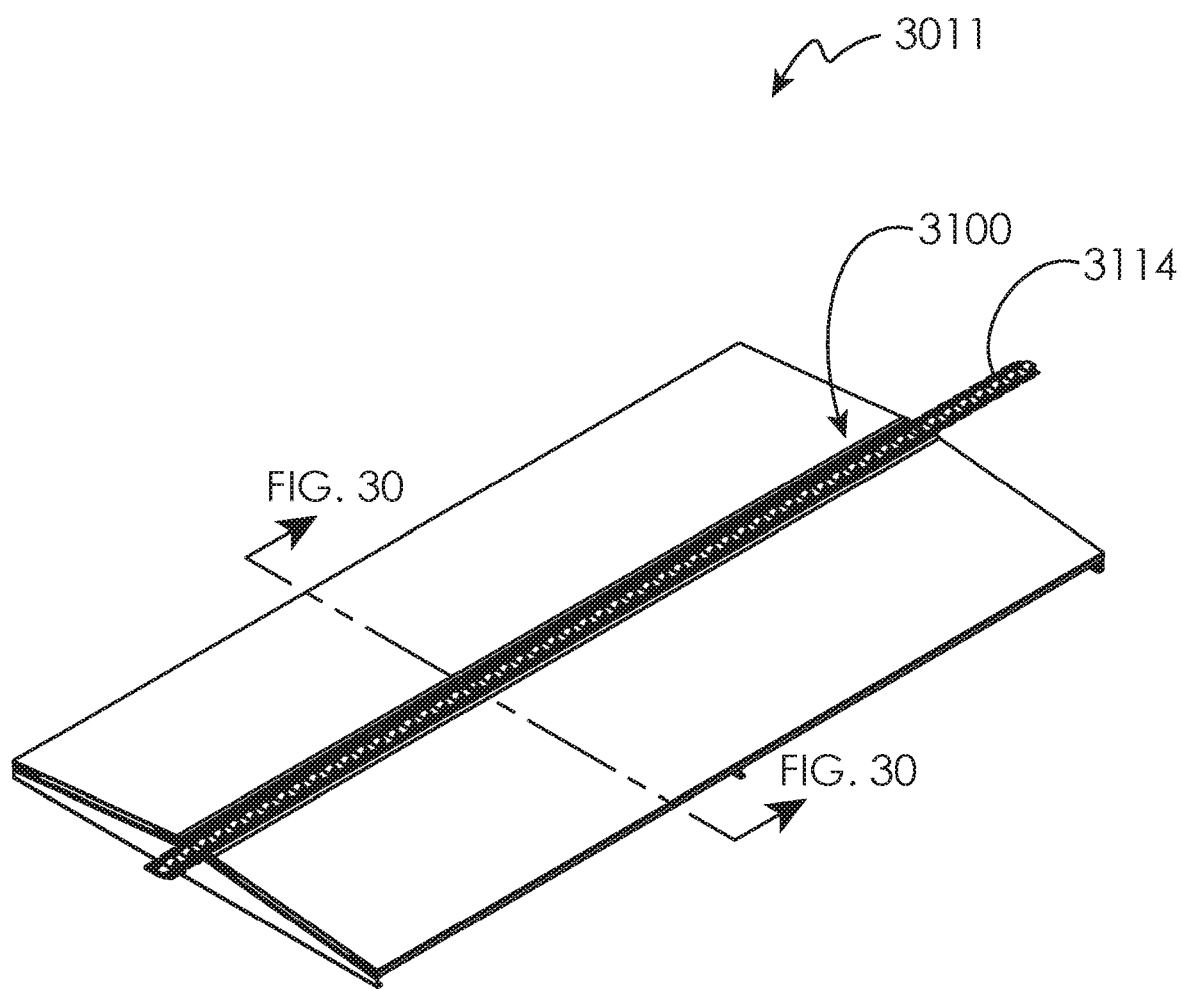
FIG. 29 is a top perspective view of a scratching platform formed in accordance with an embodiment.
Figure 30:
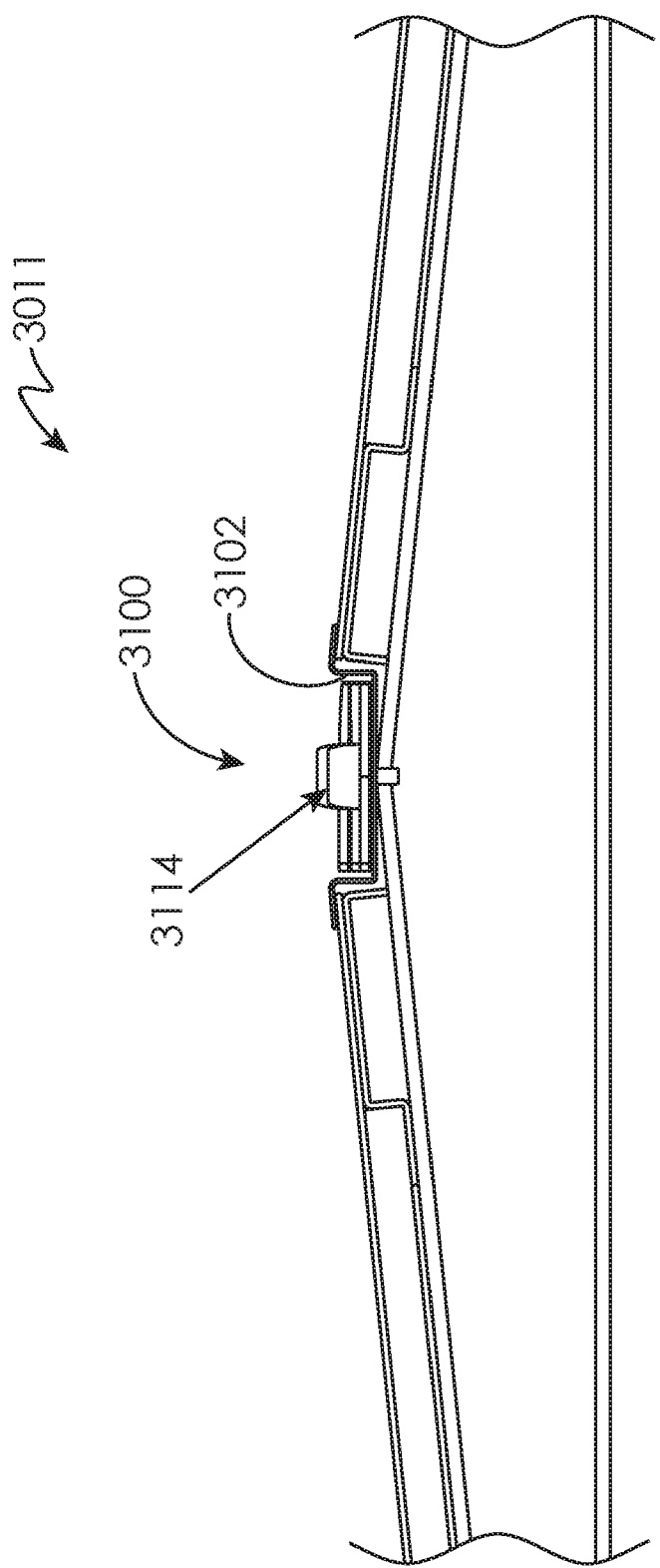
FIG. 30 is a cross-sectional view of the scratching platform shown in FIG. 29.
Figure 31:
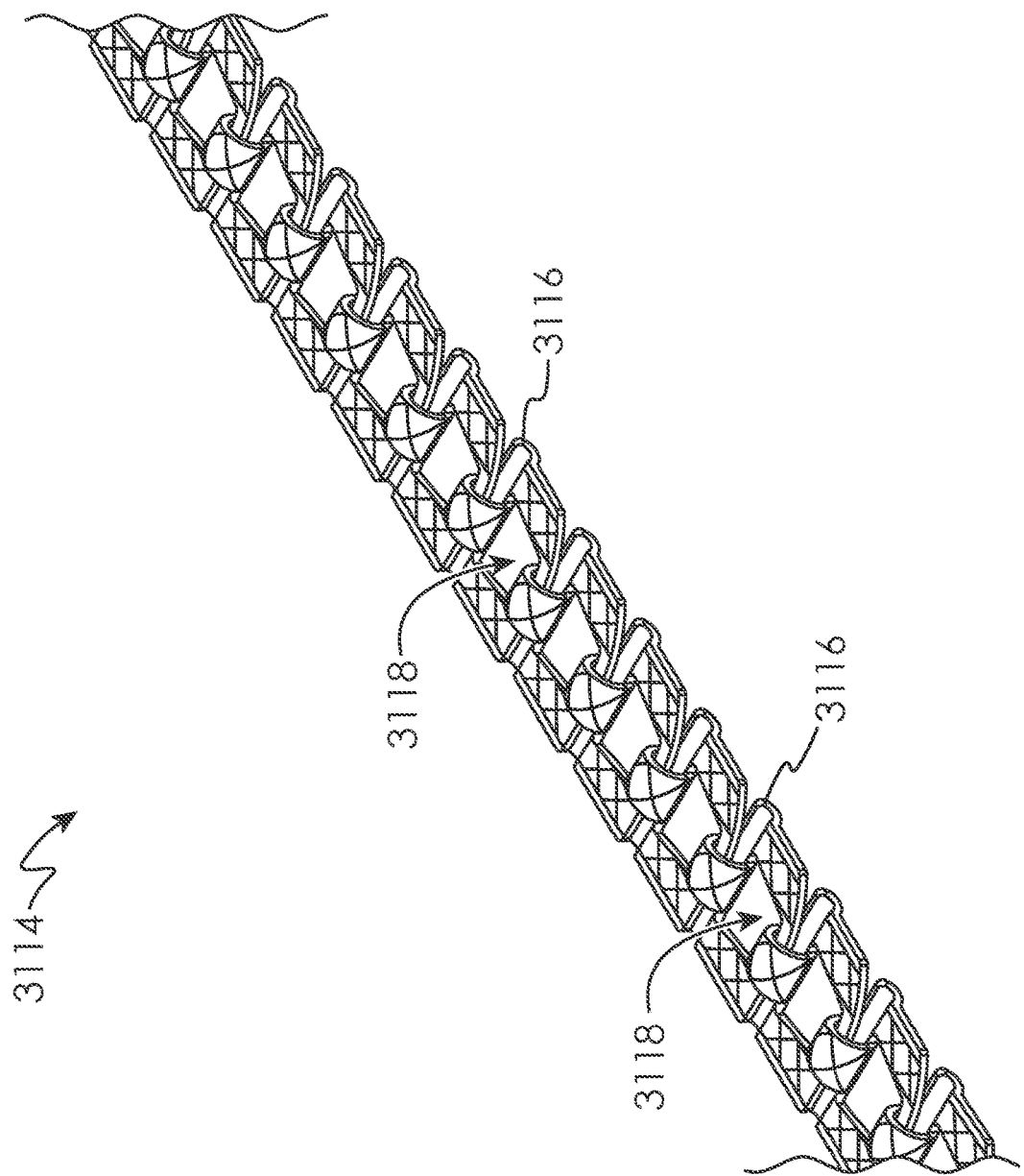
FIG. 31 is a top perspective view of a litter chain formed in accordance with an embodiment.
Figure 32:
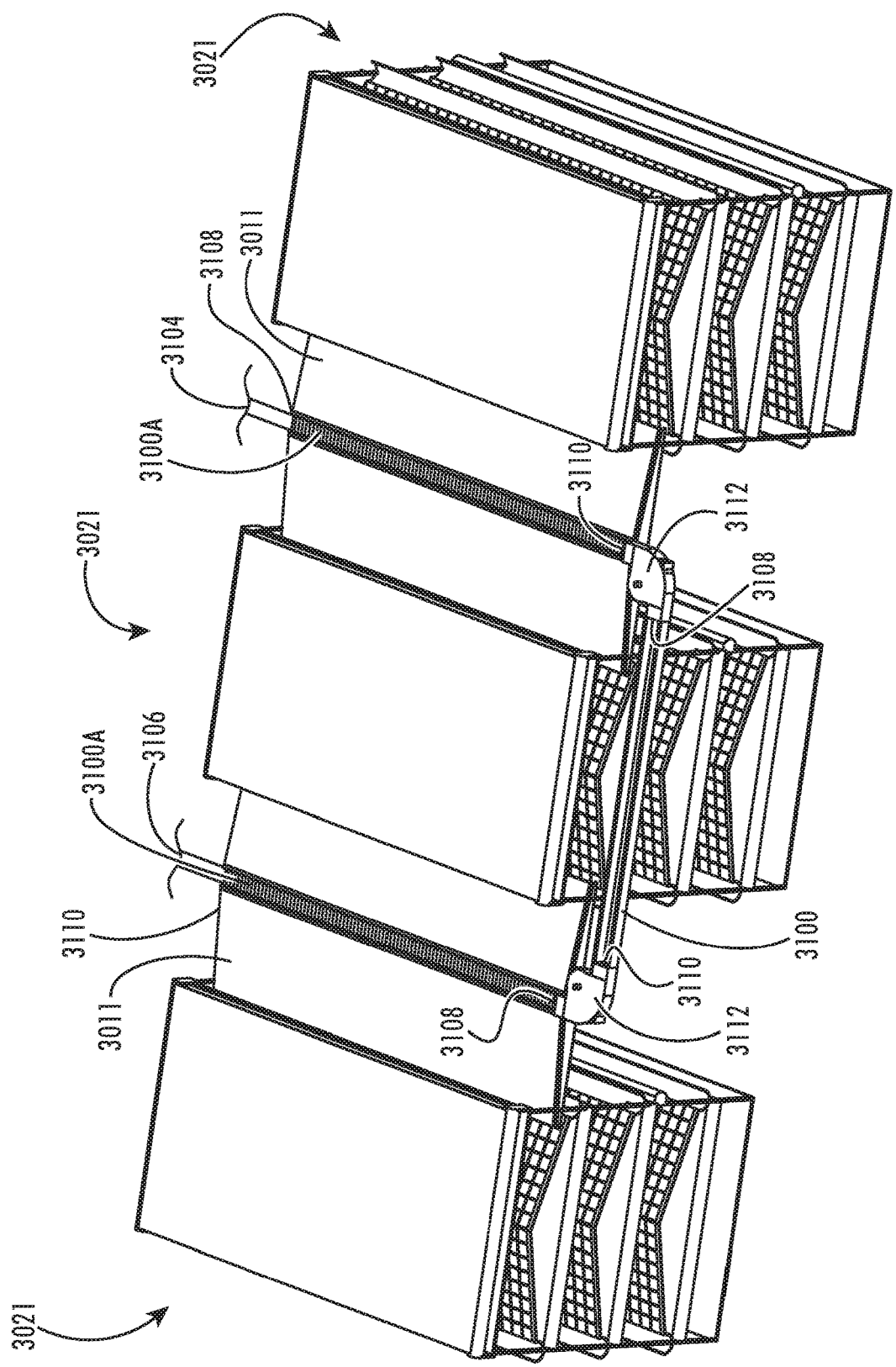
FIG. 32 is a top perspective view of an aviary formed in accordance with another embodiment and the scratching platform shown in FIGS. 29 and 30.

In the illustrated embodiment, with further detail shown in FIGS. 29-30, a scratching platform 3011 extends between adjacent aviary towers 3018. In some embodiments, the scratching platform has a substantially solid surface over a majority of its surface area. The scratching platform 3011 is oriented with respect to at least one belt 3036. In one embodiment, the scratching platform 3011 is oriented with respect to a belt 3036 that extends below the laying area 3027 of an aviary tower section 3021. In one embodiment, the scratching platform 3011 is sloped to allow deposits to move back toward the belt 3036. In one embodiment, the scratching platform 3011 is crowned so that each side of the scratching platform 3011 slopes toward a belt 3036. In particular, in the crowned scratching platform embodiment, the scratching platform 3011 is sloped on one side toward a grate 3039 of one aviary tower 3018 and is sloped on another side toward a grate 3039 of another aviary tower 3018. In one embodiment (not shown), the scratching platform 3011 is flat. In an embodiment, the ends 3041 and 3043 of the grate 3039 are positioned below the scratching platform 3011 so that the egg conveyors 3028 extend below the scratching platform 3011.

The scratching platform 3011 provides a pecking area for the hens to utilize while they are not in the laying areas 3027. In particular, the scratching platform 3011 provides a scratching area for birds within the aviary 3010.

With continuing reference to FIGS. 24, 26 and 28-32, one embodiment of an aviary 3010 includes aviary tower sections 3021 having scratching platforms 3011 extending between adjacent aviary tower sections 3021, wherein at least some of the scratching platforms include a litter trough 3100 extending through the scratching platform 3011. In some embodiments, the litter trough 3100 may be formed in a plurality of sections and is operative to receive a quantity of litter (not shown). In other embodiments, the litter trough 3100 is formed in a single piece, as the manner in which the litter trough 3100 is formed and connected is not critical. In some embodiments, the litter trough 3100 is positioned at a crown of the scratching platform between the side of the scratching platform 3011 that is sloped toward the grate 3039 of one aviary tower 3018 and the side of the scratching platform 3011 that is sloped toward the grate 3039 of another aviary tower 3018. In some embodiments, a litter trough 3100A is perforated to permit litter to fall down to a scratching platform 3011 located on a lower level in an aviary 3010.

Figure 37:
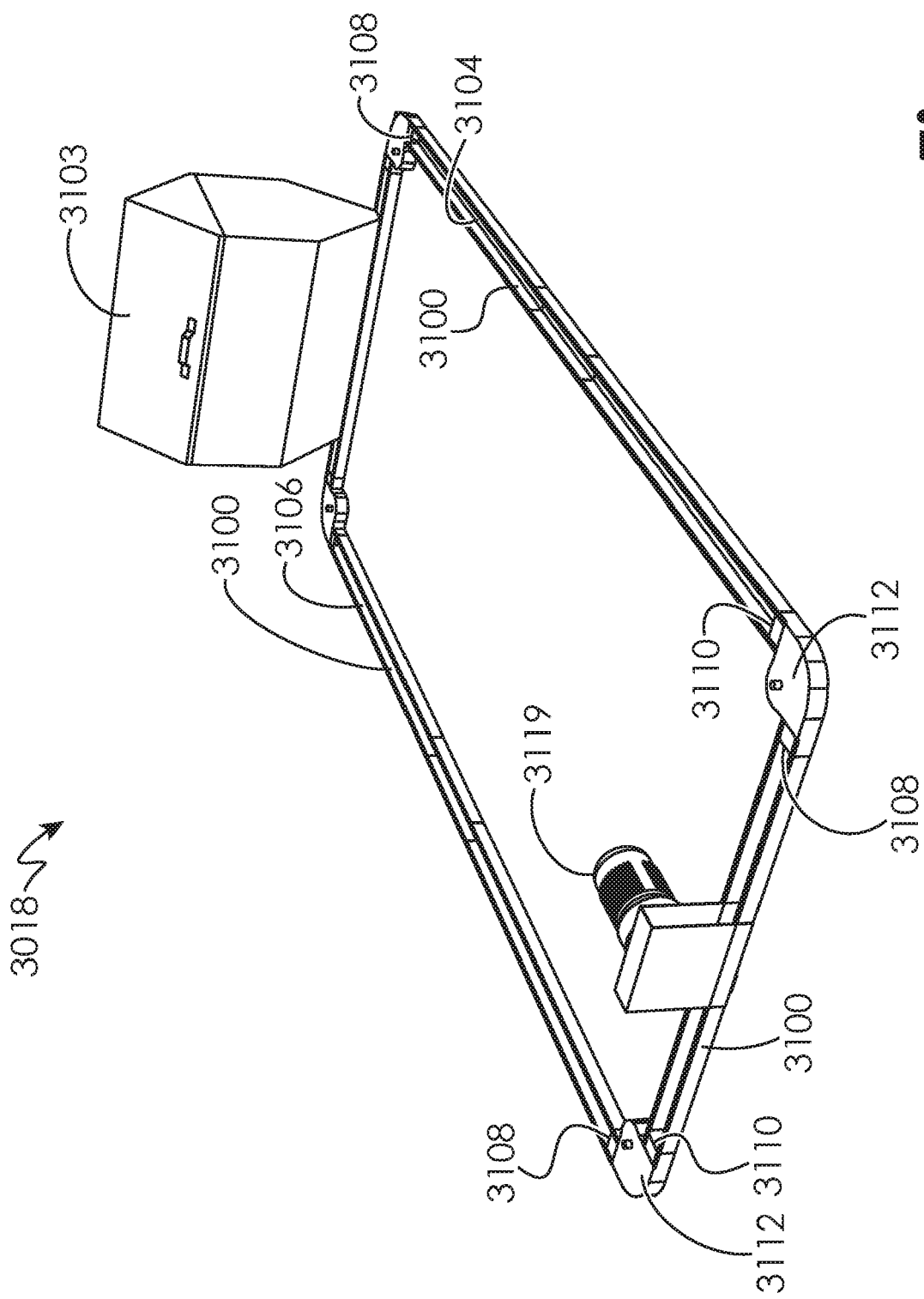
FIG. 37 is a side perspective view of a litter circulation system in accordance with an embodiment.

The litter trough 3100, 3100A may receive the litter by any desired means, such as manually placing the litter into the litter trough 3100, 3100A, directing the litter into the litter trough 3100, 3100A by means of a conveyor belt or gravity feed system, receiving litter falling from a perforated litter trough 3100A in a scratching platform above the litter trough 3100, 3100A, receiving litter from a litter recycling tube 3130 (which embodiment is discussed in greater detail hereinbelow), to name just a few non-limiting examples. In the illustrated embodiments, the litter enters an interior cavity 3102 of the litter trough 3100, 3100A from an overhead litter storage container 3103 (one embodiment of which is schematically shown in FIG. 37) through an opening (not shown) in the bottom of the litter storage container 3103.

In some embodiments, the litter storage container 3103 is positioned outside the aviary 3010 and the litter trough 3100 exits the aviary 3010 at at least a first location 3104, receives litter from the litter storage container 3103, and then enters the aviary 3010 at at least a second location 3106. In an embodiment, the aviary 3010 is stocked with litter prior to the introduction of birds, which birds will remain in the aviary 3010 for a period of time. In some embodiments, the litter storage container 3103 is contained within the aviary 3010 and directs the litter into the litter trough 3100, 3100A by means of a conveyor belt (not shown) or gravity feed system (not shown). In some embodiments, the litter storage container 3103 is positioned outside the aviary 3010 and feeds the litter trough 3100, 3100A with litter by means of a conveyor belt (not shown).

In the illustrated embodiment, each of the sections of the litter trough 3100, 3100A extending through a scratching platform 3011 include a proximal end 3108 and a distal end 3110. Additional sections of the litter trough 3100 extend between a first scratching platform 3011 and a second scratching platform 3011. In the illustrated embodiment, some sections of the litter trough 3100, 3100A are coupled to one another by a corner unit 3112 that couples the proximal end 3108 of one section of the litter trough 3100, 3100A to the distal end 3110 of an adjacent section of the litter trough 3100, 3100A. In this way, the litter trough may extend in a continuous path through multiple scratching platforms 3011.

A litter chain (some embodiments of which are illustrated in FIGS. 29, 30, 31, and 34 as element 3114) is disposed in the interior cavity 3102 of the litter trough 3100, 3100A. The litter chain 3114 is used to move litter from the litter storage container 3103 and through the litter troughs 3100, 3100A. In some embodiments, there is no litter trough 3100 in at least some of the scratching platforms 3011 and the litter chain 3114 extends over a surface of such scratching platform 3011.

The litter chain 3114 in some embodiments comprises multiple articulating links 3116. In some embodiments, the multiple articulating links 3116 are pulled through the litter deposited into the litter trough 3100, 3100A by the litter storage container 3103 and/or by other means. Each of the links 3116 includes an interior cavity 3118 therein that traps a quantity of litter (not shown for clarity) as the links 3116 are pulled through the litter supply and/or as litter is deposited on the litter chain 3114.

In some embodiments, the litter chain 3114 is moved through the litter trough 3100, 3100A by means of a drive unit (one embodiment of which is shown as drive unit 3119 in FIG. 37) that engages the litter chain 3114 at at least one location and imparts a force to the litter chain to move it through the litter trough 3100, 3100A, as will be appreciated by those skilled in the art. The corner units 3112 guide the litter chain 3114 around approximately 90 degree bends to form a continuous litter chain 3114 loop such that litter is continuously distributed through the litter trough 3100, 3100A by action of the litter chain 3114 moved by the drive unit 3119.

In operation for some embodiments, the drive unit 3119 functions to pull the litter chain 3114 through the litter trough 3100, 3100A. Litter enters the litter trough 3100, 3100A by various means already described and falls onto the moving litter chain 3114. Each of the links 3116 includes an interior cavity 3118 therein that traps a quantity of litter as the links 3116 are pulled through the litter supply. Additional litter may be pulled along with the litter chain 3114 due to the frictional forces acting between the links 3116 and the litter. The litter is thus distributed throughout the litter trough 3100, 3100A as it traverses the scratching platforms 3011. The birds can access the litter in the litter trough 3100, 3100A while they are on the scratching platform 3011.

The birds on the scratching platform 3011 are attracted to the litter, as they like to scratch it with their feet and take dust baths in the litter. The litter is thus removed from the litter trough 3100, 3100A and moved onto the solid surface of the scratching platform 3011 by the action of the birds, where it is further utilized by the birds. In some embodiments employing a perforated litter trough 3100A, such as in the embodiments shown in FIGS. 32, 34, and 35, the action of the birds and/or the movement of the litter chain 3114 causes the litter to fall through the litter trough 3100A. When the birds scratch the scratching platform 3011, they scratch much of the deposits made on the scratching platform 3011 onto the respective adjacent belt 3036. Accordingly, since it is common for birds to defecate in a scratching area, the scratching platform 3011 becomes relatively self-cleaning as the hens scratch. The deposits, including but not limited to the litter, are scratched by the birds toward the belts 3036.

Figure 28:
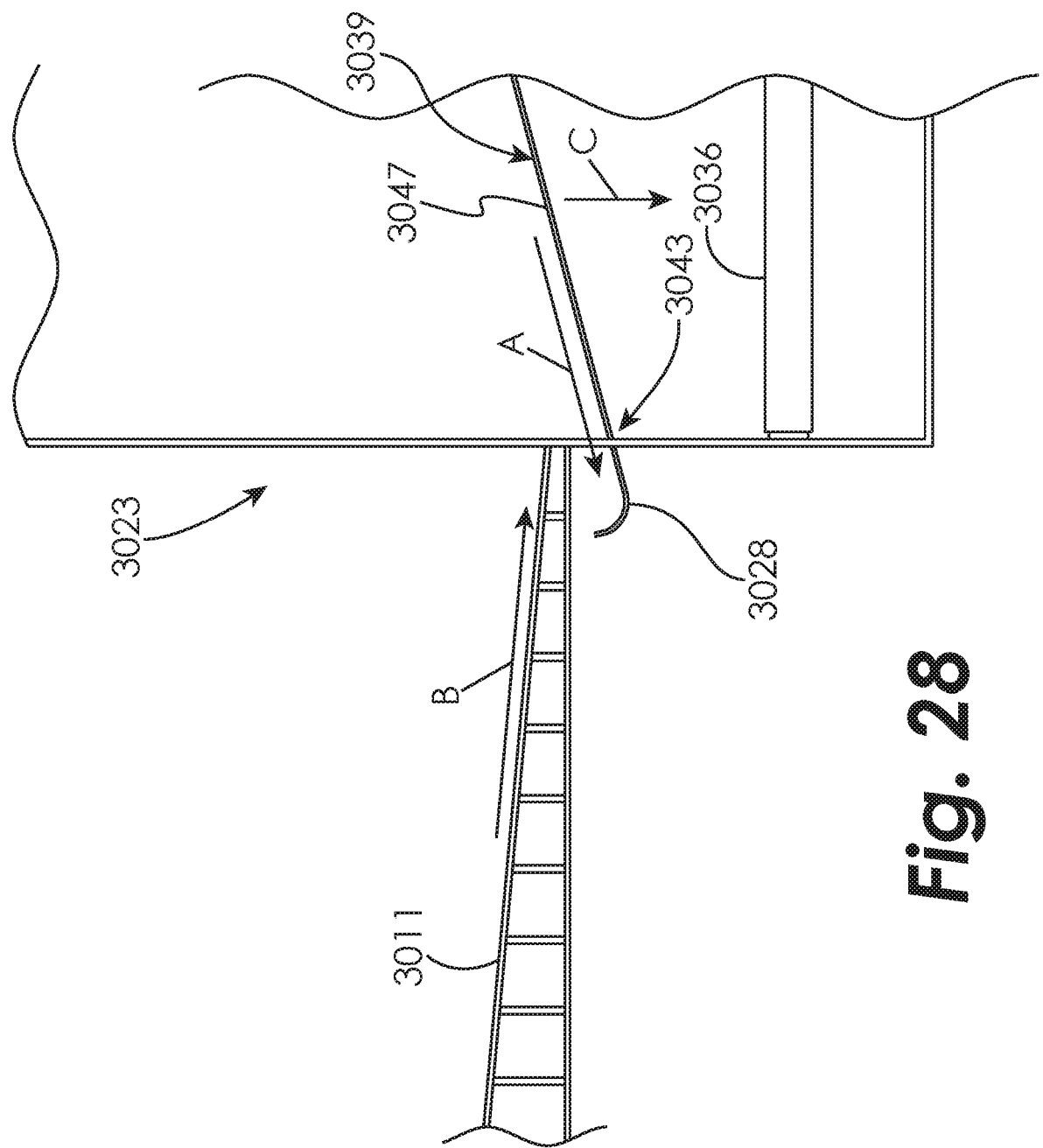
FIG. 28 is an expanded view of a scratching platform, a grate, a side of an aviary tower section, and a belt formed in accordance with an embodiment.

Particularly, by way of example, deposits and litter may be scratched from the scratching platform 3011 in the direction of arrow B (shown in FIG. 28) toward the grate 3039. Deposits and litter may be scratched toward a grate 3039 from either direction on the scratching platform 3011. The deposits and litter small enough to pass through the openings 3082 in the grate 3039 then pass through those openings 3082 and onto the belt 3036, from which they are removed from the aviary 3010, although in some embodiments (described hereinbelow) some of the litter may be recycled for further use within the aviary 3010. Such configuration greatly reduces the amount of ammonia captured within the aviary 3010 and also reduces the required frequency for cleaning of the aviary 3010. Those of skill in the art will appreciate that, while FIG. 28 illustrates the movement of a deposit toward the second end 3043 of the grate 3039, a mirror image of the movement of a deposit toward the first end 3041 of the grate 3039 may occur when a deposit is made on the first portion 3045 of the grate 3039 or on the scratching platform 3011 and scratched back toward the first end 3041 of the grate 3039.

Figure 33:
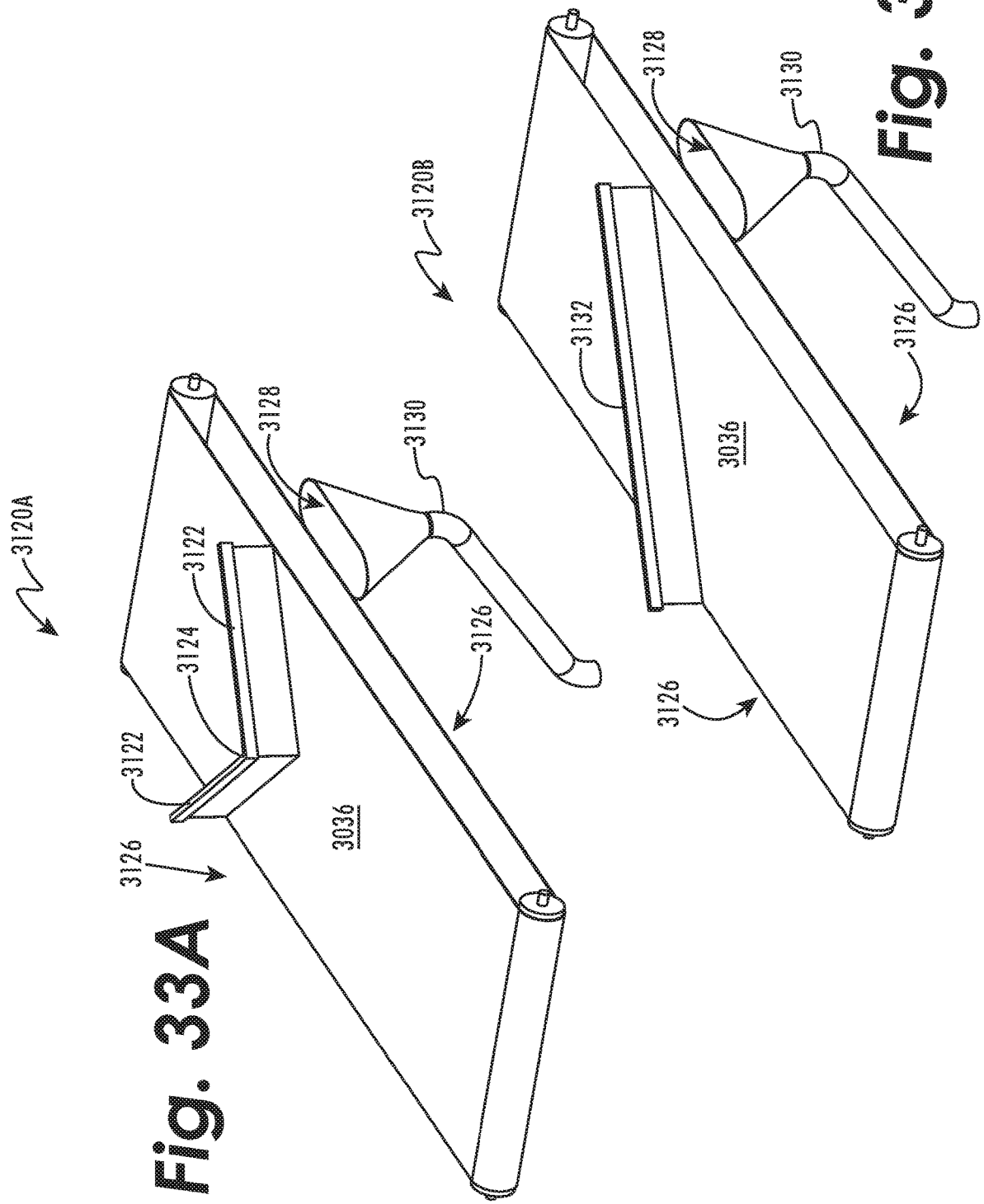
FIG. 33A is a perspective top view of a litter collector formed in accordance with an embodiment.
FIG. 33B is a perspective top view of a litter collector formed in accordance with another embodiment.

In one embodiment, some of the litter may be removed from the belt 3036 through the use of a litter remover 3120 positioned at one or more locations of the belt 3036. FIG. 33A shows one embodiment of a litter remover 3120A. In the illustrated embodiment, the litter remover 3120A includes two blades 3122 that meet at a point 3124. From the point 3124, each blade 3122 extends toward a side 3126 of the belt 3036. In particular, each blade 3122 extends at an angle toward a side 3126 of the belt 3036 in the direction of movement of the belt 3036, wherein the blades 3122 extend over substantially the full width of the belt 3036. In an embodiment, the blades 3122 are flat and have their bottom edges disposed above the belt 3036. In an embodiment, the blades 3122 have bottom edges disposed approximately one-quarter inch to one-half inch above the belt 3036. Other displacement dimensions above the belt 3036 may be used in other embodiments.

Figure 34:
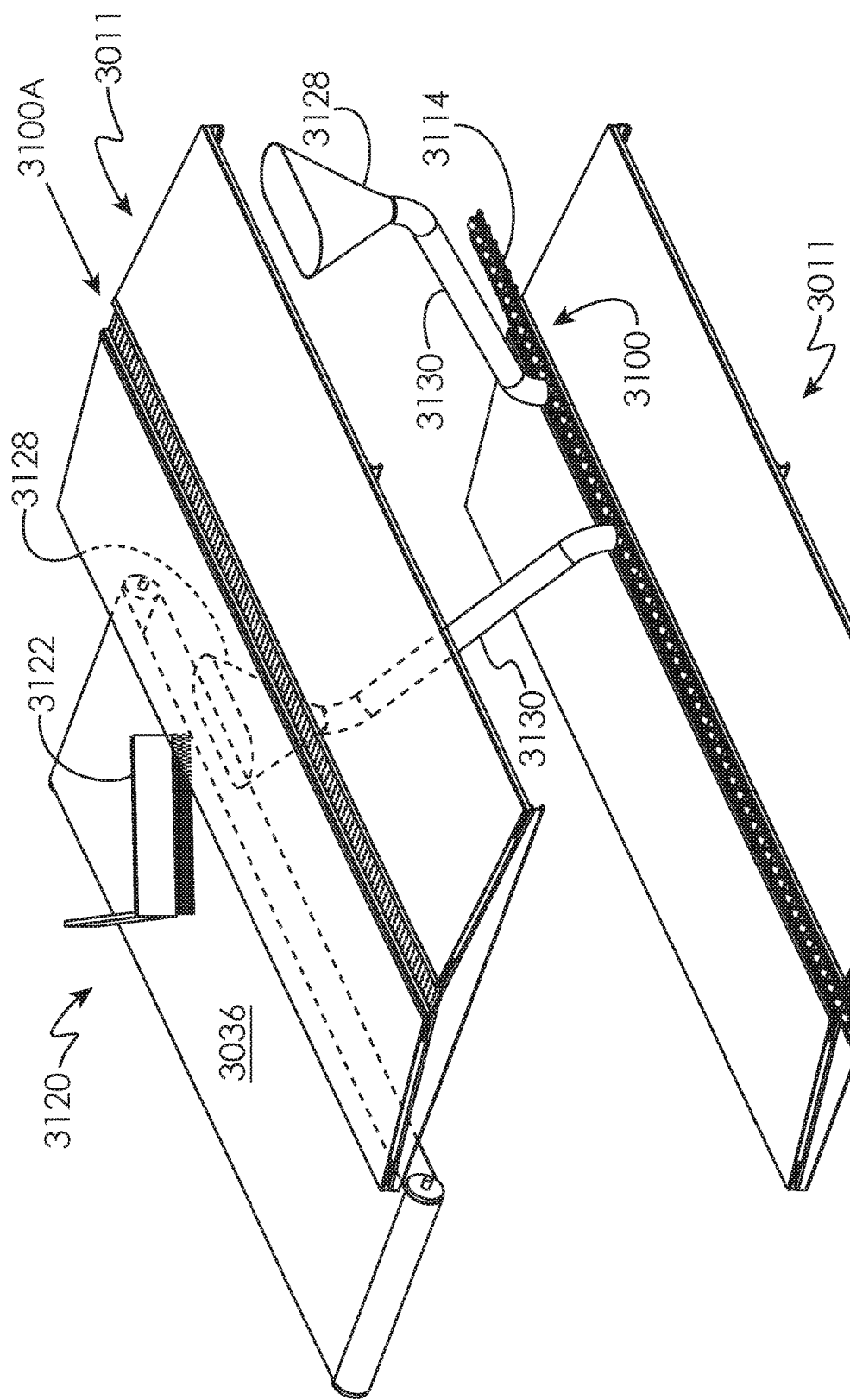
FIG. 34 is a top perspective view of a first scratching platform in litter communication with a second scratching platform and a litter collector formed in accordance with an embodiment.

In other embodiments, the blade 3122 may comprise a brush. In an embodiment, the blade 3122 is plastic. In an embodiment, the blade 3122 is metal. The displacement of the blade 3122 above the belt 3036 allows the majority of the deposits on the belt to be removed from the aviary, while at the same time allowing a portion of the litter to be diverted by the blades 3122 toward the sides 3126 of the belt 3036, where the litter drops into funnels 3128 which guide the litter into tubes 3130. In some embodiments, the recycled litter in tubes 3130 is returned to the litter storage container 3103 by any desired means, such as by a conveyor belt or manually, to name just two non-limiting examples. As shown in FIG. 34, in other embodiments the recycled litter in tubes 3130 may be directed to litter troughs 3100, 3100A on a lower level of the aviary.

FIG. 33B shows another embodiment of a litter remover 3120B. The litter remover 3120B includes a single blade 3132 that extends the width of the belt 3036 at an angle from one side 3126 of the belt 3036 to the other side 3126 of the belt 3036. In an embodiment, the blade 3132 is flat and moves material to the downstream end of the blade 3132 with respect to the direction of movement of the belt 3036. In an embodiment, the blade 3132 has a bottom edge disposed approximately one-quarter inch to one-half inch above the belt 3036. Other displacement dimensions above the belt 3036 may be used in other embodiments.

In other embodiments, the blade 3132 may comprise a brush. In an embodiment, the blade 3132 is plastic. In an embodiment, the blade 3132 is metal. The displacement of the blade 3132 above the belt 3036 allows the majority of the deposits on the belt to be removed from the aviary, while at the same time allowing a portion of the litter to be diverted by the blade 3132 toward the side 3126 of the belt 3036, where the litter drops into a funnel 3128 that guides the litter into a tube 3130. In some embodiments, the recycled litter in tube 3130 is returned to the litter storage container 3103 by any desired means, such as by a conveyor belt or manually, to name just two non-limiting examples.

As shown in FIG. 34, in other embodiments the recycled litter in tube 3130 may be directed to litter troughs 3100, 3100A on another level of the aviary where the recycled litter may be moved through the scratching platforms 3011 of that level by a litter chain 3114. In the illustration of FIG. 34, only the belt 3036 on the far side of the upper scratching platform 3011 is illustrated for clarity, it being understood that belts 3036 are located on both sides of each scratching platform 3011 in this embodiment. In some embodiments, when the litter reaches the scratching platforms 3011 on the lowest level of the aviary 3010, the litter is not collected by blades 3122, 3132 and funnels 3128, but is instead removed from the aviary by the belt 3036 or by manual labor.

Figure 35:
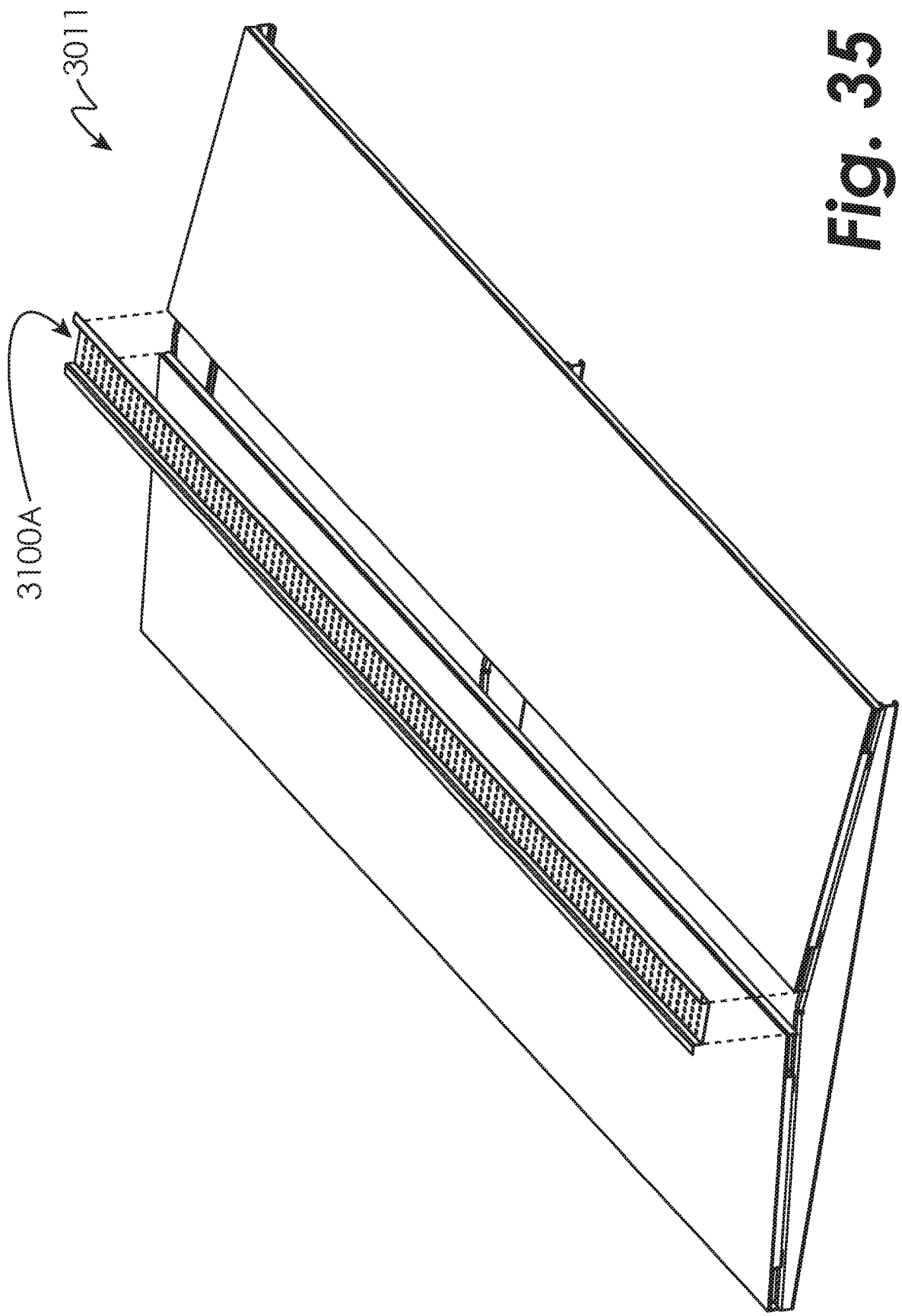
FIG. 35 is an exploded perspective view of a perforated litter trough and a scratching platform formed in accordance with an embodiment.

The embodiment illustrated in FIG. 35 shows an exploded view of the perforated litter trough 3100A above the scratching platform 3011. Those of ordinary skill will recognize that the perforated litter trough 3100A is well suited to use in upper levels of the aviary 3010 to thereby facilitate introduction of fresh litter into the top-most level of the aviary 3010 and the subsequent recycling of litter throughout the aviary 3010 through the action of birds scratching the litter onto a belt 3036 and/or the descent by means of gravity of the litter to another aviary level as the litter falls through the holes of the perforated litter trough 3100A.

Figure 36:
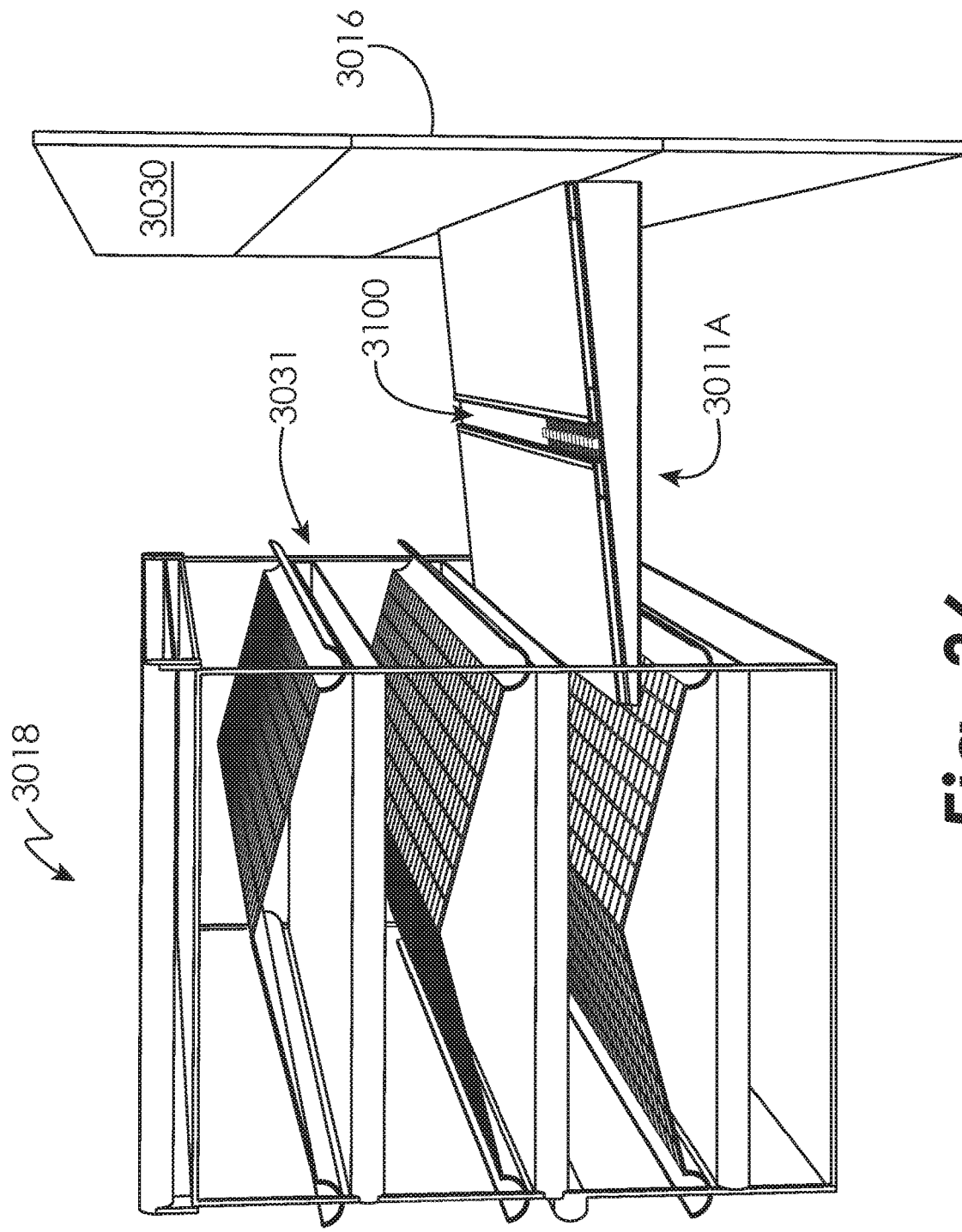
FIG. 36 is a side perspective view of an aviary tower section, a wall, and a scratching platform formed in accordance with an embodiment.

In an embodiment illustrated in FIG. 36, a unidirectionally sloped scratching platform 3011A extends between the aviary tower 3018 and the respective exterior wall 3016. The exterior wall 3016 defines an interior surface 3030. The aviary tower 3018 includes an outside surface 3031. The scratching platform 3011A extends between the surface 3030 of the exterior wall 3016 and the outside surface 3031 of the aviary tower 3018. The scratching platform 3011A is unidirectionally sloped toward the outside surface 3031 is some embodiments. In other embodiments, the scratching platform 3011A is substantially level.

In the illustrated embodiment, a litter trough 3100 extends through the surface of the scratching platform 3011A. In other embodiments, a perforated litter trough 3100A extends through the surface of the scratching platform 3011A. In a manner analogous to the scratching platform 3011 described hereinabove, litter is provided to the litter trough 3100, 3100A, it is scratched from the scratching platform 3011A by the action of the birds to the grate 3039, where it falls through to the belt 3036 and is eventually removed from the aviary for disposal or recycling to the litter trough 3100, 3100A system. In some embodiments, funnels 3128 and tubes 3130 channel litter from the belts 3036 adjacent scratching platforms 3011A and deposit the litter in the litter troughs 3100, 3100A of scratching platforms 3011A on lower levels, analogous to the operation of the embodiment illustrated in FIG. 34.

Any eggs laid on the scratching platform 3011 or 3011A (collectively referred to hereinbelow as scratching platform 3011) are directed toward an egg conveyor 3028 by gravity and/or the scratching of the hens. By way of example and not of limitation, eggs laid on the scratching platform 3011 illustrated in FIG. 28 may be moved in the direction of arrow B toward the grate 3039. Eggs may be moved toward a grate 3039 from either direction on the scratching platform 3011. Upon reaching the grate 3039, the eggs roll or are scratched toward the respective egg conveyor 3028, such as, for example, in the direction of arrow A along the grate 3039, under the scratching platform 3011, and into the egg conveyor 3028. In an embodiment (not shown), eggs laid on a flat scratching platform 3011 are rolled by the scratching of the hens toward the grate 3039 and, upon reaching the grate 3039, are scratched by the hens into the egg conveyor 3028.

Similarly, some litter removed from the litter trough 3100, 3100A and deposited on the scratching platform 3011 is directed toward the belt 3036 by gravity and/or the scratching of the hens. By way of example and not of limitation, litter on the scratching platform 3011 illustrated in FIG. 28 may be moved in the direction of arrow B toward the grate 3039. Litter may be moved toward a grate 3039 from either direction on the scratching platform 3011. Upon reaching the grate 3039, the litter falls through the grate 3039 toward the respective belt 3036, such as, for example, in the direction of arrow C and onto the belt 3036. In an embodiment (not shown), litter on a flat scratching platform 3011 is moved by the scratching of the hens toward the grate 3039 and, upon reaching the grate 3039, falls through the grate 3039 and onto the belt 3036.

In the illustrated embodiment, and with reference again to FIG. 24, a first aviary tower 3018A includes a first aviary tower section 3021A, and a second aviary tower 3018B includes a second aviary tower section 3021B, which second aviary tower section 3021B is similar to the first aviary tower section 3021A. A third aviary tower 3018C includes a third aviary tower section 3021C, which third aviary tower section 3021C is similar to the first aviary tower section 3021A and the second aviary tower section 3021B. In an embodiment, multiple first aviary tower sections 3021A are stacked on top of one another.

In an embodiment, each first aviary tower section 3021A has a first outside surface 3022A enclosing an inside area 3013A. In an embodiment, multiple second aviary tower sections 3021B are stacked on top of one another. In an embodiment, each second aviary tower section 3021B includes a second outside surface 3022B enclosing an inside area 3013B. In an embodiment, multiple third aviary tower sections 3021C are stacked on top of one another. In an embodiment, each third aviary tower section 3021C includes a third outside surface 3022C enclosing an inside area 3013C. The second aviary tower section 3021B is positioned adjacent the first aviary tower section 3021A and an aisle 3020 is formed therebetween. The second aviary tower section 3021B is also positioned adjacent the third aviary tower section 3021C and an aisle 3020 is formed therebetween. In an embodiment, the second aviary tower section 3021B is positioned at a height 3019B from the scratching platform 3011, the first aviary tower section 3021A is positioned at a height 3019A from the scratching platform 3011, and the height 3019B is greater than height 3019A.

In the illustrated embodiments, the scratching platforms 3011 form three levels 3017 in the aviary 3010, wherein each level 3017 may be serviced by one or more litter troughs 3100, 3100A. A hen may walk, peck, scratch, socialize, sleep, and lay eggs, as the bird desires in the inside area 3013, including but not limited to the nesting area 3027. These same daily activities can be carried out on the at least one scratching platform 3011.

In some embodiments, the perforated litter troughs 3100A on the uppermost level 3017 are supplied with litter from the litter storage container 3103, while the litter troughs 3100, 3100A on the lower levels 3017 are supplied with recycled litter from the levels 3017 above by means of the tubes 3130, which direct the recycled litter into the litter trough 3100, 3100A on the level below, as shown in FIG. 34. Litter that reaches the belts 3036 on the lowest level 3017 is removed from the aviary by the belts 3036. In some embodiments, litter that reaches the litter trough 3100 on the lowest level 3017 is removed from the aviary by alternate means, such as by a conveyor (not shown), by manual removal, and by other means understood by the skilled artisan.

In some embodiments, the perforated litter troughs 3100A on the uppermost level 3017 are supplied with litter from the litter storage container 3103, while the litter troughs 3100, 3100A on the lower levels 3017 are supplied with recycled litter from the levels 3017 above by means of the perforated litter troughs 3100A, which direct the litter onto the scratching platform 3011 and/or into the litter trough 3100, 3100A on the level below, as shown in FIG. 34. Litter that reaches the belts 3036 on the lowest level 3017 is removed from the aviary by the belts 3036. In some embodiments, the litter troughs 3100, 3100A on the lower levels 3017 are supplied with recycled litter from the levels 3017 above by means of a combination of the perforated litter troughs 3100A and the litter tubes 3130. In some embodiments, litter that reaches the litter trough 3100 on the lowest level 3017 is removed from the aviary by alternate means, such as by a conveyor (not shown), by manual removal, and by other means understood by the skilled artisan.

Referring to an embodiment and with reference to FIG. 24, a first perch 3029A extends from the first outside surface 3031A of the first aviary tower 3018A and is positioned above a first egg conveyor 3028A that extends from the first outside surface 3031A along the sides 3025 and 3023 of the aviary tower section 3021A. The first egg conveyor 3028A extends substantially the length of the first aviary tower 3018A. When the hens lay their eggs, the eggs may be collected in the first egg conveyor 3028A. The first egg conveyor 3028A carries the eggs from the aviary tower section 3021A to a collection area (not shown). The first perch 3029A extends into the aisle 3020 at a first vertical distance 3070 from the scratching platform 3011. A second perch 3029B extends from the second outside surface 3031B of the second aviary tower 3018B and is positioned above a second egg conveyor 3028B that extends from the second outside surface 3031B along the sides 3025 and 3023 of the aviary tower section 3021B. The second egg conveyor 3028B extends substantially the length of the second aviary tower 3018B. The second egg conveyor 3028B carries the eggs from the aviary tower section 3021B to a collection area (not shown). The second perch 3029B extends into the aisle 3020 at a second vertical distance 3072 from the scratching platform 3011. The first vertical distance 3070 is not equal to the second vertical distance 3072. In an embodiment, the first vertical distance 3070 and the second vertical distance 3072 define a third vertical distance 3074. The third vertical distance 3074 is configured to permit a bird to hop from the first perch 3029A to the second perch 3029B or vice versa.

In an embodiment, the first aviary tower 3018A may include multiple first perches 3029A, corresponding to the number of first egg conveyors 3028A, and the second aviary tower 3018B may include multiple second perches 3029B, corresponding to the number of second egg conveyors 3028B, wherein the first perches 3029A and the second perches 3029B are staggered in relation to each other along the first and second outside surfaces 3031A, 3031B of the aviary towers 3018A, 3018B. In one embodiment, the first perches 3029A and the second perches 3029B are staggered vertically on the first and second outside surfaces 3031A, 3031B of the aviary towers 3018A, 3018B. In one embodiment, the first perches 3029A and the second perches 3029B are staggered horizontally along the first and second outside surfaces 3031A, 3031B of the aviary towers 3018A, 3018B. In one embodiment, the first perches 3029A and the second perches 3029B are staggered vertically and horizontally on the first and second outside surfaces 3031A, 3031B of the aviary towers 3018A, 3018B.

When a first perch 3029A and a second perch 3029B are included in an embodiment, the first vertical distance 3070 and the second vertical distance 3072 define a third vertical distance 3074, which third vertical distance 3074 is configured to facilitate the behavior of birds to hop from one surface to another and thereby create a ladder effect between the outside surfaces 3022A, 3022B of the aviary tower sections 3021A, 3021B and, concomitantly, outside surfaces 3031A, 3031B of the aviary towers 3018A, 3018B.

In the illustrated embodiments, the scratching platforms 3011 form three levels 3017 in the aviary 3010, wherein each level 3017 may be accessed by a worker. A hen may walk, peck, scratch, socialize, sleep, and lay eggs, as the bird desires in the inside area 3013, including but not limited to the nesting area 3027. These same daily activities can be carried out on the at least one scratching platform 3011. The at least one aviary tower section 3021 may house a specific group of birds or it may be open to birds from other aviary tower sections 3021. In an embodiment, the aviary tower 3018 may be configured to allow the birds to move freely up and down the aviary tower 3018. In an embodiment, the aviary tower 3018 may be configured to keep birds in the aviary segregated by vertical level 3017. When the hens lay their eggs, the eggs may be collected in egg conveyors 3028 that extend along the sides of the aviary tower section 3021. The egg conveyors 3028 carry the eggs from the aviary tower section 3021 to a collection area.

Litter is provided to some or all of the scratching platforms 3011. Some of the litter may be recycled from scratching platforms 3011 on one or more of the levels 3017 and provided to the litter storage container 3103 and/or to scratching platforms 3011 and/or to litter troughs 3100, 3100A on other levels 3017.

Figure 38:
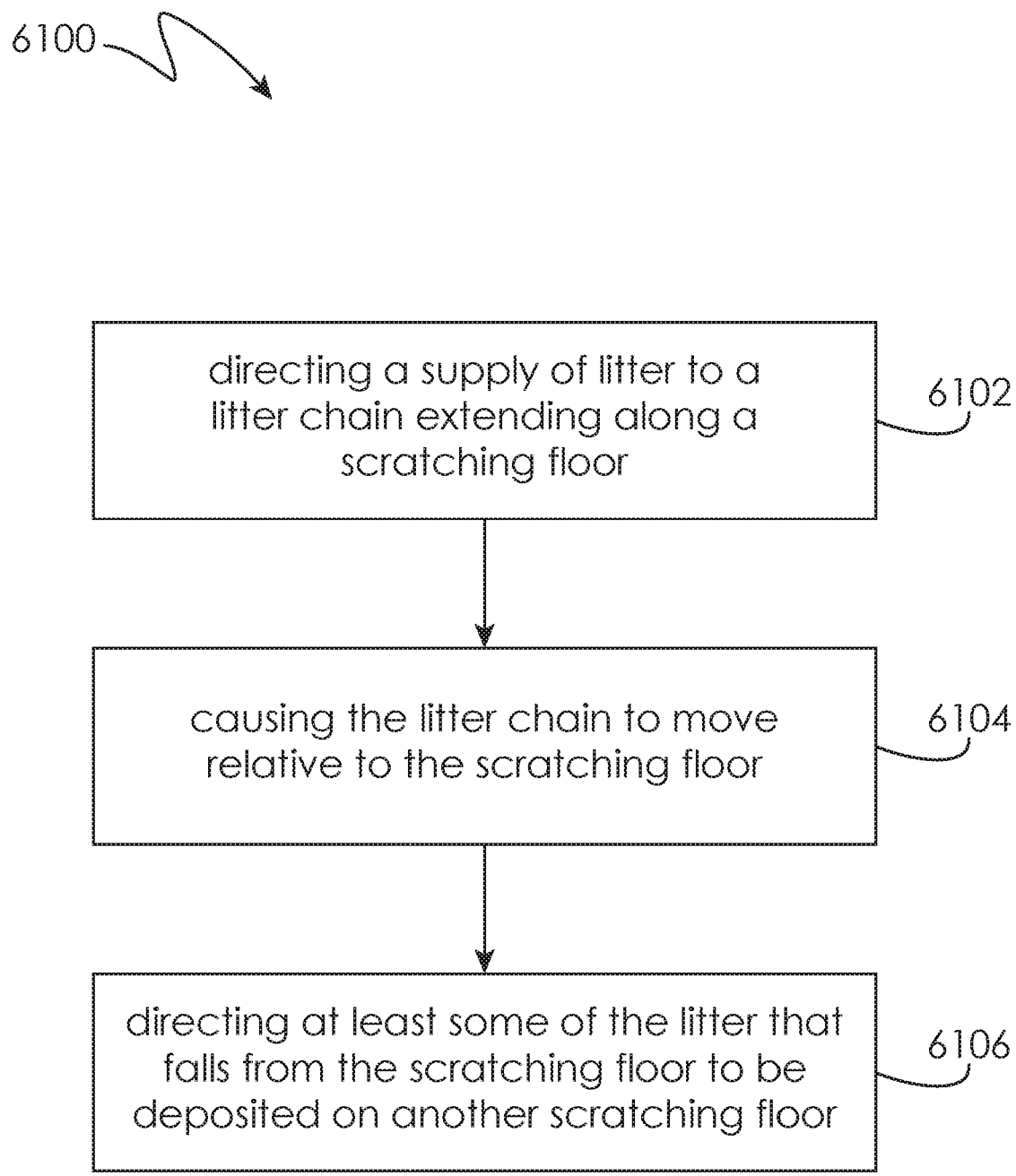
FIG. 38 illustrates a method of circulating litter in an aviary.

In one embodiment, as illustrated in FIG. 38, a method 6100 for providing litter to an aviary 3010 and circulating the litter within the aviary 3010 is provided. At step 6102, a supply of litter is directed to a litter chain 3114 extending along a scratching platform 3011. In some embodiments, the litter chain 3114 extends through a trough 3100 formed through the scratching platform 3011 and is operable to move through the trough 3100.

At step 6104, the litter chain 3114 is moved relative to the scratching platform 3011 such that the litter chain 3114 transports at least some of the litter along the scratching platform 3011. At step 6106, at least some of the litter falls from a scratching platform 3011, for example due to the action of gravity on the litter on a sloped scratching platform 3011, due to the scratching of the litter by the birds, and/or due to the action of gravity on the litter when the scratching platform 3011 is perforated, and this litter is deposited on another scratching floor 3011. In some embodiments, this litter is deposited on another litter chain 3114.

In some embodiments, the litter that falls from the scratching platform 3011 is caught on a belt 3036 disposed along the side of the scratching platform 3011. In some embodiments, the belt 3036 is operable to move relative to the scratching platform 3011.

In some embodiments, at least some of the litter on the belt 3036 is directed to be deposited on another scratching platform 3011. In some embodiments, a litter remover 3120 is spaced above the belt 3036 to direct some of the litter on the belt 3036 to be deposited on another scratching platform 3011. In some embodiments, the litter remover 3120 directs some of the litter on belt 3036 into a funnel 3128. In some embodiments, a tube 3130 transports the litter deposited into the funnel 3128 and deposits the litter on the other scratching platform 3011. In some embodiments, the other scratching platform 3011 includes a litter chain 3114 and the tube 3130 directs the litter substantially onto the litter chain 3114 of the other scratching platform 3011. In some embodiments, the litter chain 3114 on the other scratching platform 3011 extends through a trough 3100 formed in the other scratching platform 3011. In some embodiments, the litter chain 3114 on the other scratching platform 3011 extends through a perforated trough 3100A formed in the other scratching platform 3011. In some embodiments, litter remaining on the belt 3036 is removed from the aviary 3010.

In one embodiment, a method of forming an aviary 3010 including an aviary tower section 3021 having a first side 3025, a second side 3023, and a nesting area 3027 is provided. The method includes positioning the nesting area 3027 between the first side 3025 and the second side 3023 and extending a belt 3036 through the nesting area 3027. A grate 3039 is positioned over the belt 3036 so that a first end 3041 of the grate 3039 extends to the first side 3025 of the aviary tower section 3021, and a second end 3043 of the grate 3039 extends to a second side 3023 of the aviary tower section 3021. A first egg conveyor 3028 is positioned at the first end 3041 of the grate 3039, and a second egg conveyor 3028 is positioned at the second end 3043 of the grate 3039.

In one embodiment, the grate 3039 is flat. In one embodiment, a first portion 3045 of the grate 3039 is angled downward toward the egg conveyor 3028 on side 3025 of aviary tower section 3021, and a second portion 3047 of the grate 3039 is angled downward toward the egg conveyor 3028 on side 3023 of aviary tower section 3021. In one embodiment, the belt 3036 is positioned to capture and transport debris that falls through the grate 3039. In one embodiment, a scratching platform 3011 is extended from the aviary tower section 3021 adjacent to the grate 3039. In one embodiment, the scratching platform 3011 is sloped toward the grate 3039 to facilitate movement of a deposit on the scratching platform 3011 to the grate 3039. In one embodiment, the scratching platform 3011 is a solid floor. In one embodiment, a belt 3037 is extended above the aviary tower section 3021. The belt 3037 is positioned to capture and transport deposits that fall onto it. Birds are allowed to move freely and walk on the belt 3037.

In an embodiment (not shown), the aviary tower 3018 includes the belts 3036 without the grates 3039. In such an embodiment, the belts 3036, 3037 carry deposits from the aviary tower 3018, as described previously. In particular, deposits may be scratched onto the belts 3036 from the scratching platform 3011. In one embodiment, eggs are laid directly on the belts 3036, 3037 and the birds walk on the moving belts 3036, 3037.

In one embodiment, a first aviary tower section 3021A and a second aviary tower section 3021B are provided and are positioned adjacent each other. In such an embodiment, the method includes extending an aisle 3020 between the first aviary tower section 3021A and the second aviary tower section 3021B. A first perch 3029A is extended from the first aviary tower section 3021A and into the aisle 3020 at a first vertical distance 3070 from a scratching platform 3011. A second perch 3029B is extended from the second aviary tower section 3021B and into the aisle 3020 at a second vertical distance 3072 from the scratching platform 3011.

The first and second vertical distances 3070, 3072 from the scratching platform 3011 are not equal.

In one embodiment, the aviary 3010 includes a plurality of first perches 3029A and a plurality of second perches 3029B. The method in this embodiment includes horizontally offsetting the plurality of first perches 3029A from one another and horizontally offsetting the plurality of second perches 3029B from one another. In one embodiment, the aviary 3010 includes a plurality of first perches 3029A and a plurality of second perches 3029B, and the method includes vertically offsetting the plurality of first perches 3029A from one another and vertically offsetting the plurality of second perches 3029B from one another. In one embodiment, the first vertical distance 3070 and the second vertical distance 3072 define a third vertical distance 3074. The third vertical distance 3074 enables an animal to hop between the first perch 3029A and the second perch 3029B or vice versa. In such an embodiment, the perches 3029A, 3029B are offset as a result of the aviary tower sections 3021A, 3021B being positioned at different heights. Accordingly, by offsetting the heights 3019A, 3019B of the similar aviary tower sections 3021A, 3021B the perches 3029A, 3029B become offset.

It will be understood by one of ordinary skill in the art of aviary design that the offset tower section and perch design may be replicated for as many aviary tower combinations as are desired in an aviary 3010. In each case of an adjacent set of aviary towers 3018, the perches 3029 of each aviary tower 3018 should be offset from the perches 3029 of the adjacent aviary tower 3018 by the third vertical distance 3027 to enable a bird to hop from perch 3029 to perch 3029 through aisle 3020 in a ladder-like manner. It will also be understood by one of ordinary skill that manufacturing, assembly, and installation time may be saved when building aviary 3010 when aviary tower section units 3021 are similar to each other. Similar aviary tower section units 3021 permit the construction of aviary towers 3018 with perches 3029 that are offset in height from perches 3029 on aviary towers 3018 that are separated by an aisle 3020 by simply installing the aviary tower section unit 3021 in one aviary tower 3018 at a height different from the height of installation for an aviary tower section unit 3021 in an adjacent aviary tower 3018.

While the embodiments have been illustrated and described in detail in the drawings and foregoing description, the same is to be considered as illustrative and not restrictive in character, it being understood that only certain embodiments have been shown and described and that all changes and modifications that come within the spirit of the embodiments are desired to be protected.

What is claimed:

1. A cage-free aviary comprising:
a first aviary tower;
a second aviary tower spaced from the first aviary tower;
a first scratching platform having a first side adjacent the first aviary tower and a second side adjacent the second aviary tower; and
a litter chain extending across the first scratching platform and configured to move litter across the first scratching platform.

2. The aviary of claim 1, further comprising:
a litter storage container for holding a quantity of litter therein, the litter storage container constructed and arranged to direct a portion of the litter contained therein onto the litter chain.

3. The aviary of claim 2, wherein the litter storage container is operative to direct a portion of the litter contained therein onto the litter chain under force of gravity.

4. The aviary of claim 1, wherein:
the first aviary tower comprises:
a first laying area positioned in the first aviary tower; and
a first belt extending below the first laying area;
wherein litter falling off the first side of the first scratching platform is deposited on the first belt; and
the second aviary tower comprises:
a second laying area positioned in the second aviary tower; and
a second belt extending below the second laying area;
wherein litter falling off the second side of the first scratching platform is deposited on the second belt.

5. The aviary of claim 4, wherein:
a first portion of the first scratching platform is sloped toward the first belt to facilitate movement of litter on the first portion of the first scratching platform to the first belt; and
a second portion of the first scratching platform is sloped toward the second belt to facilitate movement of litter on the second portion of the first scratching platform to the second belt.

6. The aviary of claim 5, further comprising a litter trough extending through the first scratching platform between the first portion and the second portion, wherein the litter chain is disposed at least partially within the litter trough.

7. The aviary of claim 4, further comprising:
a first grate disposed above the first belt, wherein the first grate has first openings formed therethrough, the first openings sized to allow litter to pass therethrough but not eggs; and
a second grate disposed above the second belt, wherein the second grate has second openings formed therethrough, the second openings sized to allow litter to pass therethrough but not eggs.

8. The aviary of claim 4, further comprising:
a first litter remover disposed above the first belt, the first litter remover being constructed and arranged to remove at least some of the litter on the first belt to a first position spaced from the first belt; and
a second litter remover disposed above the second belt, the second litter remover being constructed and arranged to remove at least some of the litter on the second belt to a second position spaced from the second belt.

9. The aviary of claim 8, wherein at least one of the first and second litter removers comprises:
a first blade and a second blade that meet at a point;
wherein the first blade is angled toward a first side of an adjacent one of the first and second belts in the direction of motion of the adjacent one of the first and second belts; and
wherein the second blade is angled toward a second side of the adjacent one of the first and second belts in the direction of motion of the adjacent one of the first and second belts.

10. The aviary of claim 9, wherein the first and second blades together extend over a full width of the adjacent one of the first and second belts.

11. The aviary of claim 9, wherein the first and second blades each have substantially flat lower edges that are spaced above the adjacent one of the first and second belts.

12. The aviary of claim 9, wherein the first and second blades each are spaced above the adjacent one of the first and second belts between approximately one-quarter of an inch and approximately one-half of an inch.

13. The aviary of claim 8, further comprising:
a first tube having a first proximal end disposed at the first position, wherein litter removed from the first belt by the first litter remover is deposited into the first tube; and
a second tube having a second proximal end disposed at the second position, wherein litter removed from the second belt by the second litter remover is deposited into the second tube.

14. The aviary of claim 13, further comprising:
a first funnel coupled to the first proximal end of the first tube, wherein the first funnel is constructed and arranged to guide litter removed from the first belt by the first litter remover into the first tube; and
a second funnel coupled to the second proximal end of the second tube, wherein the second funnel is constructed and arranged to guide litter removed from the second belt by the second litter remover into the second tube.

15. The aviary of claim 13, wherein:
the first tube has a first distal end disposed adjacent a lower scratching platform disposed below the first scratching platform in order to deliver litter to the lower scratching platform; and
the second tube has a second distal end disposed adjacent the lower scratching platform in order to deliver litter to the lower scratching platform.

16. The aviary of claim 8, wherein at least one of the first and second litter removers comprises a blade angled toward a first side of an adjacent one of the first and second belts in the direction of motion of the adjacent one of the first and second belts.

17. The aviary of claim 1, further comprising a litter trough extending through the first scratching platform, wherein the litter chain is disposed at least partially within the litter trough.

18. The aviary of claim 17, further comprising at least one hole formed through the litter trough, wherein the at least one hole is constructed and arranged to allow some of the litter disposed in the litter trough to fall through the at least one hole.

19. The aviary of claim 1, wherein the litter chain comprises:
a plurality of links.

20. The aviary of claim 19, wherein at least one of the links comprises an interior cavity constructed and arranged to hold a quantity of litter.

21. A cage-free aviary comprising:
an aviary tower;
a scratching platform having a first side adjacent the aviary tower; and
a litter chain extending across the scratching platform and configured to move litter across the scratching platform.

22. The aviary of claim 21, further comprising:
a litter storage container for holding a quantity of litter therein, the litter storage container constructed and arranged to direct a portion of the litter contained therein onto the litter chain.

23. The aviary of claim 22, wherein the litter storage container is operative to direct a portion of the litter contained therein onto the litter chain under force of gravity.

24. The aviary of claim 21, wherein:
the aviary tower comprises:
a laying area positioned in the aviary tower; and
a belt extending below the laying area;
wherein litter falling off the first side of the scratching platform is deposited on the belt.

25. The aviary of claim 24, wherein the scratching platform is sloped toward the belt to facilitate movement of litter on the scratching platform to the belt.

26. The aviary of claim 24, further comprising a grate disposed above the belt, wherein the grate has openings formed therethrough, the openings sized to allow litter to pass therethrough but not eggs.

27. The aviary of claim 24, further comprising a litter remover disposed above the belt, the litter remover being constructed and arranged to remove at least some of the litter on the belt to a position spaced from the belt.

28. The aviary of claim 27, wherein the litter remover comprises:
a first blade and a second blade that meet at a point;
wherein the first blade is angled toward a first side of the belt in the direction of motion of the belt; and
wherein the second blade is angled toward a second side of the belt in the direction of motion of the belt.

29. The aviary of claim 28, wherein the first and second blades together extend over a full width of the belt.

30. The aviary of claim 28, wherein the first and second blades each have substantially flat lower edges that are spaced above the belt.

31. The aviary of claim 28, wherein the first and second blades each are spaced above the belt between approximately one-quarter of an inch and approximately one-half of an inch.

32. The aviary of claim 27, further comprising a tube having a proximal end disposed at the position, wherein litter removed from the belt by the litter remover is deposited into the tube.

33. The aviary of claim 32, further comprising:
a funnel coupled to the proximal end of first tube, wherein the funnel is constructed and arranged to guide litter removed from the belt by the litter remover into the tube.

34. The aviary of claim 32, wherein the tube has a distal end disposed adjacent a lower scratching platform disposed below the scratching platform in order to deliver litter to the lower scratching platform.

35. The aviary of claim 27, wherein the litter remover comprises a blade angled toward a first side of the belt in the direction of motion of the belt.

36. The aviary of claim 21, further comprising a litter trough extending through the scratching platform, wherein the litter chain is disposed at least partially within the litter trough.

37. The aviary of claim 36, further comprising at least one hole formed through the litter trough, wherein the at least one hole is constructed and arranged to allow some of the litter disposed in the litter trough to fall through the at least one hole.

38. The aviary of claim 21, wherein the litter chain comprises:
a plurality of links.

39. The aviary of claim 38, wherein at least one of the links comprises an interior cavity constructed and arranged to hold a quantity of the litter.

* * * * *